(12) United States Patent
Dow et al.

(10) Patent No.: US 12,508,279 B2
(45) Date of Patent: *Dec. 30, 2025

(54) COMPOSITIONS AND METHODS FOR ENHANCING INNATE IMMUNITY IN A SUBJECT FOR TREATMENT OF INFECTIONS AND CANCER AND OTHER ACUTE AND CHRONIC CONDITIONS OF THE EYE

(71) Applicant: COLORADO STATE UNIVERSITY RESEARCH FOUNDATION, Fort Collins, CO (US)

(72) Inventors: Steven Dow, Fort Collins, CO (US); Kathryn Wotman, Livermore, CO (US); Lyndah Chow, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 746 days.

This patent is subject to a terminal disclaimer.

(21) Appl. No.: 17/733,640

(22) Filed: Apr. 29, 2022

(65) Prior Publication Data

US 2022/0257634 A1 Aug. 18, 2022

Related U.S. Application Data

(63) Continuation of application No. PCT/US2020/058359, filed on Oct. 30, 2020, which is a continuation-in-part of application No. 16/670,785, filed on Oct. 31, 2019, now Pat. No. 11,400,152, which is a continuation-in-part of
(Continued)

(51) Int. Cl.
| | |
|---|---|
| *A61K 8/14* | (2006.01) |
| *A61K 9/00* | (2006.01) |
| *A61K 9/127* | (2025.01) |
| *A61K 31/711* | (2006.01) |
| *A61K 31/713* | (2006.01) |
| *A61K 39/02* | (2006.01) |
| *A61K 39/12* | (2006.01) |
| *A61K 39/39* | (2006.01) |
| *A61K 47/38* | (2006.01) |
| *A61K 47/69* | (2017.01) |
| *A61P 27/02* | (2006.01) |

(Continued)

(52) U.S. Cl.
CPC ............ *A61K 31/713* (2013.01); *A61K 8/14* (2013.01); *A61K 9/0048* (2013.01); *A61K 9/127* (2013.01); *A61K 31/711* (2013.01); *A61K 39/02* (2013.01); *A61K 39/12* (2013.01); *A61K 39/39* (2013.01); *A61K 47/38* (2013.01); *A61K 47/6911* (2017.08); *A61P 27/02* (2018.01); *A61P 37/04* (2018.01); *A61K 2039/53* (2013.01); *A61K 2039/545* (2013.01); *A61K 2039/552* (2013.01); *A61K 2039/555* (2013.01); *A61K 2039/55511* (2013.01); *A61K 2039/55555* (2013.01); *A61K 2039/55561* (2013.01); *A61K 2039/55572* (2013.01); *A61K 2039/57* (2013.01)

(58) Field of Classification Search
CPC .. A61K 39/39; A61K 39/12; A61K 2039/541; A61K 2039/53; A61K 2039/55555; A61K 2039/55561; A61K 2039/55572; A61K 2039/545; A61K 2039/552; A61K 2039/55511; A61K 2039/55516; A61K 35/68; A61K 49/0054; A61K 49/0084; A61K 2039/555; A61K 31/711; A61K 31/713; A61K 9/0048; A61K 9/127; A61K 8/14; A61K 39/02; A61K 2039/57; A61P 27/02

See application file for complete search history.

(56) References Cited

U.S. PATENT DOCUMENTS

| | | |
|---|---|---|
| 6,251,678 B1 | 6/2001 | Volkin et al. |
| 10,512,687 B2 | 12/2019 | Dow et al. |

(Continued)

FOREIGN PATENT DOCUMENTS

| | | |
|---|---|---|
| EP | 2638896 A1 | 9/2013 |
| WO | 9420070 A1 | 9/1994 |

(Continued)

OTHER PUBLICATIONS

Garrett et al. Carboxymethylcellulose Binds to Human Corneal Epithelial Cells and Is a Modulator of Corneal Epithelial Wound Healing. IOVS 48(4): 1559-1567, 2007.*

(Continued)

*Primary Examiner* — Bridget E Bunner
(74) *Attorney, Agent, or Firm* — Polsinelli PC

(57) ABSTRACT

Embodiments of the present invention generally relate to novel immunostimulatory compositions of use to stimulate non-specific immune responses in a subject. In certain embodiments, immunogenic compositions disclosed herein can be directed to use in the eye of a subject. In some embodiments, the immunogenic compositions disclosed herein enhance non-specific immune responses in the eye of a subject to treat or reduce the risk of onset of an eye condition. In other embodiments, compositions disclosed herein can be used to treat eye infections due to a microorganism, tumors of the eye, as well as, chronic wounds or infections of the eye. In some embodiments, immunogenic ocular formulations disclosed herein include combinations of agents for prolonged exposure to the eye for improved outcomes.

23 Claims, 42 Drawing Sheets

Specification includes a Sequence Listing.

Related U.S. Application Data application No. 15/476,723, filed on Mar. 31, 2017, now Pat. No. 10,512,687.

(60) Provisional application No. 62/456,505, filed on Feb. 8, 2017, provisional application No. 62/316,985, filed on Apr. 1, 2016, provisional application No. 62/316,986, filed on Apr. 1, 2016.

(51) Int. Cl.
*A61P 37/04* (2006.01)
*A61K 39/00* (2006.01)

(56) References Cited

U.S. PATENT DOCUMENTS

| | | |
|---|---|---|
| 2005/0013812 A1 | 1/2005 | Dow et al. |
| 2010/0297165 A1 | 11/2010 | Berzofsky et al. |
| 2011/0070298 A1 | 3/2011 | Mansour et al. |
| 2016/0151453 A1 | 6/2016 | Hardt et al. |
| 2017/0281754 A1 | 10/2017 | Dow et al. |
| 2020/0069795 A1 | 3/2020 | Dow et al. |

FOREIGN PATENT DOCUMENTS

| | | |
|---|---|---|
| WO | 2005013891 A2 | 2/2005 |
| WO | 2008057696 A3 | 5/2008 |
| WO | 2010060030 A1 | 5/2010 |
| WO | 2014204791 A1 | 12/2014 |
| WO | 2016161309 A1 | 10/2016 |
| WO | 2019054960 A2 | 3/2019 |

OTHER PUBLICATIONS

Bal et al., "Co-encapsulation of antigen and adjuvant in cationic liposomes affects the quality of the immune response in mice after intradermal vaccination", Vaccine 2010, Chapter 9, pp. 178-194.
Chang et al., "A novel vaccine adjuvant for recombinant flu antigens", Biologicals 37 (2009) pp. 141-147.
Contreras et al., "Effects of a Liposome-TLR Mucosal Immune Stimulant on Kittens Infected with Feline Herpesvirus 1.", J. Vet. Int. Med. 31(4):1312, Jun. 2017.
Contreras et al., "Evaluation of liposome toll-like receptor ligand complexes for non-specific mucosal immunoprotection from feline herpesvirus-1 infection", J. Vet. Intern. Med. 2019, 33, pp. 831-837.
Diwan et al., "Enhancement of immune responses by co-delivery of a Cpg oligodeoxynucleotide and tetanus toxoid in biodegradable nanospheres", Journal of Controlled Release, vol. 85, Issues 1-3, Dec. 13, 2002, pp. 247-262. Abstract Only.
Dow et al., "Activation of Innate Immune Responses in Cat Leukocytes by a Liposomal TLR Ligand Immune Stimulant", J. Vet. Int. Med. 31(4): 1308, #IM05, Jun. 2017.
Gowen et al., "Prophylaxis with cationic liposome-DNA complexes protects hamsters from phleboviral disease: Importance of liposomal delivery and CpG motifs", Antiviral Research 81 (2009) 37-46.
Graciotti et al., "The era of bioengineering: how will this affect the next generation of cancer immunotherapy?", J. Transl. Med. (2017) 15:142.
Grossmann et al., "Enhancement of the priming efficacy of DNa vaccines encoding dendritic cell-targeted antigens by synergistic toll-like receptor ligands", BMC Immunology 2009, 10 pages.
Henderson et al., "Mucosal immunization with liposome-nucleic acid adjuvants generates effective humoral and cellular immunity", Vaccine 29 (2011) pp. 5304-5312.
Kawakami et al., "Effect of Hydrophilic Polymers on Physical Stability of Liposome Dispersions", J. Phys. Chem. B 2001, 105, 12, 2374-2385. Abstract Only.
Lee et al., "Biodegradable nanoparticles containing TLR3 or TLR9 agonists togehter with antigen enhance MHC-restricted presentation of the antigen", Arch Pharm Res 33(11), pp. 1859-1866, 2010.
Lievens et al., "Evaluation of an enhanced viscosity artificial tear for moderate to severe dry eye disease: A multicenter, double-masked, randomized 30-day study", Contact Lens and anterior Eye 42 (2019) 443-449.
Logue, et al., "Treatment with cationic liposome-DNA complexes (CLDCs) protects mice from lethal Western equine encephalitis virus (WEEV) challenge", Antiviral Research 87 (2010) 195-203.
Luo et al., "Plasmid DNA containing multiple CpG motifs triggers a strong immune response to hepatitis B surface antigen when combined with incomplete Freund's adjuvant but not aluminum hydroxide", Molecular Medicine Reports 6, pp. 1309-1314, 2012.
Milicic et al., "Small Cationic DDA:TDB Liposomes as Protein Vaccine adjuvants Obviate the Need for TLR Agonists in Inducing Cellular and Humoral Responses", PLoS One 7(3): e34255. doi:10.1371/journal.pone.0034255, 2012.
Park et al., "Construction of CpG Motif-enriched DNA Vaccine Plasmids for Enhanced Early Immune Response", Biotechnology and Bioprocess Engineering 2005, 10, pp. 29-33.
Patel et al., "Novel drugs targeting Toll-like receptors for antiviral therapy", Future Virol. (2014) 9(9), pp. 811-829.
Stiles, "Ocular manifestations of feline viral diseases", The Veterinary Journal 201 (2014), pp. 166-173.
Suzuki et al., "Liposome-Encapsulated CpG Oligodeoxynucleotides as a Potent Adjuvant for Inducing Type 1 Innate Immunity", Cancer Research 64, Dec. 1, 2004, pp. 8754-8760.
Temizoz et al., "Vaccine adjuvants as potential cancer immunotherapeutics", International Immunology, vol. 28, No. 7, pp. 329-338, 2016.
Uematsu et al., "Toll-Like Receptors (TLRs) and Innate Immunity", in Handbook of Experimental Pharmacology 183, pp. 1-20, 2008.
Wheat et al., "Activation of upper respiratory tract mucosal innate immune responses in cats by liposomal toll-like receptor ligand complexes delivered topically", J. Vet. Intern. Med. 2019, 33, pp. 838-845.
Wheat et al., "Local immune and microbiological responses to mucosal administration of a Liposome-TLR agonist Immunotherapeutic in dogs", BMC Veterinary Research (2019) 15:330.
Wheat et al., "Non-specific protection from respiratory tract infections in cattle generated by intranasal administration of an innate immune stimulant", PLoS One 15(6): e0235422, 2020.
Wong et al., "Activation of toll-like receptor signaling pathway for protection against influenza virus infection", Vaccine 27 (2009), pp. 3481-3483.
Zaks et al., "Efficient Immunization and Cross-Priming by Vaccine Adjuvants Containing TLR3 or TLR9 Agonists Complexed to cationic Liposomes", Journal of Immunology, 2006, 176, pp. 7335-7345.
Dow et al., Liposome-nucleic acid immunotherapeutics. Expert Opin Drug Delivery 5 (1): 11-24, 2008.
Griesenbach, U. et al., "The Use Of Carboxymethylcellulose Gel To Increase Non-Viral Gene Transfer In Mouse Airways", Biomaterials, 31(9):2665-72; Mar. 2010 (Mar. 2010).
Wang, C. et al., "Lymphatic-Targeted Cationic Liposomes: A Robust Vaccine Adjuvant For Promoting Long-Term Immunological Memory", Vaccine, 32(42):5475-83; Sep. 22, 2014 (Sep. 22, 2014).
Jia, H. et al., "Therapeutic Injection of a C-Type CpG ODN Induced an Antitumor Immune Response in C57/BL6 Mice of Orthotopically Transplanted Hepatocellular Carcinoma," Oncology Research, vol. 23, pp. 321-326. 2016.
Ultimo, A. et al., "Targeting Innate Immunity with dsRNA-Conjugated Mesoporous Silica Nanoparticles Promotes Antitumor Effects on Breast Cancer Cells," Chemistry of European Journal Communication, Jan. 26, 2016, pp. 1582-1586, vol 22.
Hamajima, K. et al., "Rapid Communication Intranasal Administration of HIV-DNA Vaccine Formulated with a Polymer, Carboxymethylcellulose, Augments Mucosal Antibody Production and Cell-Mediated Immune Response", Clinical Immunology and Immunopathology, vol. 88, No. 2, Jan. 1, 1998, pp. 205-210.

* cited by examiner

Fig. 7A (oral CLDC administration)
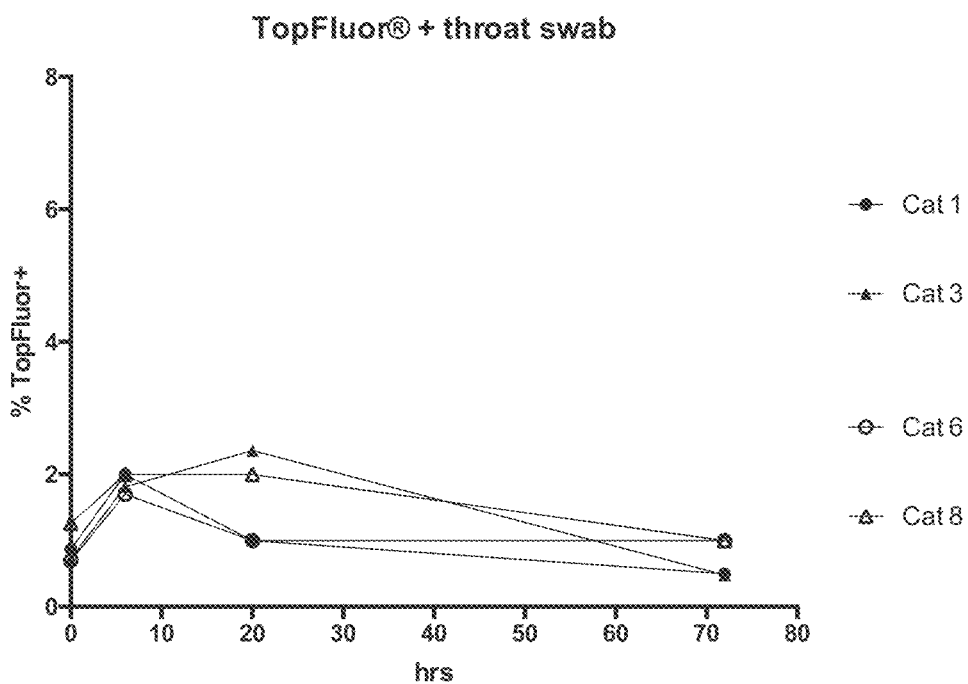
Fig. 7B (oral PCT-01 administration)
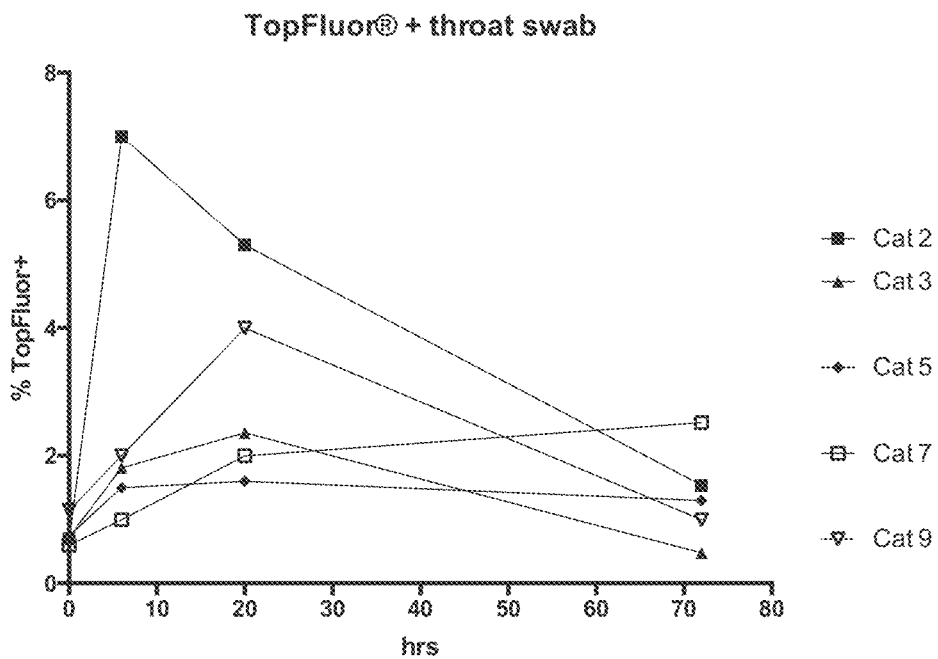

(labeled MIM uptake by nasal lavage cells)

(labeled MIM uptake by throat swab cells)

Fig. 14A (Neutrophil infiltrate into nose)
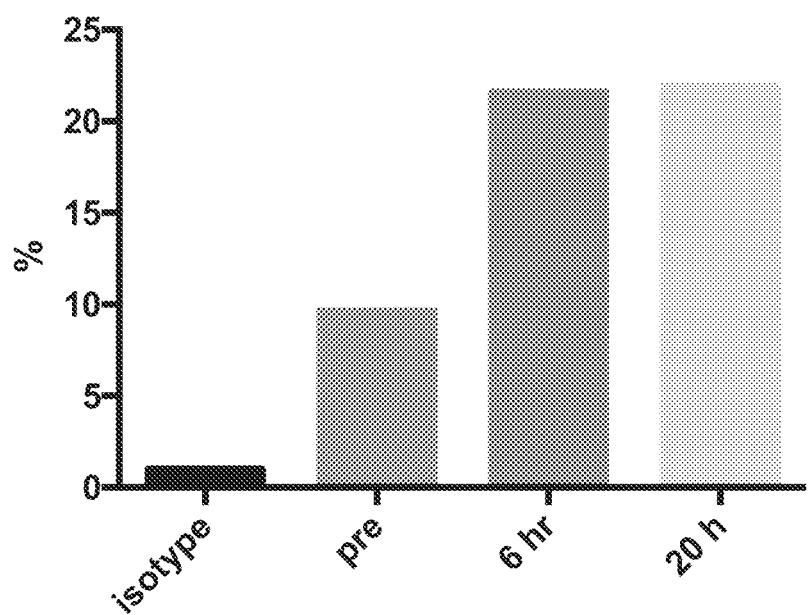
Fig. 14B (Monocyte infiltrate into throat)
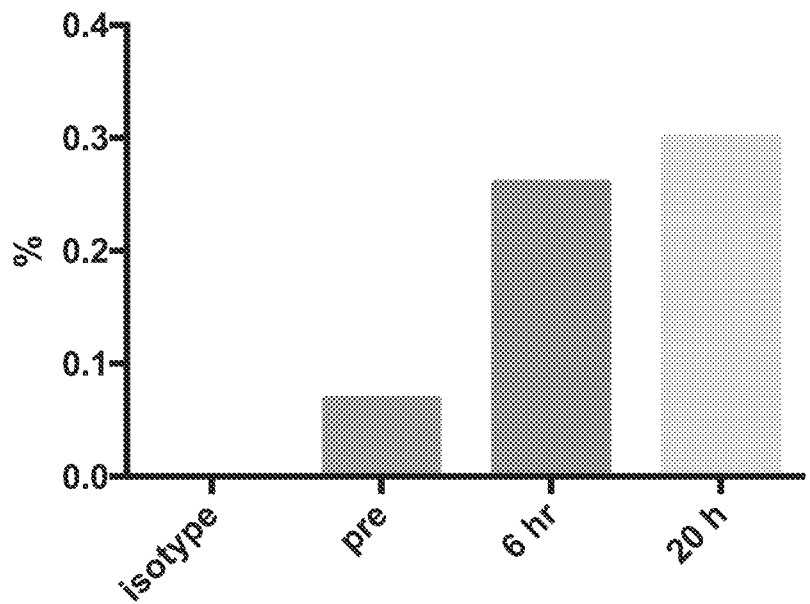

Fig. 15A (CD4 T cell infiltration: nasal lavage)
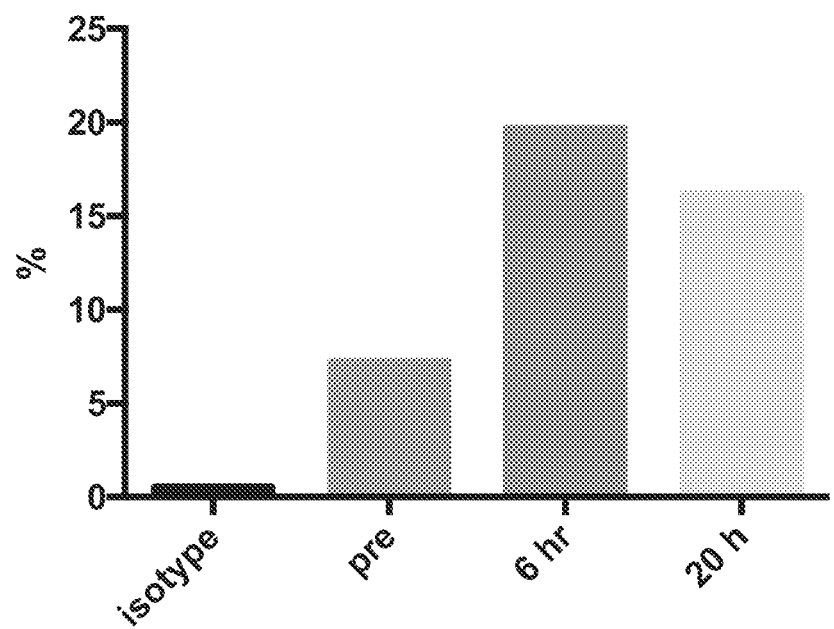
Fig. 15B (CD4 T cell infiltration: throat swabs)
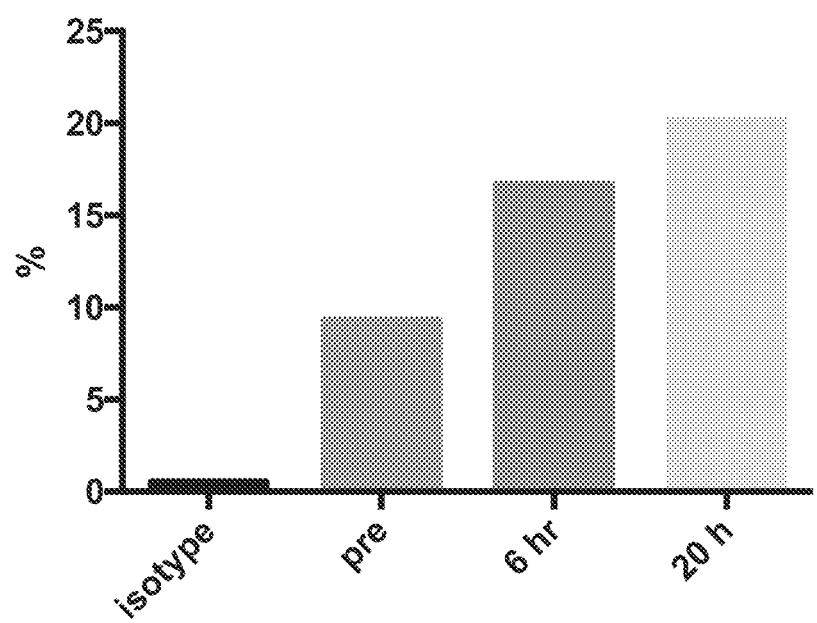

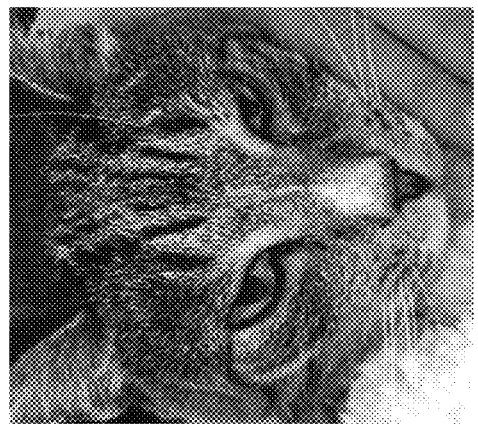
Fig. 35A (Pre-treatment)
Fig. 35B (4 days after Rx)

(Pre-treatment)

(Week 2)

(Week 4)

(Week 6)

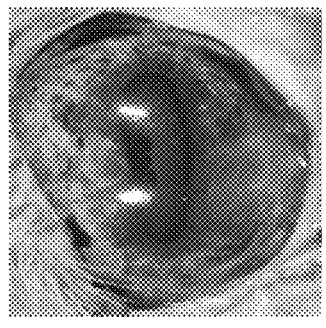 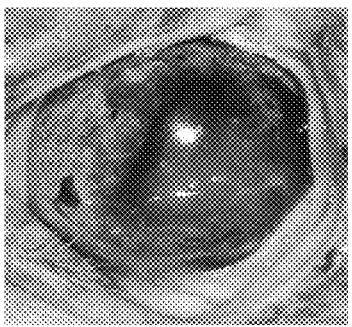 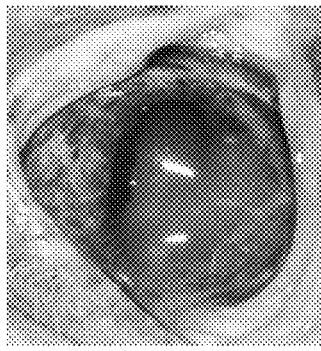 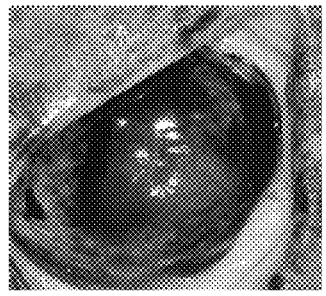
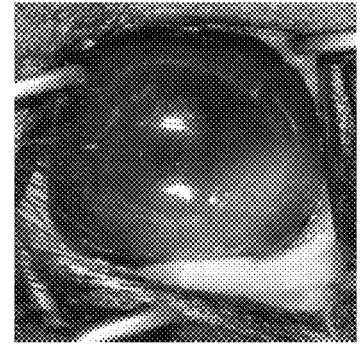 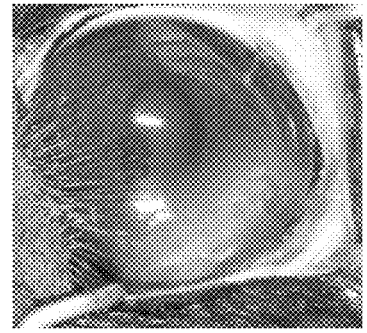 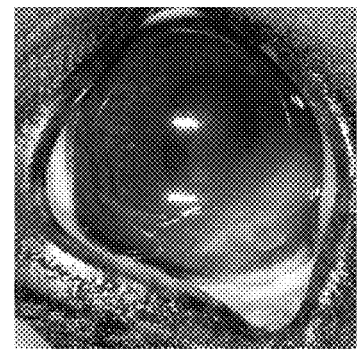 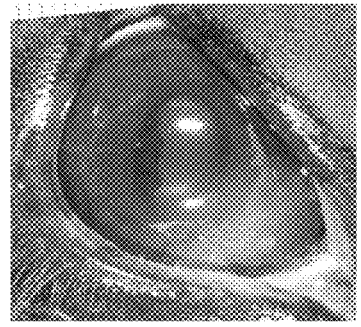
Fig. 37A Pre-treatment, Topical only
Fig. 37B 2 weeks, Topical only
Fig. 37C 4 weeks, Topical only
Fig. 37D 6 weeks, Topical only Pre-treatment After 72h of treatment

COMPOSITIONS AND METHODS FOR ENHANCING INNATE IMMUNITY IN A SUBJECT FOR TREATMENT OF INFECTIONS AND CANCER AND OTHER ACUTE AND CHRONIC CONDITIONS OF THE EYE

PRIORITY

This application is a continuation of PCT Application No. PCT/US2020/058359, filed Oct. 30, 2020, which application claims priority to continuation-in-part application, U.S. patent application Ser. No. 16/670,785 filed Oct. 31, 2019, which is a continuation of U.S. patent application Ser. No. 15/476,723, filed Mar. 31, 2017, now U.S. Pat. No. 10,512,687, issued on Dec. 24, 2019, which claims priority to U.S. Provisional Application 62/456,505, filed Feb. 8, 2017, U.S. Provisional Application 62/316,986, filed Apr. 1, 2016, and U.S. Provisional Application 62/316,985, filed Apr. 1, 2016. These applications are hereby incorporated by reference in their entirety for all purposes.

SEQUENCE LISTING

The instant application contains a Sequence Listing which has been submitted electronically in ASCII XML format and is hereby incorporated by reference in its entirety for all purposes. The ASCII copy, created on Mar. 21, 2025, is named 103550-722727_16-052-US.xml and is 4,000 Bytes in size.

FIELD OF THE INVENTION

Embodiments of the instant disclosure relate to novel immunostimulatory compositions, adjuvants and vaccines, and their use to stimulate immune responses and treat or reduce the risk of onset of a condition and/or infection. In certain embodiments, immunogenic compositions disclosed herein can be directed to use in the eye of a subject. In some embodiments, the immunogenic compositions disclosed herein enhance immune responses in the eye of humans or other mammals such as pets, livestock, zoo animals, and wild animals. In other embodiments, compositions disclosed herein can be used to treat eye infections due to a microorganism, tumors of the eye, as well as, chronic wounds of the eye or chronic conditions such as non-healing corneal ulcers or infections.

BACKGROUND OF THE INVENTION

There is a growing need for new approaches for generating non-specific protection from viral and bacterial infections without having to resort to the use of antibiotics or other antimicrobial drugs, which serve to stimulate the development of antibiotic resistance. Currently however there are few immunostimulatory compounds that are capable of eliciting rapid and sustained activation of innate immune responses at mucosal surfaces such as the nasopharynx, upper respiratory tract, eye and adnexa, GI tract, and reproductive tract to generate broad, non-specific protection from infection. There is a need in the art for novel compositions and methods to broadly and non-specifically enhance innate immune responses to infective microorganisms; for example, at mucosal surfaces for non-specific protection from ocular infections.

BRIEF SUMMARY OF THE INVENTION

In certain embodiments disclosed herein, immunogenic compositions including at least one of (a) cationic liposomes, at least one (b) toll like receptor (TLR) ligands (agonists) or mixture thereof, and at least one (c) cellular adhesion agent or potentiating agent. In certain embodiments, the TLR agonists include but are not limited to TLR3 and TLR9 agonists. In other embodiments, the cationic liposomes can include, but are not limited to, a mixture of cationic lipid and non-charged lipids. In accordance with these embodiments, a mixture of cationic lipid and non-charged lipids can include a mixture of DOTAP and cholesterol. In certain embodiments, the DOTAP and cholesterol can be about a 1:1 molar ratio or about a 2:1 or about a 1:2 or similar ratio. In some embodiments, the mixture of cationic lipid and non-charged lipids can include at least one of non-coding plasmid DNA molecules (TLR9 ligand) and polyinosinic, poly-cytidylic acid (polyI:C; TLR3 ligand). In other embodiments, the non-coding plasmid DNA can include a polynucleotide represented by the nucleic acid sequence, SEQ ID NO. 1. In yet other aspects, the mixture of cationic lipid and non-charged lipid complexes can include plasmid DNA and polyI:C. In some embodiments, a mixture of plasmid DNA and poly I:C can be about a 1:1 ratio (by weight) or about a 2:1 or about a 1:2 or similar ratio. In some embodiments, the adhesive agent or potentiating agent can be carboxymethylcellulose, chitosan, a polyglycol, a polymer, a poloxamer (e.g. poloxamer 407, poloxamer 403), other gelatinous or inert adherence material, hyaluronic acid, a hyaluronic acid-like agent. In certain embodiments, the adhesive agents contemplated of use in immunogenic ocular formulations disclosed herein can prolong contact with the surface of the eye of a subject in order to improve outcomes such as treat an infection or tumor of the eye. In certain embodiments, the cellular adhesion/potentiation agent can be a low- to mid-weight viscosity carboxymethylcellulose. In certain embodiments, the low and high molecular weight cellular adhesion agent can be carboxymethylcellulose. In some embodiments, carboxymethylcellulose can be present in an immunogenic composition disclosed herein at about 1% to about 20% (v/v). Certain immunogenic compositions disclosed herein can include complexes of the cationic liposomes and any TLR 3 and TLR 9 ligands known in the art. According to further aspects, the immune stimulatory complexes can include charged liposomes and about 10 to about 200 µg TLR ligands per milliliter cationic liposomes. In certain embodiments, cationic liposomes can be present at about 1 to about 20 mM concentration in an immunogenic composition disclosed herein. In certain alternative embodiments, the immunogenic composition can further include an antigen. In some embodiments, the antigen can be a protein antigen. In other embodiment, the antigen can be a non-specific antigen capable of boosting an immune response or a more specific antigen, if desired. In some embodiments, formulations disclosed herein are not used as a vaccine but are used for a non-specific immune response instead. In accordance with these embodiments, an antigen of use in formulations disclosed herein can be derived from a virus, bacterium, prion, fungus, a toxin, a tumor-related antigen or polypeptide fragment thereof or other protein or non-protein antigen.

In other embodiments, methods for inducing an innate immune response in a subject to protect from, or treat infection or other eye condition are disclosed. In certain embodiments, methods are disclosed for inducing a broad, non-specific innate immune response in a subject prior to, or after having an infection, or other condition. In accordance with these embodiments, methods can include, but are not limited to, providing to a subject an effective amount of an immunogenic composition disclosed herein. In certain embodiments, the immunogenic composition can include: (a) cationic liposomes; (b) one or more TLR ligands (e.g. a mixture of toll like receptor 3 (TLR3) and toll like receptor 9 (TLR9) ligands); and/or (c) a cellular adhesion/potentiation agent. In certain aspects, the subject can be a human, a pet or companion animal, livestock, bird, fish, reptile or other animal. In further aspects, the composition can be provided to an animal prior to and/or during boarding. According the further aspects, the subject can be a horse, a dog, a cat, a cow, sheep, a pig, a goat, a chicken, a zoo animal, a wild animal and a fish. In even further aspects, an infection is from a virus or bacterium or fungus, prion or protozoan. In certain aspects, the condition is a respiratory infection. In accordance with these embodiments, an immunogenic composition can include a polynucleotide represented by SEQ ID NO. 1 and the ligand polyI:C.

In some embodiments, the immune stimulant composition can be administered to the eyes topically to treat or prevent viral ocular infections. In other embodiments, the immune stimulant can be applied to the eyes to prevent or treat bacterial ocular infections, or to prevent or treat fungal infections of the eyes.

In some embodiments, an immunogenic composition disclosed herein can be provided to the subject within 24 hours prior to the risk of exposure and/or within 24 hours to a week or more after exposure, during early onset of clinical signs of an infection, or during chronic infection. In accordance with these embodiments, the immunogenic composition is capable of inducing a local, non-specific immune response at a site of administration. In certain embodiments, immunogenic compositions disclosed herein can be administered to the subject at the site of a wound, an infection or other condition or alternatively, administered to induced a systemic non-specific immune response. In certain subjects, immunogenic compositions disclosed herein can be administered to the reproductive tract, the gastrointestinal tract, the mammary gland, to gills, to air sacs, to eyes, to ears, and to the nose of a subject in need of such a treatment. In yet further aspects, the composition can be administered without the concurrent administration of a vaccine or other known agent for the treatment or reducing onset of a condition.

Further disclosed herein is a method for inducing an immune response to an antigen in a subject, including providing to the subject a composition including: (a) cationic liposomes; (b) a mixture of toll like receptor 3 (TLR3) and toll like receptor 9 (TLR9) ligands; (c) a cellular adhesion agent and the antigen. In certain embodiments, the antigen can be a microbial antigen such as an inactivated virus, non-infective or non-replicating virus, a chimera or other viral antigen or polypeptide derived therefrom. In other embodiments, the antigen can be from a bacteria (non-infective). In yet other embodiments, the antigen can be a tumor-related antigen such as an antigen from an eye tumor to be treated or an unrelated antigen from a tumor of the same or different type of tumor to induce an improved immune response. According to certain aspects, the composition can be administered to the subject orally, nasally, intranasally, topically, intradermally, subcutaneously, intravaginally, intravenously, by uterine or intra-mammary injection, by aerosol delivery, by delivery in water, or parenterally.

In other embodiments, an immunogenic composition can be used to treat a subject having an ocular infection or ocular cancer. In accordance with these embodiments, an eye condition can include but are not limited to, an infection, a cancer, an eye injury, chronic wound or ulcer or similar condition of the eye thereof. In accordance with these embodiments, the eye condition can include a condition that affects the cornea or retina or other component of the eye, such as the adnexa of the eye (e.g. conjunctiva, sclera, eyelids, ciliary body). Certain embodiments of the invention include administering an immunogenic composition disclosed herein to the eye of a subject to reduce incidence of blindness or loss of eyes or vision or to treat an infection or injury or cancer of the eye. In some embodiments, an infection of the eye can be caused by a virus, bacterium, fungus, or other microorganism. In certain embodiments, the infection can be caused by a herpesvirus or adenovirus or other virus capable of causing an eye infection. In some embodiments, the infection can be a chronic viral infection of the eye of a subject caused by viruses, bacteria, or fungi. In certain embodiments, the eye condition can include an infection of the cornea, adverse condition of the cornea or outer service of the eye. In other embodiments, the infection can involve the adnexa of the eye such as the conjunctiva and sclera, or acute or chronic eye infection (e.g., herpesvirus infection, adenovirus infection, mycoplasma infection, calicivirus infection, staphylococcal infection, cryptococcal infection, or other eye infections). In some embodiments, immunogenic ocular formulations disclosed herein can be used to treat ocular cancers, including corneal cancers (squamous cell carcinoma) or other ocular cancers such as uveal melanoma.

In other embodiments, an immunogenic composition disclosed herein can be used to treat cancer of the eye. In some embodiments, cancers of the eye can include, but are not limited to, squamous cell carcinoma, retinoblastoma, melanoma of the eye or other eye cancer. In accordance with these embodiments, the immunogenic ocular composition of use to treat an eye condition such as an infection as referenced herein and/or cancer can include, but is not limited to, at least one cationic liposome agent, at least one TLR agonist and at least one ocular adhesive agent (e.g. corneal adhesive agent). In some embodiments, the adhesive agent can be carboxymethyl cellulose, chitosan, a polyglycol, a polymer, a poloxamer (e.g. poloxamer 407, poloxamer 403), other gelatinous or inert adherence material, hyaluronic acid, a hyaluronic acid-like agent. In certain embodiments, the adhesive agents contemplated of use in immunogenic ocular formulations disclosed herein can prolong contact with the surface of the eye of a subject in order to improve outcomes such as treat an infection or tumor of the eye. In certain embodiments, the immunogenic composition of use to treat the eye of a subject can include a liposome; and dual TLR (e.g. TLR 3 and TLR9 agonist) composition along with an adhesive agent of use in the eye for treatment or prevention of infection, or treatment of cancer. In accordance with these embodiments, the adhesive agent can include a high molecular weight/high viscosity adhesive agent. In some embodiments, the high molecular weight/high viscosity adhesive agent can include, but is not limited to, high viscosity carboxymethylcellulose (CMC). In some embodiments, high viscosity CMC is about 1500 to about 3000 centipoise (cps). In certain embodiments, cancer of the eye can include cancers of any part of the eye. In other embodiments, cancer of the eye can include a squamous cell carcinoma (e.g. of the cornea or other component of the eye). In accordance with these embodiments, immunogenic compositions disclosed herein of use to treat a condition of the eye can provide broad immune protection or treatment of the eye with decreased frequency of administration compared to conventional antiviral eye drops. In accordance with these embodiments, immunogenic compositions disclosed herein can provide increased duration of treatment by the composition, reducing frequency of treatment and having reduced side effects. In certain embodiments, the immunogenic compositions disclosed herein can reduce the incidence of irritation and inflammation as well as treat chronic eye conditions and/or eye cancers with improved outcomes.

In certain embodiments, immunogenic compositions disclosed herein are formulated for prolonged administration to the eye of a subject, reducing frequency of application to a site of infection and/or condition. In some embodiments, immunogenic formulations disclosed herein can be specifically designed for topical administration to the eye. In some embodiments, an immunogenic formulation of use for topical administration includes cationic liposomes, a mixture of TLR3 and TLR9 agonists and at least one adhesive agent. In accordance with these embodiments, an essentially liquid immunogenic ocular formulation disclosed herein further comprises a high molecular weight and/or high viscosity adhesion agent. In certain embodiments, the high molecular weight/high viscosity adhesion agent includes, but is not limited to, carboxymethylcellulose (CMC). In other embodiments, a high molecular weight/high viscosity CMC solution is combined with an essentially liquid immunogenic formulation disclosed herein at a predetermined ratio. In accordance with these embodiments, these formulations will have increased viscosity to a gel-like consistency and improved adherence to the subject's surface in order to increase contact time in an affected area (e.g. the eye).

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIGS. 7A and 7B, 7A illustrates exemplary flow cytometry data demonstrating oropharyngeal cells from cats treated with CLDC alone. FIG. 7B illustrates exemplary flow cytometry data demonstrating oropharyngeal cells from cats treated with an immunogenic composition (e.g., PCT-01: CLDC+CMC) of some embodiments disclosed herein.

FIGS. 14A and 14B illustrates exemplary data quantifying the increase in immune cell infiltrates in the nose (FIG. 14A) and throat (FIG. 14B) of dogs following an immunogenic composition (e.g., PCT-01: CLDC+CMC) treatment of some embodiments disclosed herein.

FIGS. 15A and 15B illustrates exemplary data quantifying stimulation of CD4+ T-cell infiltrates in canine nasal lavage cells and throat of the canine following treatment with an immunogenic composition (e.g., PCT-01: MIM or MiM as used herein: CLDC+CMC) treatment of some embodiments disclosed herein.

CLDC+CMC) administration of variable concentrations (17A) and a single concentration (17B) compared to a negative control of some embodiments disclosed herein.

Figure 18A:
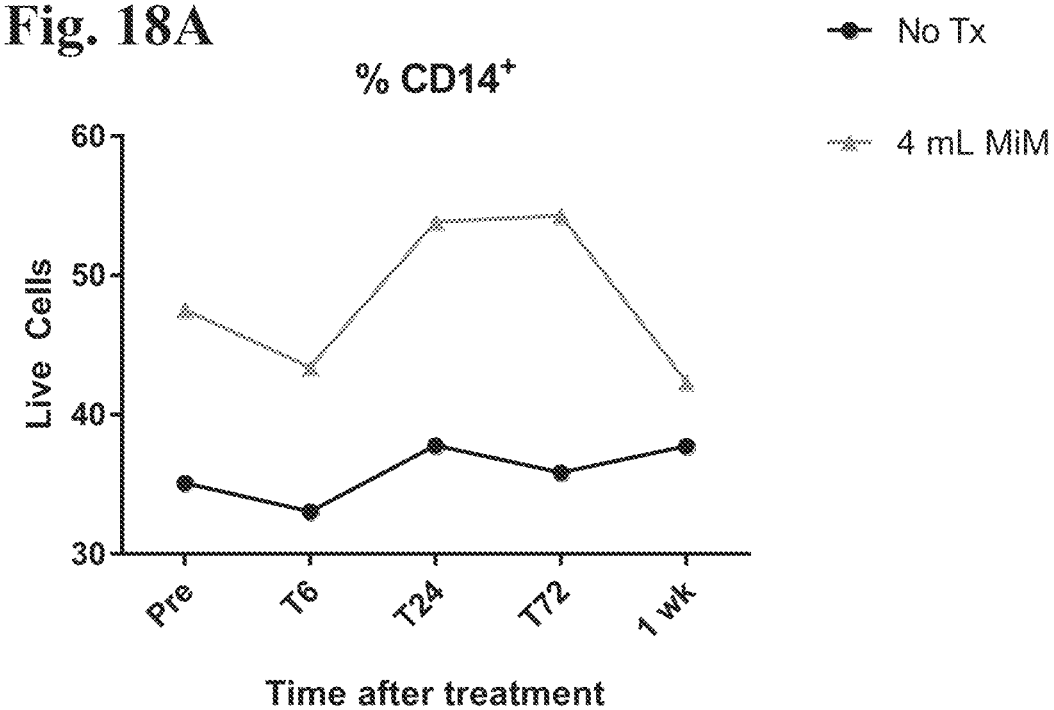
Figure 18B:
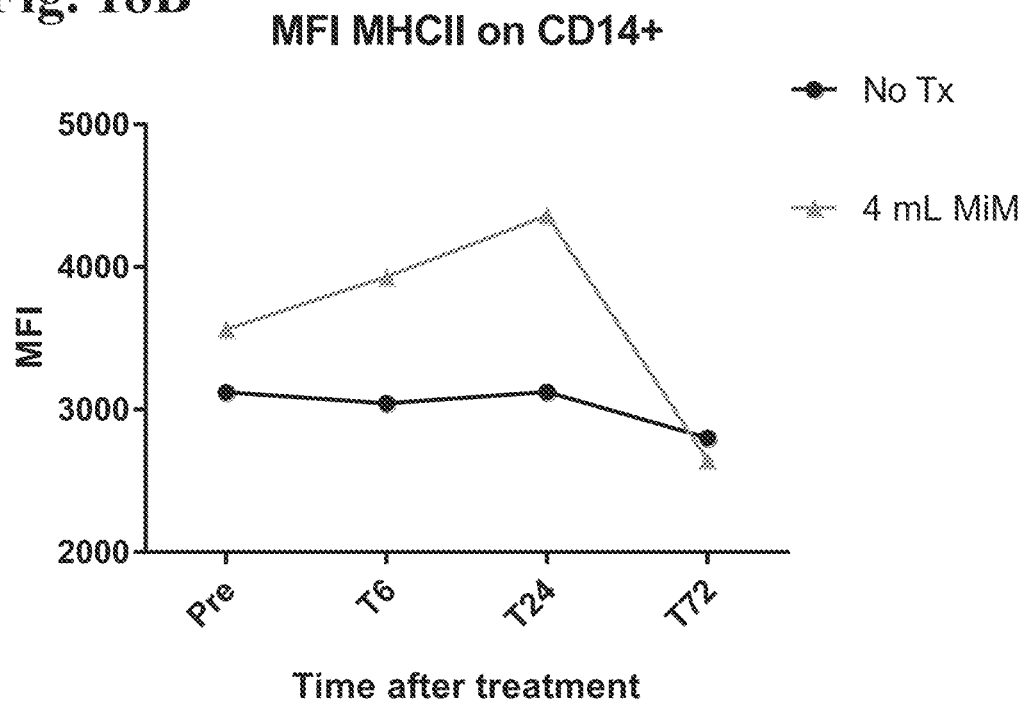

FIGS. 18A and 18B illustrate exemplary data indicating the effects of intranasal immunogenic composition (e.g., PCT-01: MIM: CLDC+CMC) administration on monocyte recruitment (FIG. 18A) and immune activation (FIG. 18B) in cells from bovine nasopharyngeal swab specimens of some embodiments disclosed herein.

Figure 19:
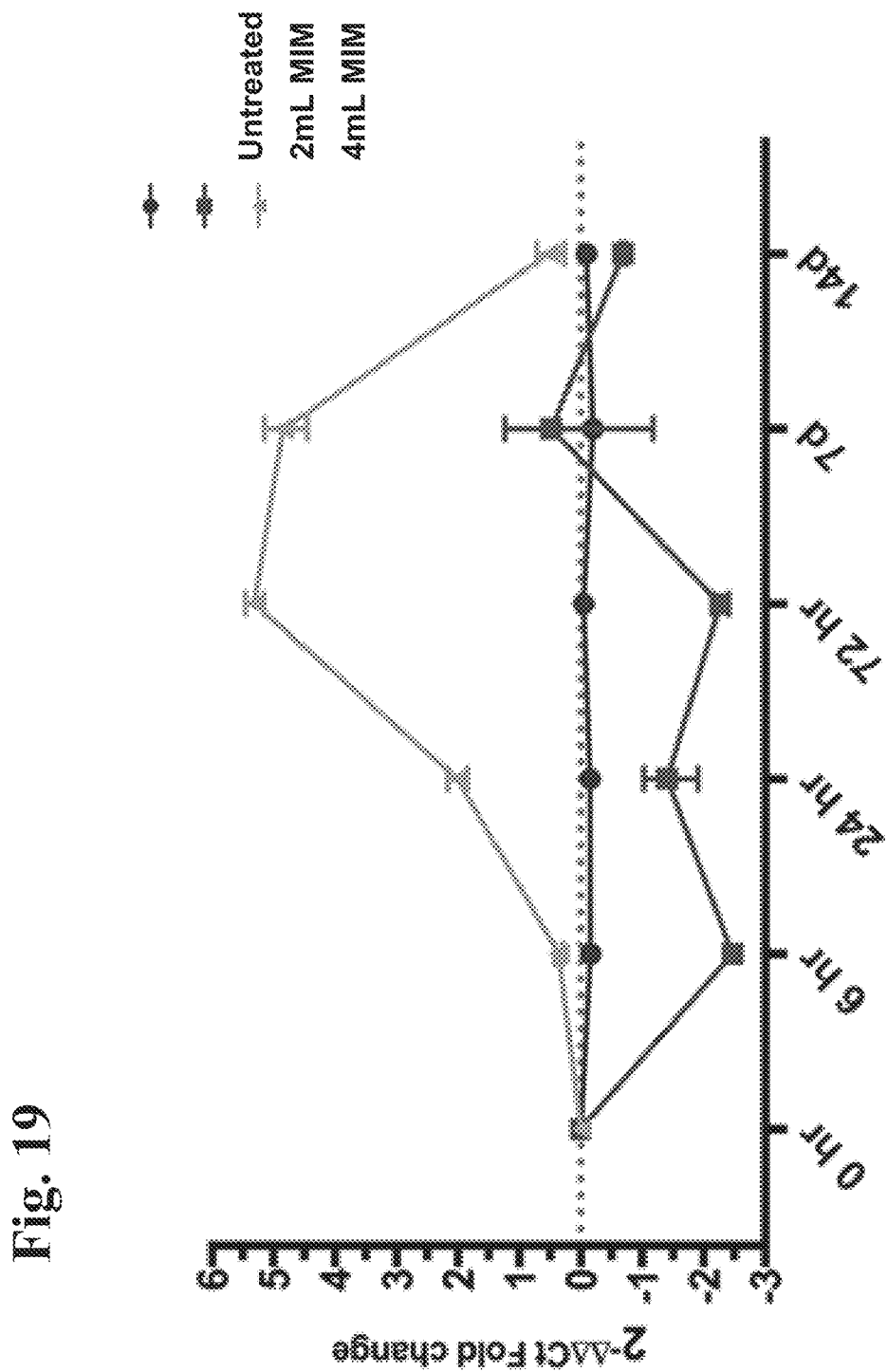

FIG. 19 illustrates exemplary qRT-PCR data indicating intranasal administration of an immunogenic composition (e.g., PCT-01: MIM: CLDC+CMC) stimulates production of the cytokine IL-8 by cells in the nasopharynx of cattle of some embodiments disclosed herein.

Figure 20:
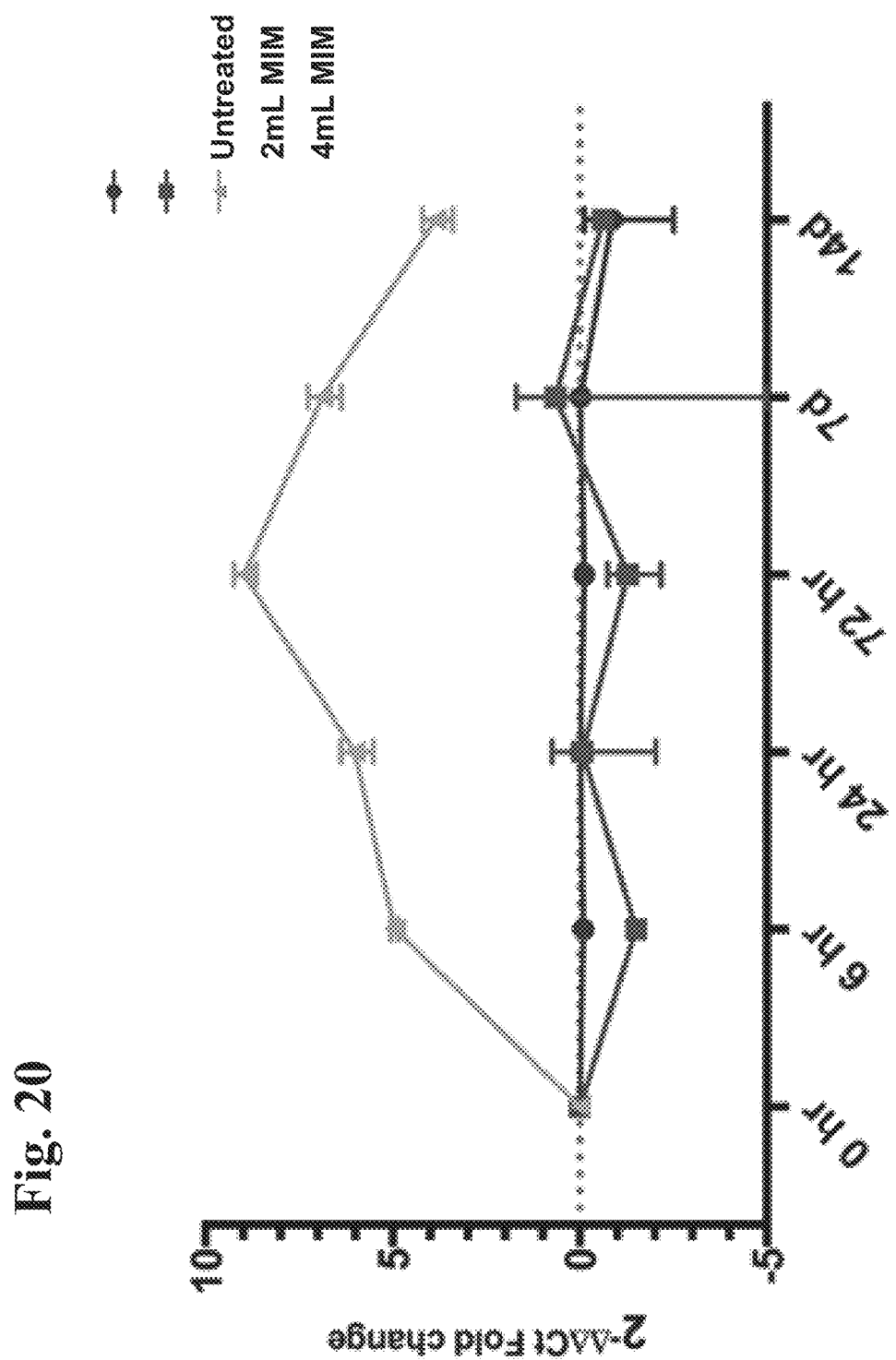

FIG. 20 illustrates exemplary qRT-PCR data indicating intranasal administration of an immunogenic composition (e.g., PCT-01: MIM: CLDC+CMC) stimulates production of the cytokine MCP-1 by cells in the nasopharynx of cattle of some embodiments disclosed herein.

Figure 21:
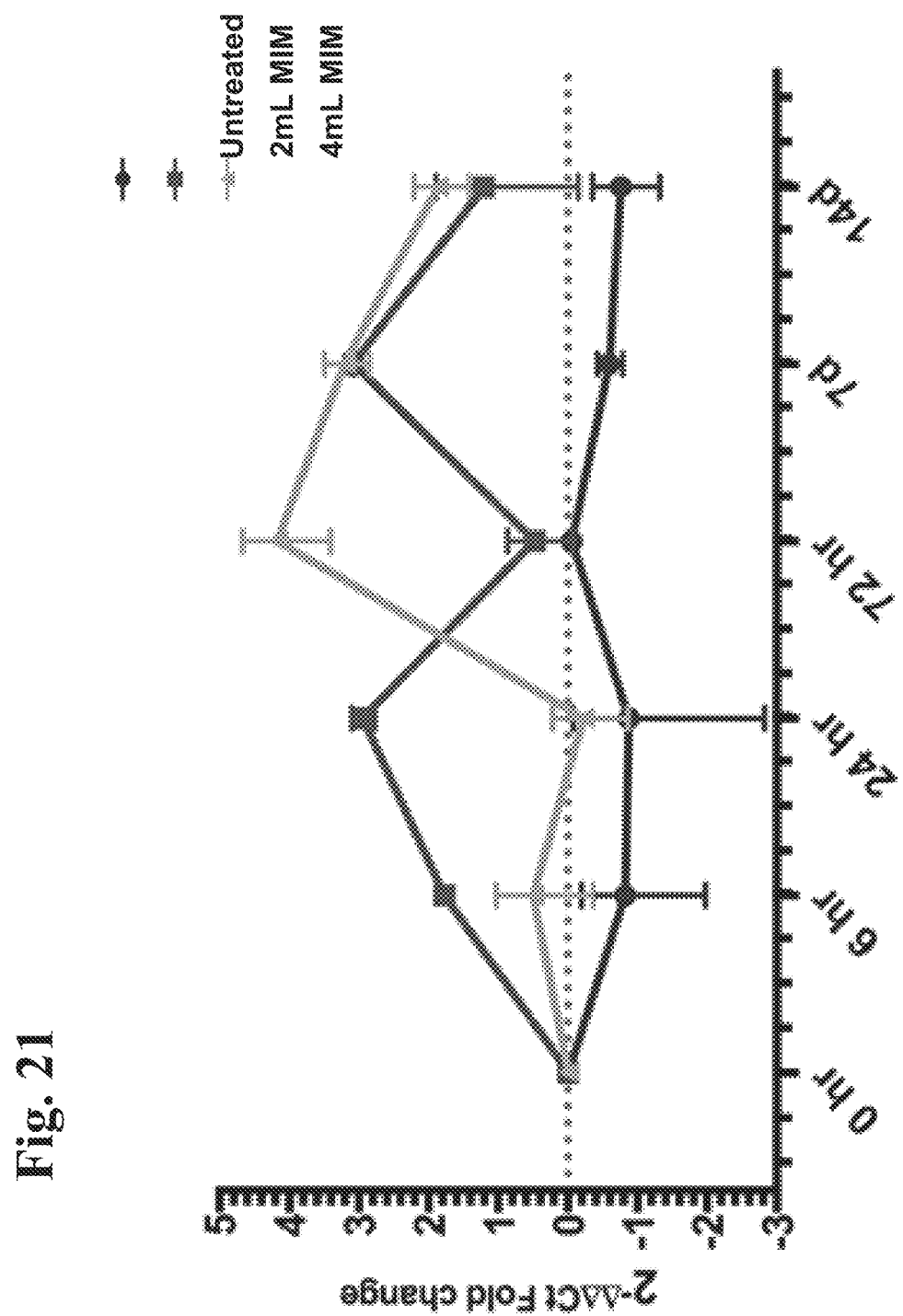

FIG. 21 illustrates exemplary qRT-PCR data indicating intra-nasal administration of an immunogenic composition (e.g., PCT-01: MIM: CLDC+CMC) stimulates production of the cytokine IFN-γ by cells in the nasopharynx of cattle of some embodiments disclosed herein.

Figure 22A:
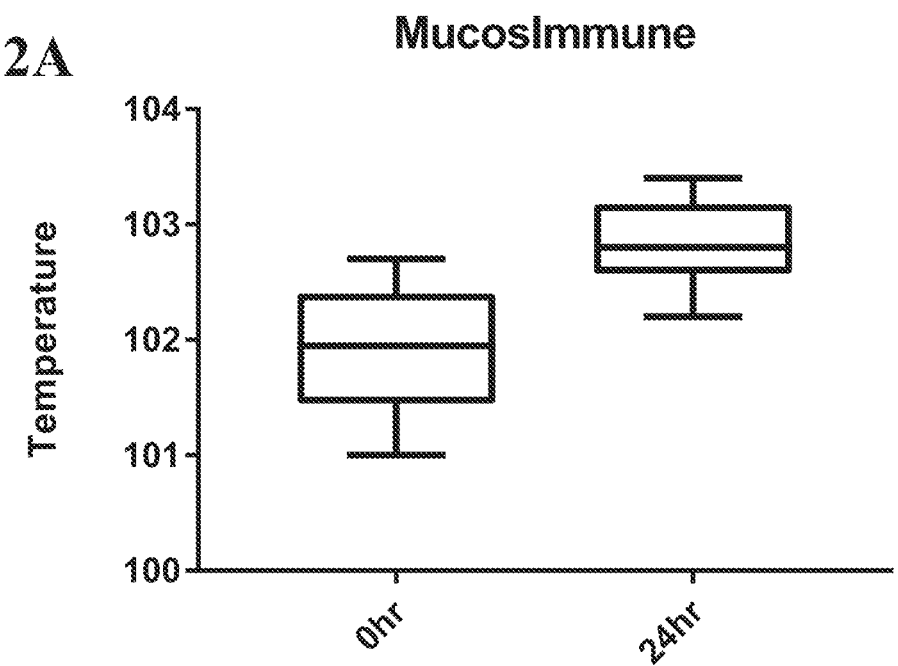
Figure 22B:
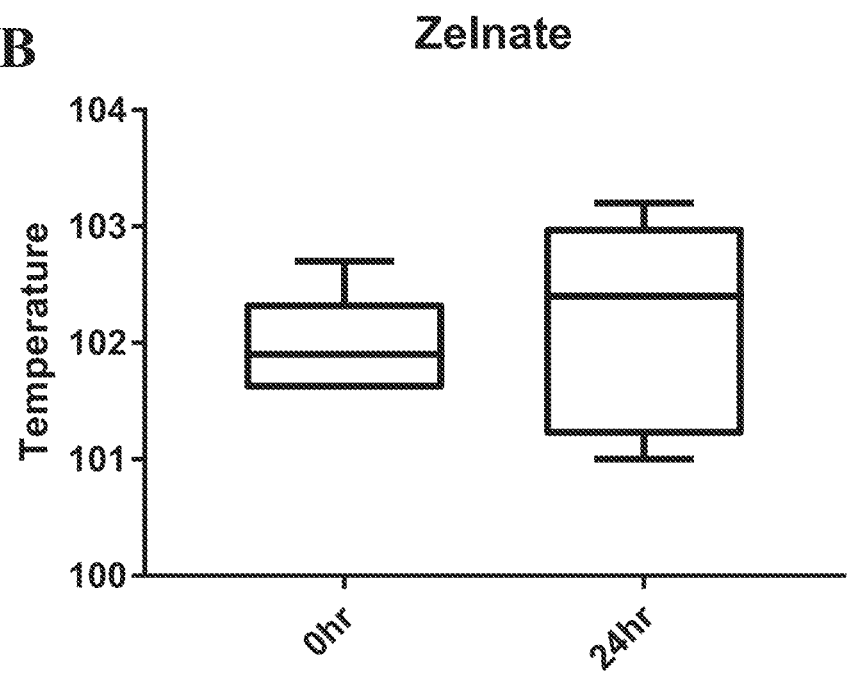

FIGS. 22A and 22B illustrates exemplary body temperature data in cattle following administration of an immunogenic composition (e.g., PCT-01: MIM: CLDC+CMC) (22A) or Zelnate™ (22B) of some embodiments disclosed herein.

Figure 23:
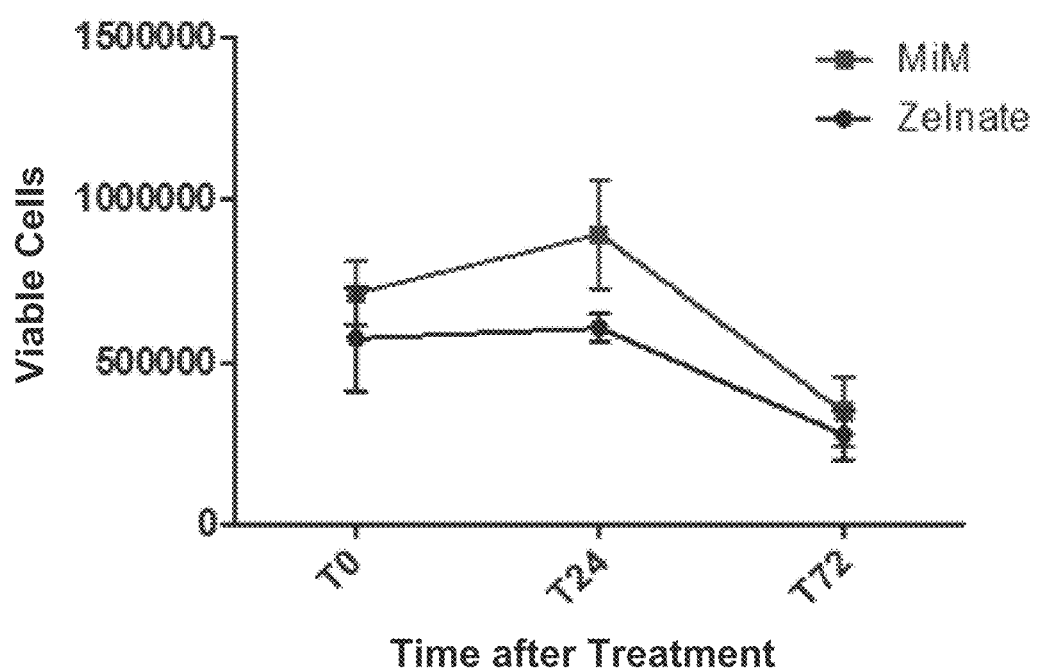

FIG. 23 illustrates exemplary data comparing immune activation of monocytes, as measured by total cell count, in the nasopharynx of cattle following intranasal administration of an immunogenic composition (e.g., PCT-01: MIM: CLDC+CMC) or intramuscular administration of Zelnate™ of some embodiments disclosed herein.

Figure 24:
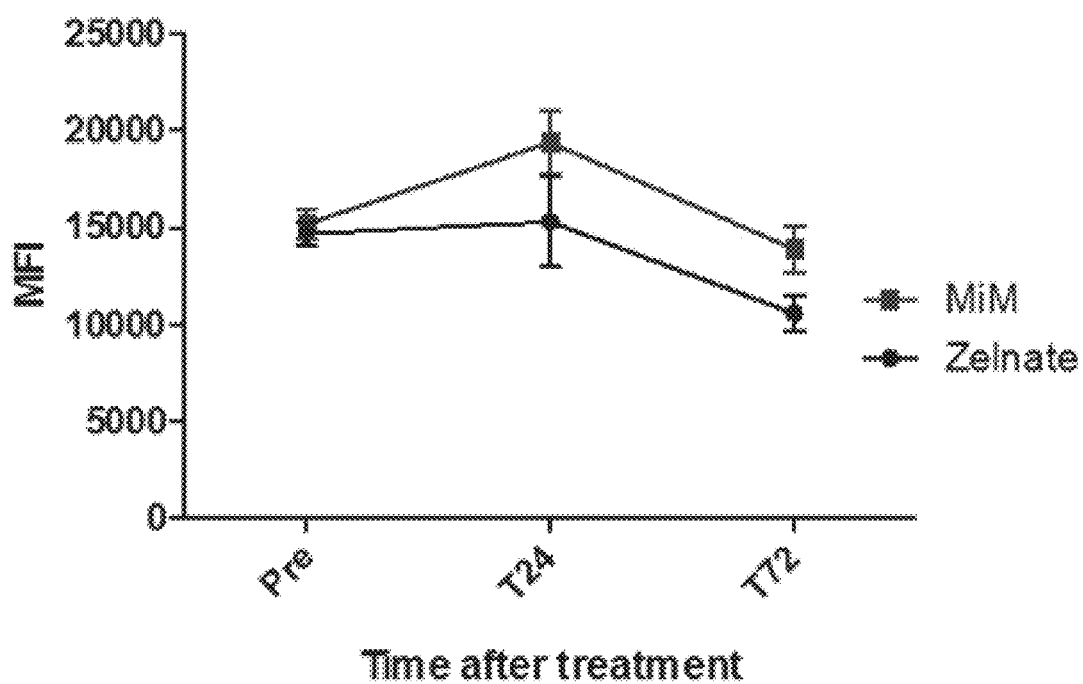

FIG. 24 illustrates exemplary data comparing immune activation of monocytes, as measured by upregulation of MHCII, in the nasopharynx of cattle following intranasal administration of an immunogenic composition (e.g., PCT-01: MIM: CLDC+CMC) or intramuscular administration of Zelnate™ of some embodiments disclosed herein.

Figure 25:
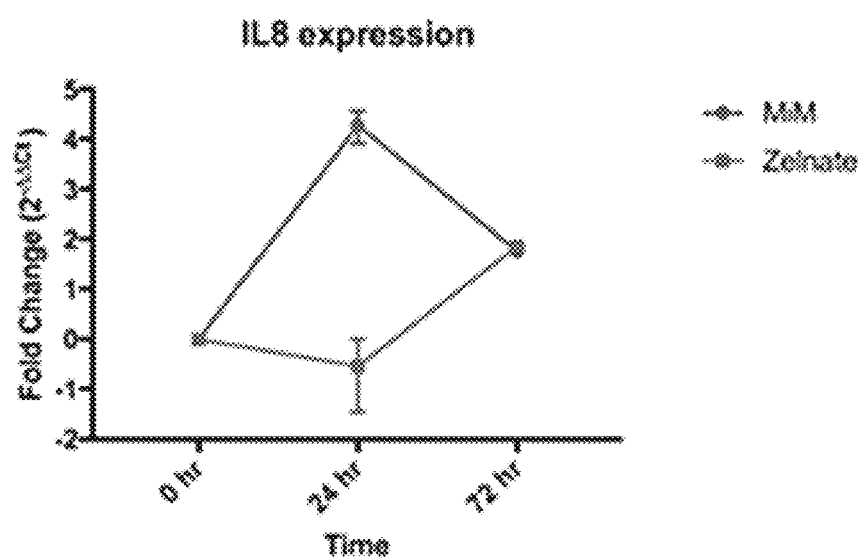

FIG. 25 illustrates exemplary qRT-PCR data from cattle indicating increased IL-8 expression by an immunogenic composition (e.g., PCT-01: MIM: CLDC+CMC) treatment, compared to Zelnate™ treatment of some embodiments disclosed herein.

Figure 26:
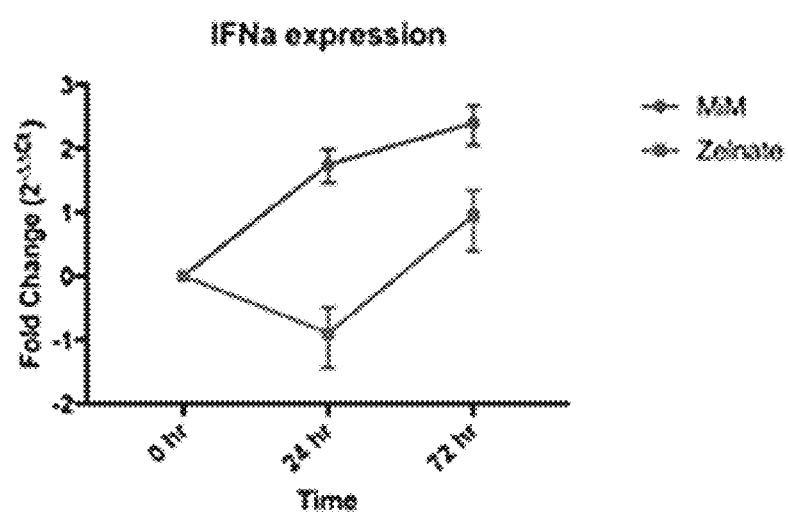

FIG. 26 illustrates an exemplary qRT-PCR data from cattle indicating increased INF-α expression by an immunogenic composition (e.g., PCT-01: MIM: CLDC+CMC) treatment, compared to Zelnate™ treatment of some embodiments disclosed herein.

Figure 27:
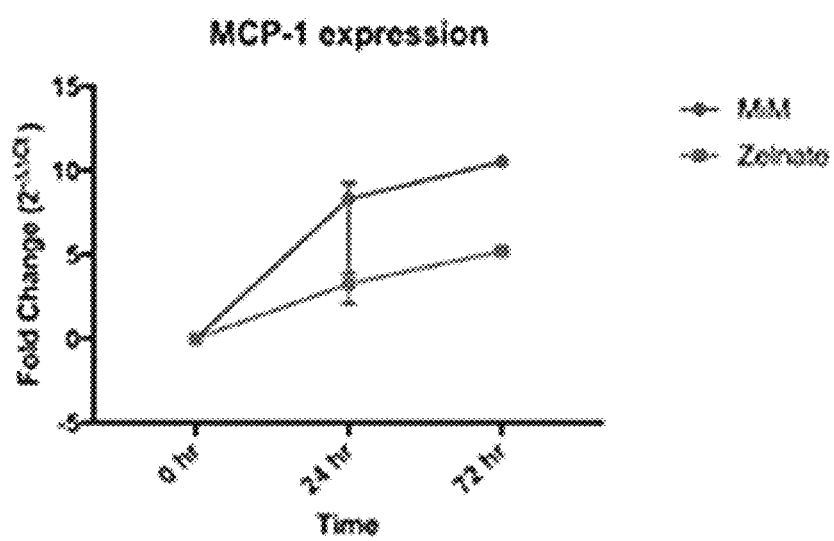

FIG. 27 illustrates an exemplary qRT-PCR data from cattle indicating increased MCP-1 expression by an immunogenic composition (e.g., PCT-01: MIM: CLDC+CMC) treatment, compared to Zelnate™ treatment of some embodiments disclosed herein.

Figure 28:
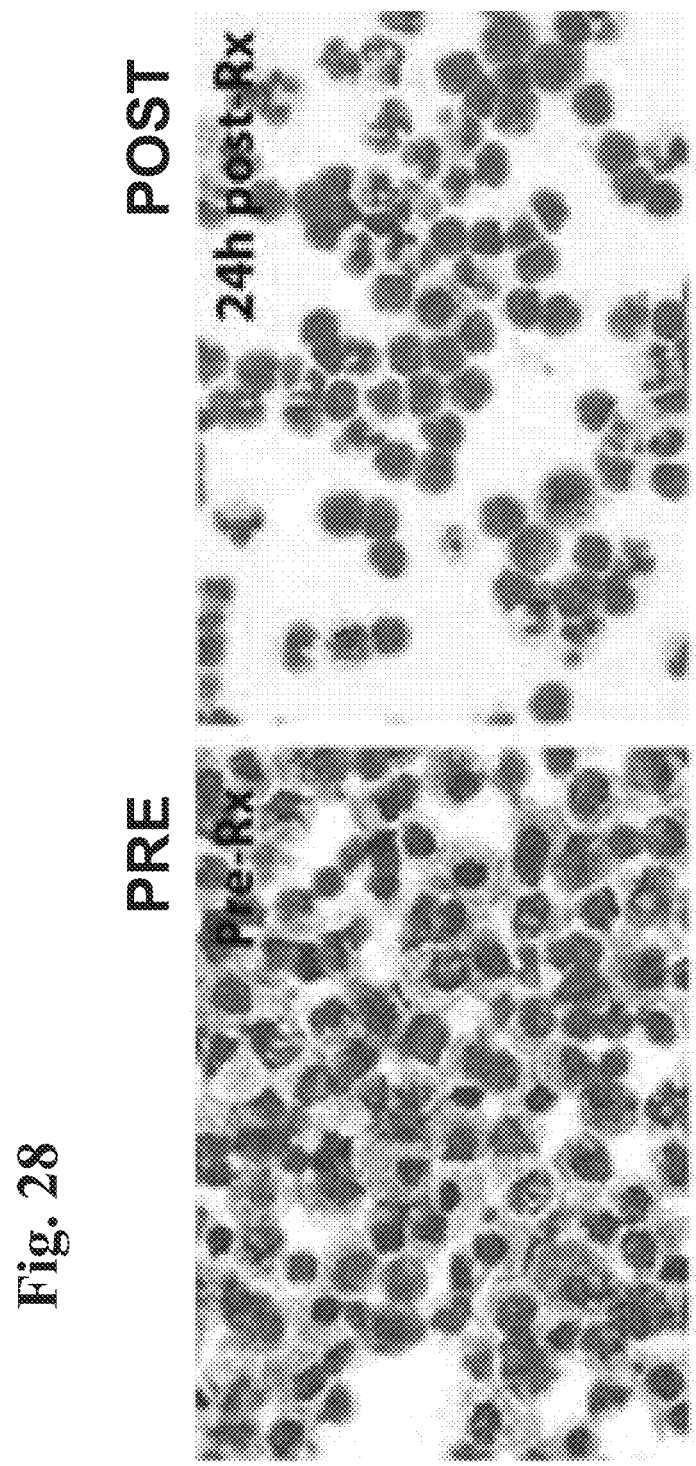

FIG. 28 illustrates exemplary images demonstrating increased infiltration of lymphocytes in milk samples following intramammary infusion of an immunogenic composition (e.g., PCT-01: MIM: CLDC+CMC) in dairy cattle of some embodiments disclosed herein.

Figure 29:
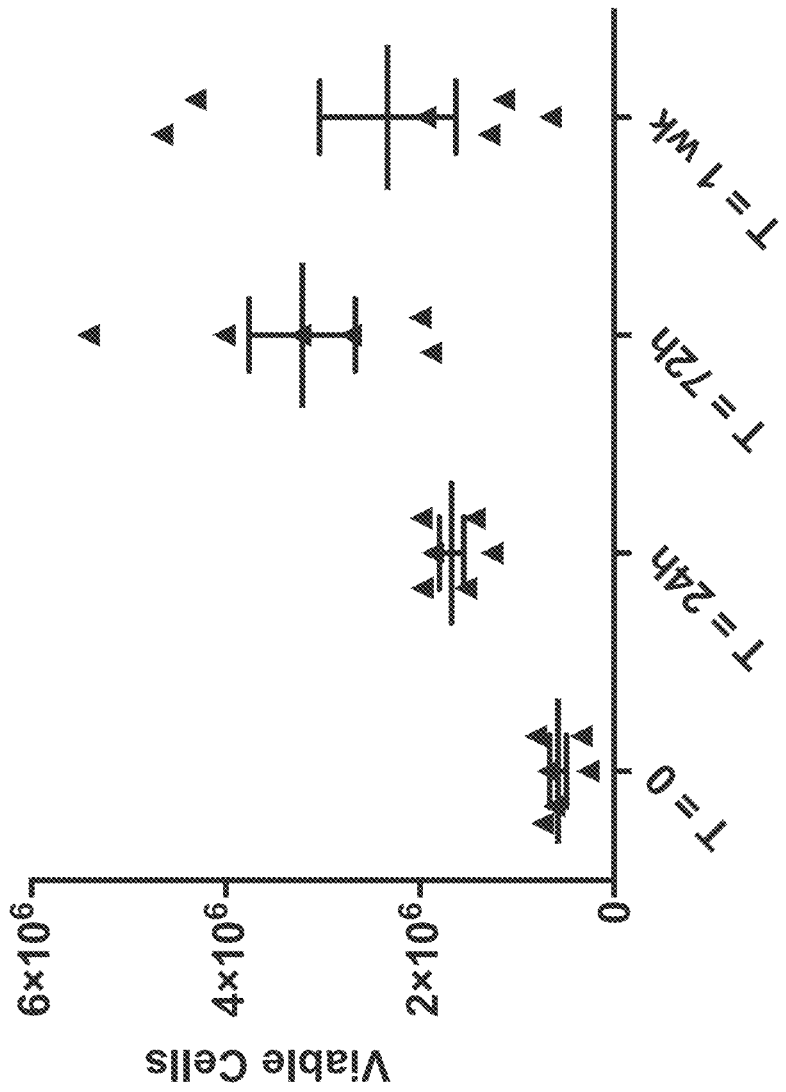

FIG. 29 illustrates exemplary cell count data demonstrating the cellular responses in the nasopharynx of goats following intranasal administration of an immunogenic composition (e.g., PCT-01: MIM: CLDC+CMC) of some embodiments disclosed herein.

Figure 30A:
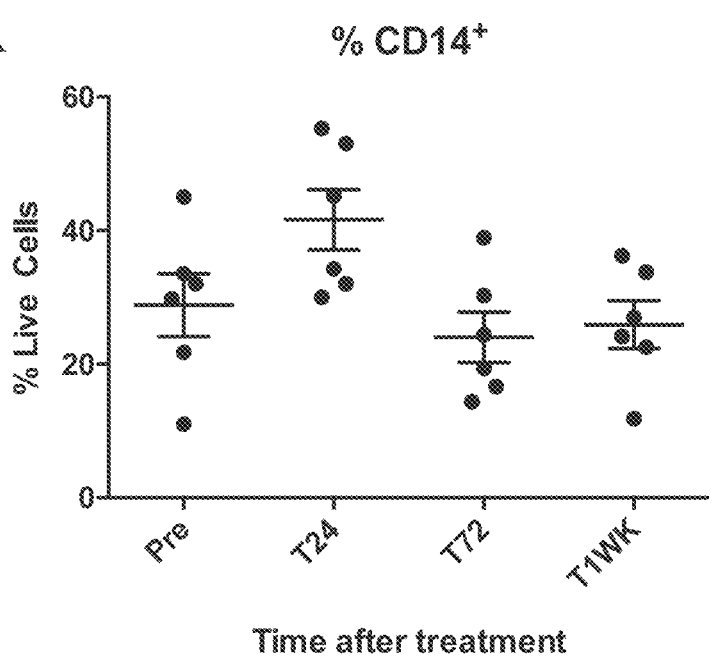
Figure 30B:
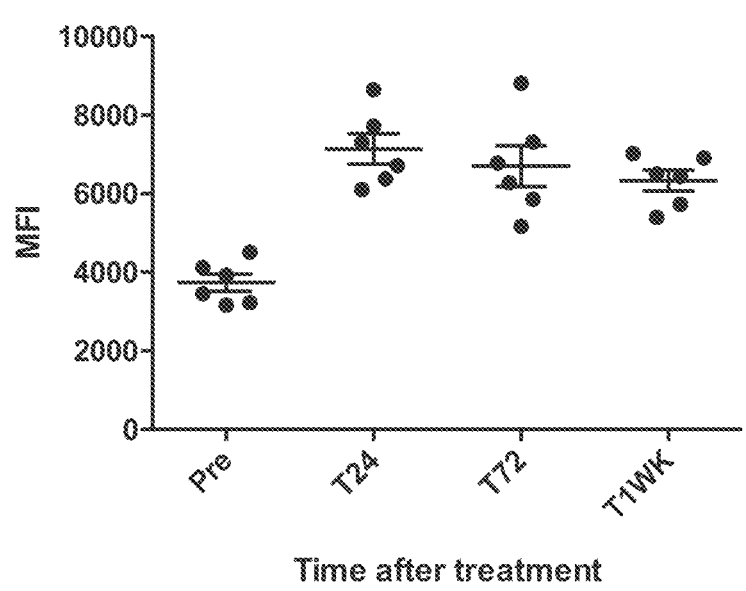

FIGS. 30A and 30B illustrate exemplary monocyte responses, as measured by cell count (30A), and cellular activation (30B), as measured by MHCII upregulation, following an immunogenic composition (e.g., PCT-01: MIM: CLDC+CMC) intranasal delivery in goats of some embodiments disclosed herein.

Figure 31:
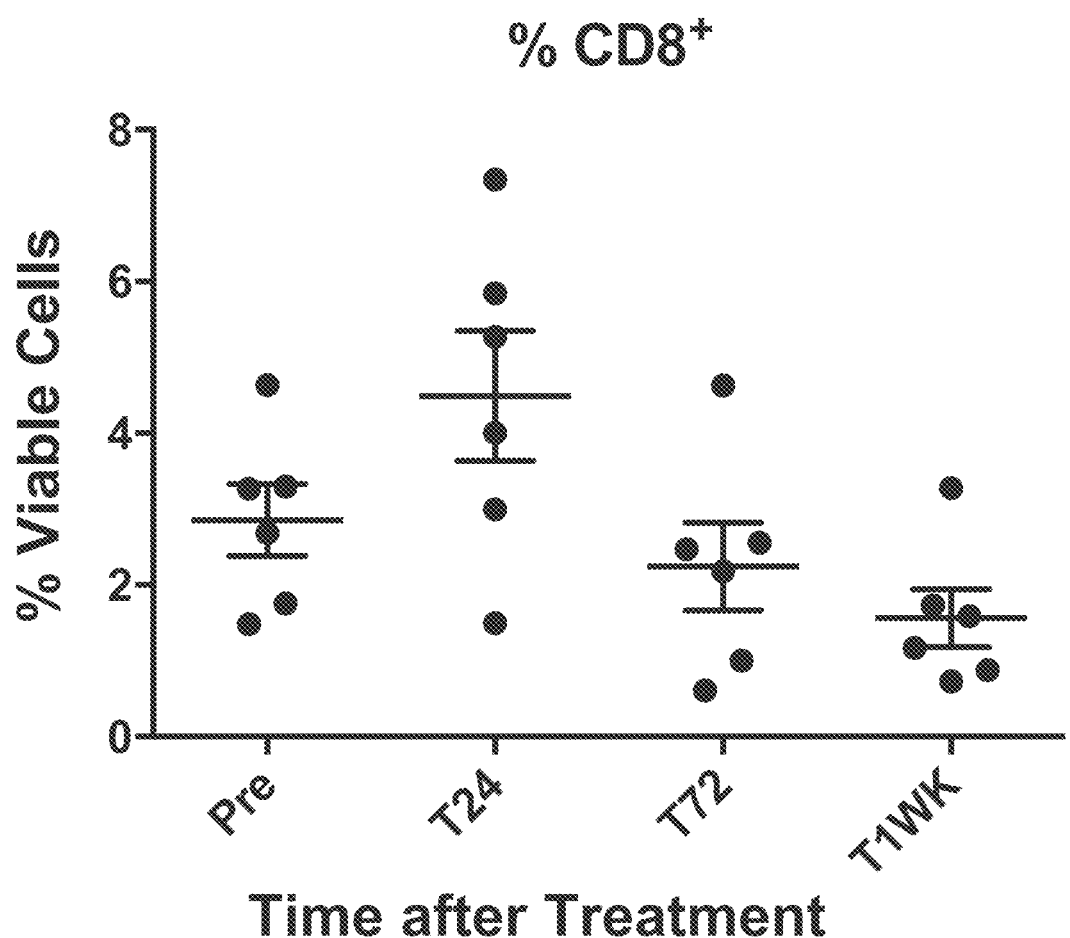

FIG. 31 illustrates an exemplary cell count data demonstrating recruitment of CD8+ T cells into nasopharynx of goats by an immunogenic composition (e.g., PCT-01: MIM: CLDC+CMC) intranasal administration of some embodiments disclosed herein.

Figure 32:
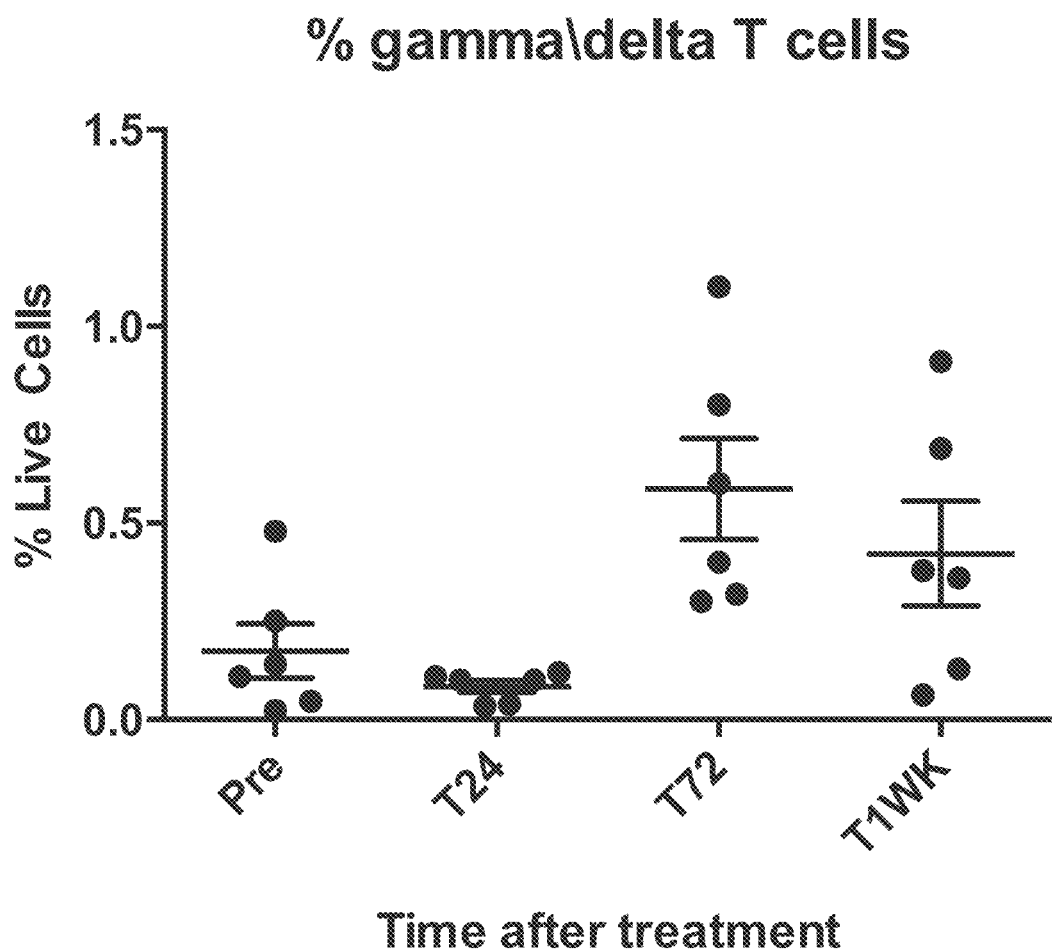

FIG. 32 illustrates an exemplary in vitro expansion of γδ-T cells in goat PBMC cultures following an immunogenic composition (e.g., PCT-01: MIM: CLDC+CMC) stimulation of some embodiments disclosed herein.

Figure 33:
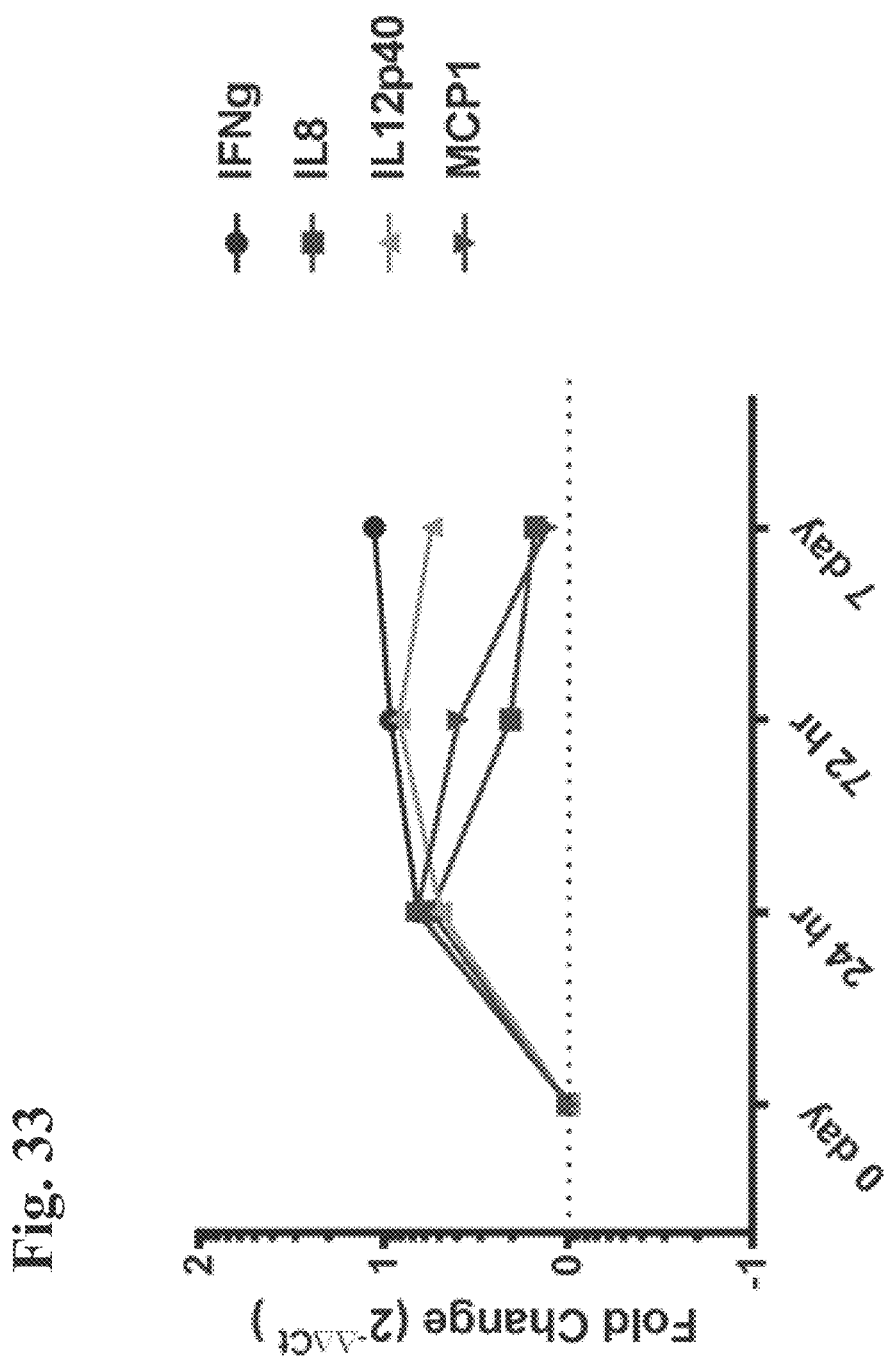

FIG. 33 illustrates an exemplary in vivo induction of mucosal immune responses in the oropharynx of dogs treated orally with an immunogenic composition (e.g., PCT-01: MIM: CLDC+CMC) of some embodiments disclosed herein.

Figure 34:
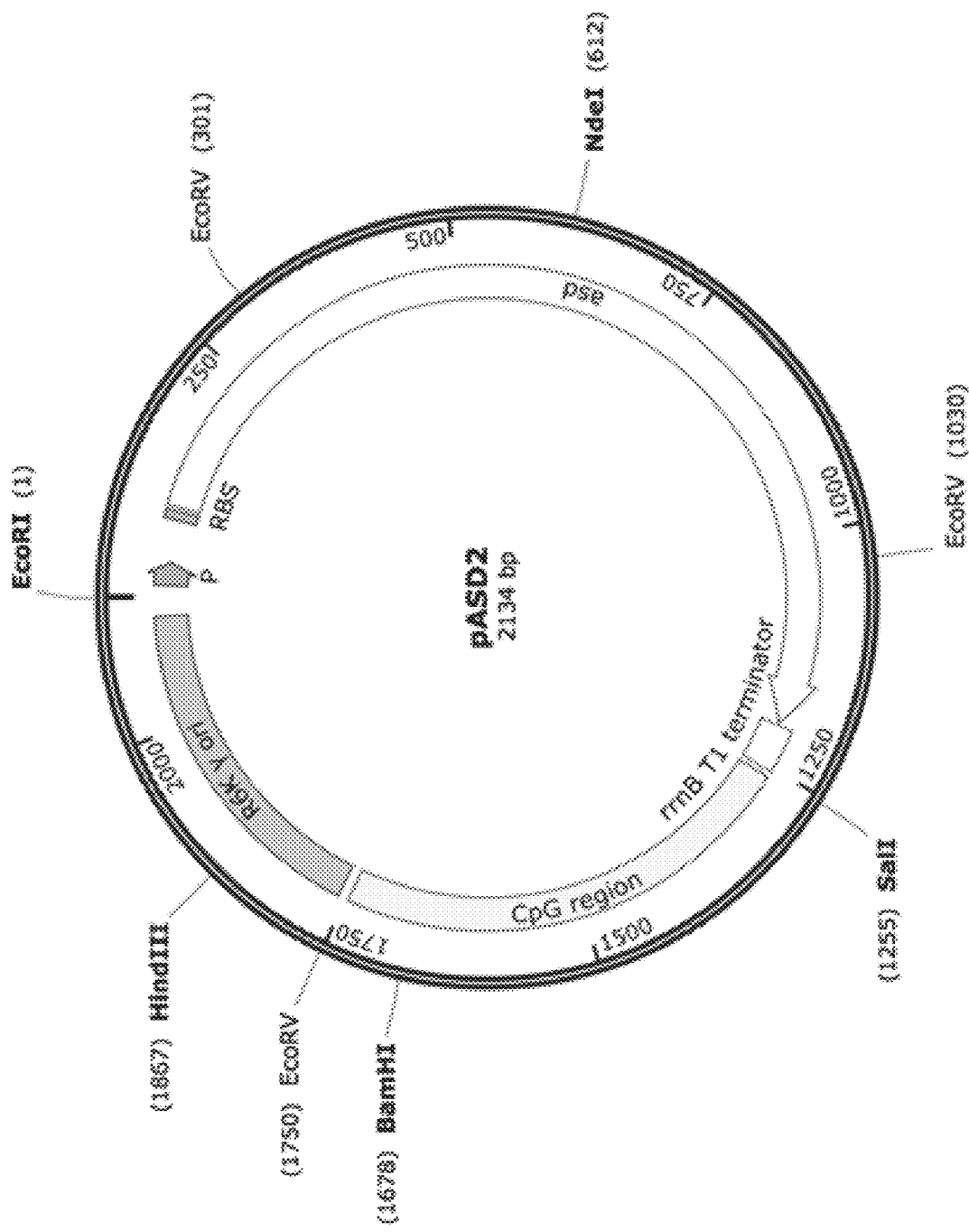
Figure 36A:
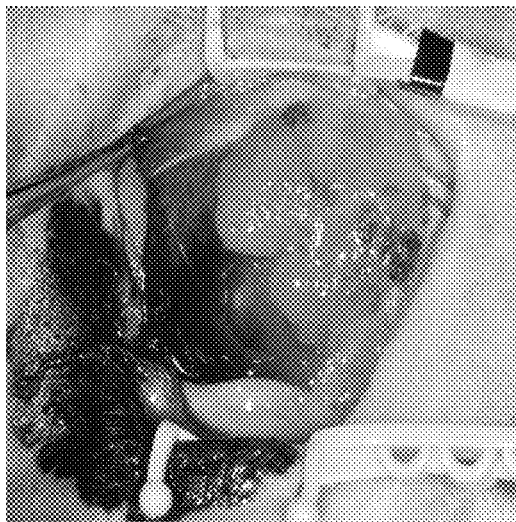
Figure 36B:
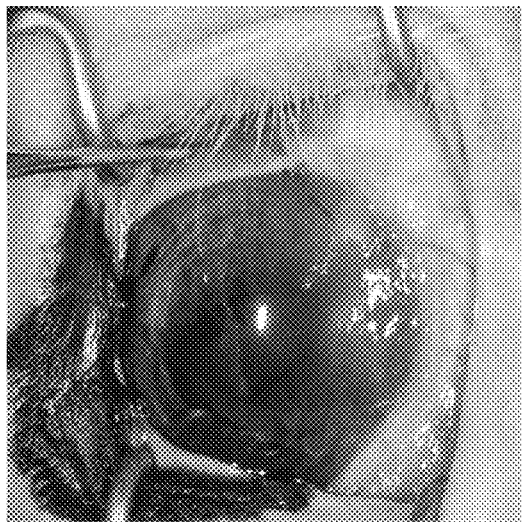
Figure 36C:
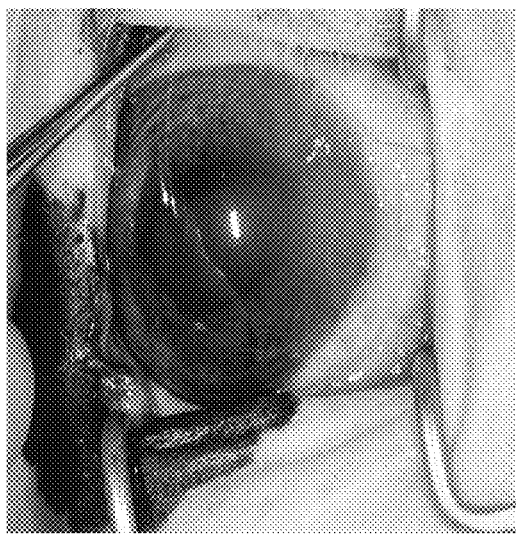
Figure 36D:
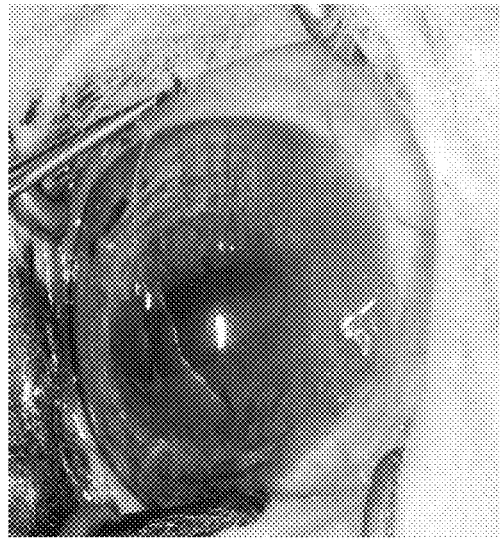

FIG. 34 illustrates an exemplary plasmid map of a TLR9 agonist, according to certain embodiments disclosed herein.

FIGS. 35A and 35B illustrate an exemplary response to certain immunogenic ocular compositions disclosed herein in an animal model having a viral infection of the eye before and after treatment according to certain embodiments of the instant invention.

FIGS. 36A-36D illustrate an exemplary response to certain immunogenic ocular compositions over time (36B-36D) and before treatment (36A) disclosed herein in an animal model having an eye tumor of the cornea according to certain embodiments of the instant invention.

FIGS. 37A-37D illustrate an exemplary response to topical treatment using certain immunogenic compositions over time (37B-37D) and before treatment (37A) compared to control (top, untreated) disclosed herein in an animal model having an eye tumor of the cornea according to certain embodiments of the instant invention.

Figure 38A:
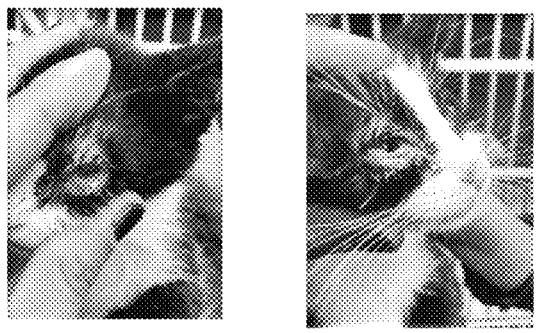
Figure 38B:
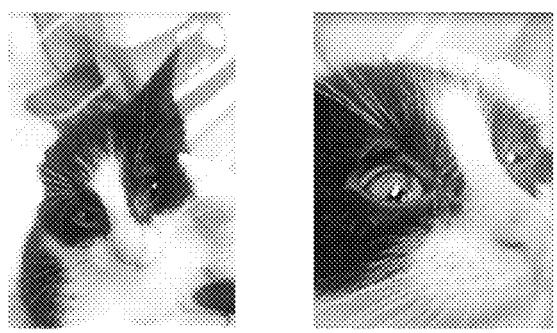

FIGS. 38A and 38B illustrate an exemplary response to topical treatment using certain immunogenic compositions to treat an infection in a mammal (feline). 38A is pre-treatment compared to 38B after a period of time to treat the eye of the mammal according to certain embodiments disclosed herein.

Figure 39A:
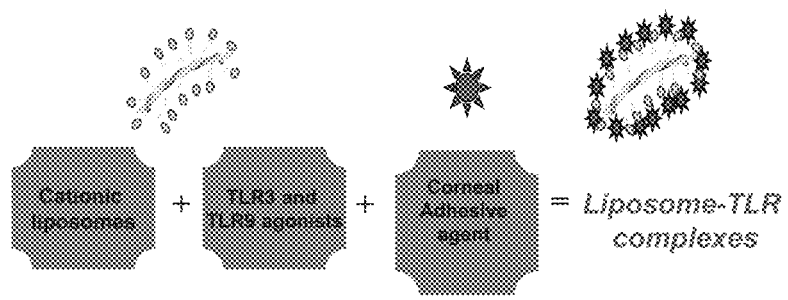
Figure 39B:
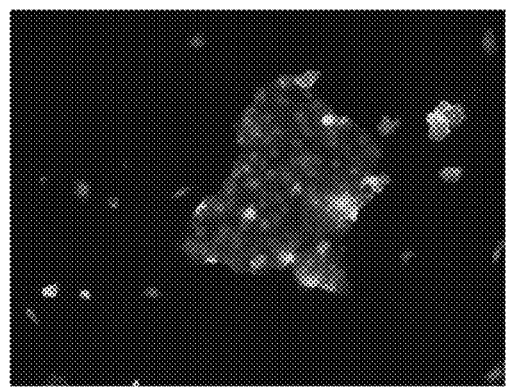

FIGS. 39A-39B illustrate in 39A, a schematic diagram of some components of certain immunogenic ocular formulations disclosed herein. 39B is a representative image of fluorescently labeled immunogenic ocular formulations introduced to a subject after being taken up by corneal epithelial cells in vitro according to certain embodiments disclosed herein.

Figure 40A:
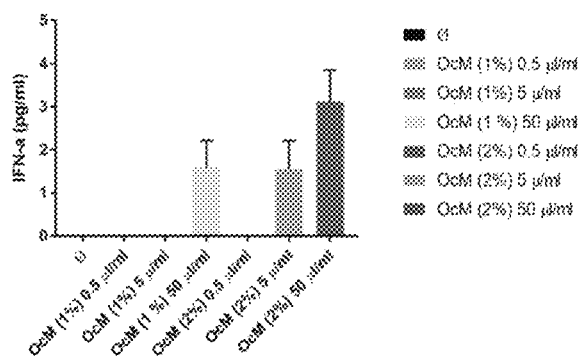
Figure 40B:
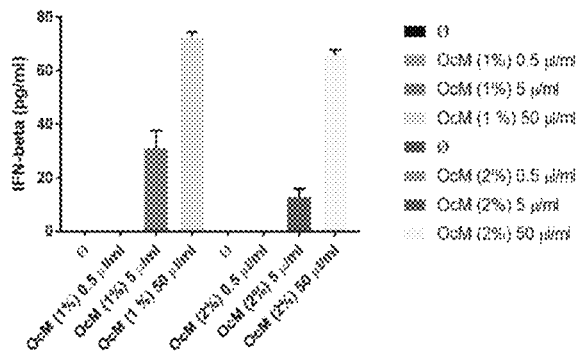

FIGS. 40A-40B represent histogram plots of induction of various cytokines in treated and untreated immune cell cultures with various immunogenic ocular formulations. 40A represents a histogram plot regarding induction of interferon-alpha and 40B represents a histogram plot regarding induction of interferon-beta according to certain embodiments disclosed herein.

Figure 41A:
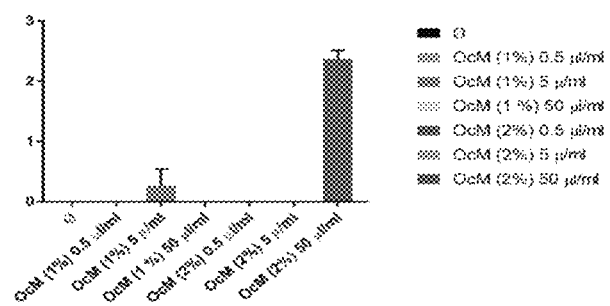
Figure 41B:
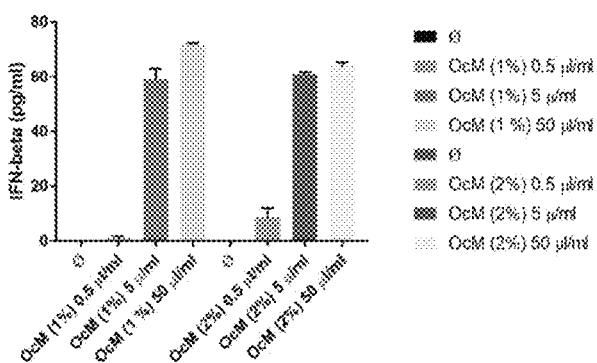

FIGS. 41A-41B represent histogram plots of induction of various cytokines in treated and untreated epithelial cell cultures. 41A represents a histogram plot regarding induction of interferon-alpha and 41B represents a histogram plot regarding induction of interferon-beta according to certain embodiments disclosed herein.

Figure 42:
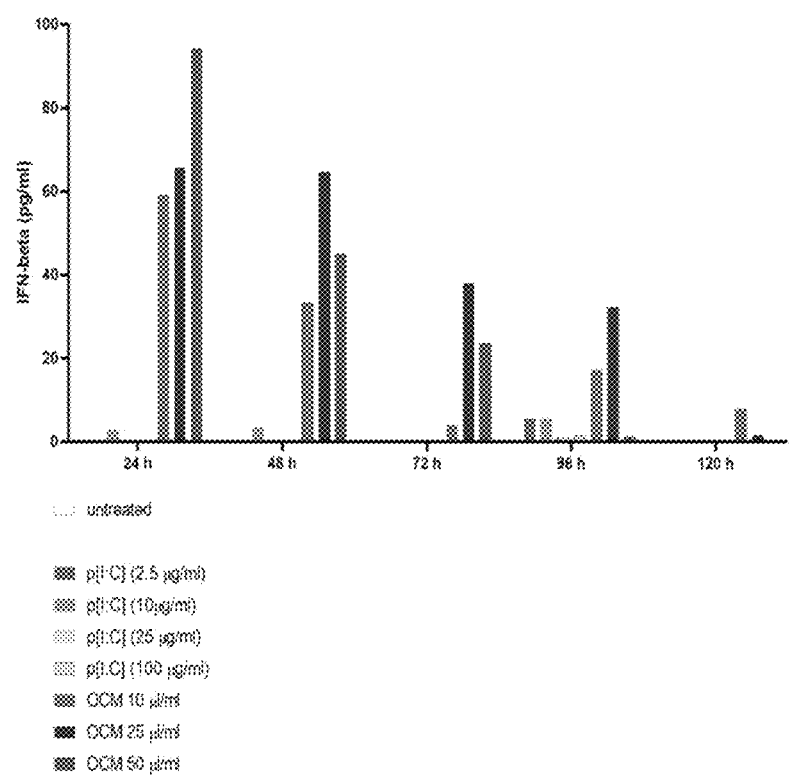

FIG. 42 represents a histogram plot comparing immune activation and sustainability of innate immune responses based on cytokine activation of a standard agent in comparison to disclosed immunogenic ocular formulations according to certain embodiments disclosed herein.

DESCRIPTION OF ILLUSTRATIVE EMBODIMENTS

Definitions

Unless defined otherwise, all technical and scientific terms used herein have the same meaning as understood by one of ordinary skill in the art to which the invention belongs.

As used herein, the term "effective amount" can refer to at least an amount effective, at dosages and for periods of time necessary, to achieve the desired result, e.g., enhance innate immune response, an enhanced immune response to an antigen. An effective amount can be provided in one or more administrations.

As used herein, the term "subject" or "individual" or "patient" refers to the target, e.g. human or an animal. A subject disclosed herein can be a vertebrate, such as human or other mammal, a fish, a bird, a reptile, or an amphibian. Alternatively, the subject can be a human, non-human primate, horse, pig, rabbit, dog, sheep, goat, cow, cat, guinea pig, deer, elk, fox, coyote, wolf, or rodent. In one aspect, the subject is a mammal. e.g., a human, or a companion animal (e.g., dog, cat, rodent, rabbit, etc.), a sport animal (e.g., horse, dog, bull, etc.), a farm or food animal (e.g., pig, cow, sheep, goat, etc.), livestock (e.g., donkeys, goats, guinea pigs, sheep, cattle, llamas, etc.), or any other mammalian veterinary animal, or to a bird (e.g., chicken, turkey, duck) or any other avian veterinary species, or other non-mammalian species such as farm-reared fish, or other species such as reptiles or amphibians.

As used herein, the singular form "a", "an", and "the" can include plural references unless indicated otherwise.

As used herein, "about" can include a value or parameter herein refers to the usual error range for the respective value readily known to the skilled person in this technical field. In particular embodiments, reference to about refers to a range within 10% higher or lower than the value or parameter, while in other embodiments, it refers to a range within 5% or 20% higher or lower than the value or parameter. Reference to "about" a value or parameter herein includes (and describes) aspects that are directed to that value or parameter per se. For example, description referring to "about X" includes description of "X."

As used herein, the term "modulating" can mean changing, and can include positively modulating, such as "increasing," "enhancing," "inducing" or "stimulating," as well as negatively modulating such as "decreasing," "inhibiting" or "reducing," typically in a statistically significant or a physiologically significant amount as compared to a control. An "increased," "stimulated" or "enhanced" amount is typically a "statistically significant" amount, and can include an increase that is 1.1, 1.2, 1.5, 2, 3, 4, 5, 6, 7, 8, 9, 10, 15, 20, 30 or more times (e.g., 500, 1000 times) (including all integers and decimal points in between and above 1, e.g., 1.5, 1.6, 1.7, 1.8, etc.) the amount produced by a control of no treatment as described herein or by a control treatment, can include all integers in between. A "decreased," "inhibited" or "reduced" amount is typically a "statistically significant" amount, that can include a 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%), 80%, 85%, 90%, 95%, or 100% decrease in the amount produced by a control of no treatment as described herein or by a control treatment, including all integers in between.

As used herein, "statistically significant," can mean that the result was unlikely to have occurred by chance. Statistical significance can be determined by any method known in the art. Commonly used measures of significance include the p-value, which is the frequency or probability with which the observed event would occur, if the null hypothesis were true. If the obtained p-value is smaller than the significance level, then the null hypothesis is rejected. In simple cases, the significance level is defined at a p-value of 0.05 or less.

As used herein, the term "adjuvant" can mean its conventional meaning, for example, the ability to enhance the immune response to a particular antigen or to enhance the immune response in general without an antigen. Such ability is manifested by a significant increase in immune-mediated protection. An enhancement of humoral immunity is typically manifested by a significant increase (usually >10%) in the titer of antibody raised to the antigen. Similarly, enhancement of cellular immunity is typically manifested by a significant increase (usually >10%) in the number of responding CD8+ or CD4+ T cells. The term "about" in relation to a numerical value x means, for example, x+/− 10%.

As used herein, the terms "optional" or "optionally" can mean that the subsequently described event or circumstance can or cannot occur, and that the description includes instances where said event or circumstance occurs and instances where it does not.

As used herein, the term "concurrently" as used herein can refer to administration of two or more therapeutic agents, where at least part of the administration overlaps in time. Accordingly, concurrent administration includes a dosing regimen when the administration of one or more agent(s) continues after discontinuing the administration of one or more other agent(s). In certain embodiments, an antigen can be administered concurrently with an immunogenic composition of the present invention. In other embodiments, and immunogenic composition of use in an eye of a subject can be used alone or concurrently or sequentially with another treatment for an eye infection, eye-related tumor and/or chronic ulcer of the eye.

As used herein, the terms "cancer" and "cancerous" can refer to or describe the physiological condition in mammals that is typically characterized by unregulated cell growth. Included in this definition are benign, metastatic and/or malignant cancers as well as dormant tumors or micrometastases. Examples of cancer include but are not limited to, carcinoma, lymphoma, blastoma, sarcoma, and leukemia. More particular examples of such cancers include squamous cell cancer, lung cancer (including small-cell lung cancer, non-small cell lung cancer, adenocarcinoma of the lung, and squamous carcinoma of the lung), cancer of the peritoneum, hepatocellular cancer, gastric or stomach cancer (including gastrointestinal cancer), pancreatic cancer, glioblastoma, cervical cancer, ovarian cancer, liver cancer, bladder cancer, hepatoma, breast cancer, colon cancer, colorectal cancer, endometrial or uterine carcinoma, salivary gland carcinoma, kidney or renal cancer, liver cancer, prostate cancer, vulval cancer, thyroid cancer, hepatic carcinoma and various types of head and neck cancer, as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL;

mantle cell lymphoma; AIDS-related lymphoma; and Waldenstrom's Macroglobulinemia); chronic lymphocytic leukemia (CLL); acute lymphoblastic leukemia (ALL); Hairy cell leukemia; chronic myeloblasts leukemia; and post-transplant lymphoproliferative disorder (PTLD), as well as abnormal vascular proliferation associated with phakomatoses, edema (such as that associated with brain tumors), and Meigs' syndrome.

As used herein, the term "Poly(I:C)" (polyinosinic-polycytidylic acid) is an agent that can be recognized by TLR3. This recognition leads to induction and activation of NF-kB and the production of certain cytokines. Poly(I:C) is composed of a strand of poly(I) annealed to a strand of poly(C). The size of the strands can vary. (e.g. InvivoGen and other manufacturers provide poly(I:C). There are at least 2 different sizes: Poly(I:C) (HMW) with a high molecular weight has an average size of about 1.5 kb to about 8.0 kb, and Poly(I:C) (LMW) with a low molecular weight of about 0.2 kb to about 1 kb. It is contemplated that any of these agents are useful in immunogenic compositions disclosed herein.

As used herein, the term "CpG oligodeoxynucleotides" (CpG ODN; CpG oligos) are short single-stranded synthetic DNA molecules that contain a cytosine triphosphate deoxynucleotide ("C") followed by a guanine triphosphate deoxynucleotide ("G"). The "p" refers to the phosphodiester link between consecutive nucleotides, although some ODN have a modified phosphorothioate (PS) backbone instead. When these CpG motifs are unmethylated, they act as immunostimulants CpG motifs are considered pathogen-associated molecular patterns (PAMPS) due to their abundance in microbial genomes but their rarity in vertebrate genomes. The CpG PAMP is recognized by the pattern recognition receptor (PRR) Toll-Like Receptor 9 (TLR9), in mammals and avian and fish species.

As used herein, the term "PCT-01" or the term "MIM" refers to solution of a complex that includes cationic liposomes, non-coding plasmid DNA, polyinosinic-polycytidylic acid (polyI:C), and low and/or medium viscosity (and in certain embodiments, low and/or medium molecular weight) adhesion agents of carboxymethylcellulose (CMC) in a diluent for in vitro and in vivo studies.

As used herein "Non-coding plasmid DNA" can include bacterial replication elements in a circular arrangement. The DNA in plasmids can act as an immunostimulant recognized for example, by the pattern recognition receptor (PRR) Toll-Like Receptor 9 (TLR9), which is expressed in mammals and avian species. In addition, these non-coding plasmids can be engineered to overexpress CpG motifs. In the instant case, the plasmid does not code for any known mammalian genes, and instead codes for several "islands" of CpG motifs (oligonucleotides) engineered into the plasmid to increase its immune stimulatory properties. "CpG oligodeoxynucleotides" (CpG ODN; CpG oligos) are short single-stranded synthetic DNA molecules that contain a cytosine triphosphate deoxynucleotide ("C") followed by a guanine triphosphate deoxynucleotide ("G"). The "p" refers to the phosphodiester link between consecutive nucleotides, although some ODN have a modified phosphorothioate (PS) backbone instead.

DETAILED DESCRIPTION OF THE INVENTION

In the following sections, various exemplary compositions and methods are described in order to detail various embodiments of the invention. It will be obvious to one skilled in the art that practicing the various embodiments does not require the employment of all or even some of the specific details outlined herein, but rather that concentrations, times and other specific details may be modified through routine experimentation. In some cases, well known methods, or components have not been included in the description.

The instant disclosure relates, in part, to improved immunostimulatory compositions, which may be used to induce a non-specific, protective mucosal immune response or other non-specific immune response. In some embodiments, the improved immunostimulatory compositions can be used to treat an eye condition.

In certain embodiments, compositions disclosed herein include improved immunostimulatory compositions. In accordance with these embodiments, immunostimulatory or immunogenic compositions designed to more effectively stimulate local immune responses at mucosal and epithelial surfaces of a subject are disclosed. In accordance with these embodiments, these immunogenic compositions improve properties of a previously developed immunotherapeutic (e.g. cationic-liposome DNA complexes; CLDC). In some embodiments, immunogenic compositions disclosed herein have improved adhesion properties. For example, immunogenic compositions disclosed herein have improved properties, including but not limited to, adhesion to mucosal surfaces, increased potency of immune activation, and duration of immune activation.

In some embodiments, mucosal immune stimulation and adhesion technology disclosed herein provides significant improvement over previously disclosed CLDC technology, which in itself is a potent immune stimulant. In certain embodiments, immunogenic compositions of the instant invention provide for improved induction of mucosal immune responses (greater potency, longer duration of activity) when compared to previously disclosed cationic liposome-DNA complex (CLDC) formulations.

Some embodiments disclosed herein include immunogenic compositions including at least one of (a) cationic liposomes, at least one (b) toll like receptor (TLR) or mixture thereof, and at least one (c) cellular adhesion agent. Toll-like receptors (TLRs) are conserved pattern recognition receptors expressed on multiple types of cells, including monocytes, dendritic cells, B cells, and macrophages, and play a vital role in modulation of the innate immune system. In certain embodiments, the TLRs include but are not limited to, TLR1, TLR2, TLR3, TLR4, TLR5, TLR6, TLR7, TLR8, TLR9, and TLR10. In other embodiments, TLRs of use in immunogenic compositions disclosed herein include, but are not limited to, TLR3 and TLR9 ligands alone or in combination. In other embodiments, cationic liposomes can include, but are not limited to, a mixture of cationic lipid and non-charged lipids known in the art. Any cationic lipid is contemplated herein alone or in combination with any known non-charged lipid. In accordance with these embodiments, a mixture of cationic lipid and non-charged lipids can include a mixture of DOTAP and cholesterol. In certain embodiments, DOTAP and cholesterol can be about a 1:1 molar ratio or about a 2:1 or about a 1:2 or about 1.5:1 or about 1:1.5 or 1:3 or 3:1 or similar ratio. In some embodiments, the mixture of cationic lipid and non-charged lipids can include at least one of, non-coding plasmid DNA and polyI:C. In other embodiments, the non-coding plasmid DNA can include a polynucleotide represented by the nucleic acid sequence, SEQ ID NO. 1 or fragment thereof. In yet other embodiments, the mixture of cationic lipid and non-charged lipids can include plasmid DNA and polyI:C in about a 1:1 ratio (by weight) or about a 2:1; or about a 1:2; or about a 1.5:1; or about a 1:1.5 or similar ratio. In certain embodiments, the cellular adhesion agent in an immunogenic composition disclosed herein can be a low- to mid-weight viscosity adhesion agent. In some embodiments, the low- to mid-weight viscosity adhesion agent is carboxymethylcellulose (CMC). In some embodiments, carboxymethylcellulose can be present in an immunogenic composition disclosed herein at about 1% to about 20% (v/v). Certain immunogenic compositions disclosed herein can include complexes of the cationic liposomes and any TLR3 and/or TLR9 ligands known in the art. In other embodiments, complexes disclosed herein can include about 10 μg to about 200 μg TLR ligand per milliliter cationic liposomes or about 1 μg to about 500 μg TLR ligand per milliliter cationic liposomes. In some embodiments, cationic liposomes can be present at about 1 to about 20 mM concentration in an immunogenic composition disclosed herein. In some alternative embodiments, immunogenic composition can further include an antigen. In some embodiments, the antigen can be a protein antigen. In other embodiments, the antigen can be derived from a virus, bacterium, prion, fungus, a toxin, a tumor-related antigen or other protein or non-protein antigen. In accordance with these embodiments, immunogenic compositions disclosed herein in combination with a targeted antigen can be used to induce an improved innate immune response compared to an antigen without an immunogenic composition of the instant application against the antigen. In certain embodiments, an enhanced innate immune response includes a local or regional response at the site of introducing the immunogenic compositions.

In other embodiments, methods for inducing an innate immune response in a subject are disclosed. In certain embodiments, methods are disclosed for inducing an innate immune response in a subject having an infection or other condition. In accordance with these embodiments, methods can include, but are not limited to, providing to a subject and immunogenic composition disclosed herein. In certain embodiments, the immunogenic composition disclosed herein can include: (a) at least one cationic liposome; (b) one or more TLR ligands (e.g. a mixture of toll like receptor 3 (TLR3) and toll like receptor 9 (TLR9) ligands); and/or (c) one or more cellular adhesion agent.

In some embodiments, an infection is caused by a virus, bacterium, fungus, prion or protozoan. In certain embodiments, the condition in a subject includes a respiratory infection and wherein the immunogenic compositions are administered to the lungs of the subject to treat the infection. In accordance with these embodiments, an immunogenic composition disclosed herein can include a polynucleotide represented by SEQ ID NO. 1 and the TLR ligand polyI:C.

In some embodiments, an immunogenic composition disclosed herein can be provided to the subject prior to the risk of or exposure to an infection and/or within 24 hours to a week or more after exposure, during early onset of clinical signs of an infection, or during chronic infection. In accordance with these embodiments, the immunogenic composition is capable of inducing a local, non-specific immune response at a site of administration or at the delivery site after administration (e.g. the lungs). In certain embodiments, immunogenic compositions disclosed herein can be administered to the subject at the site of a wound, an infection or other condition or alternatively, administered to induce a systemic non-specific immune response. In certain subjects, immunogenic compositions disclosed herein can be administered to the reproductive tract, the gastrointestinal tract, the mammary gland, to gills, to air sacs, to eyes, to ears, and to the nose of a subject in need of such a treatment. In yet further aspects, the composition can be administered without the concurrent administration of a vaccine or other known agent for the treatment or reducing onset of a condition.

Further, disclosed herein are embodiments directed to methods for inducing an immune response to an antigen in a subject, including providing to the subject a composition including: (a) at least one cationic liposome; (b) a mixture of toll like receptor 3 (TLR3) and toll like receptor 9 (TLR9) ligands; and (c) at least one cellular adhesion agent; and optionally, an antigen. In other embodiments, an immunogenic composition disclosed herein can be administered to the eye of a subject. In other embodiments, a composition including: (a) at least one cationic liposome; (b) a mixture of toll like receptor 3 (TLR3) and toll like receptor 9 (TLR9) ligands; and (c) at least one cellular adhesion agent can further include a high viscosity and/or high molecular weight (HMW) cellular adhesion agent. In accordance with these embodiments, immunogenic compositions further including a high viscosity and/or high molecular weight adhesion agent can be administered to a subject having a condition of the eye. In certain embodiments, an eye condition can include an infection, a tumor or a chronic injury or wound.

In other embodiments, an eye condition can include but are not limited to, an infection, a tumor, an eye injury, chronic wound or ulcer or similar condition of the eye thereof. In accordance with these embodiments, the eye condition can include a condition that affects the cornea or retina or other component of the eye. Certain embodiments of the invention can include administering an immunogenic composition disclosed herein to the eye of a subject to reduce incidence of blindness or injury to the eye or to treat an infection of the eye. In some embodiments, an infection of the eye can be caused by a virus, bacterium, fungus, prion or other microorganism. In certain embodiments, the infection can be caused by a Herpes virus or other microorganism capable of causing an eye infection. In some embodiments, the eye condition can include an infection of the cornea, adverse condition of the cornea or outer service of the eye.

In other embodiments, an immunogenic composition disclosed herein can be used to treat cancer of the eye. Cancers of the eye can include a localized tumor of the eye or a metastatic cancer of the eye or other type of cancer affecting the eye. In certain embodiments, cancers of the eye can include cancers of any part of the eye or adnexa. In some embodiments, conditions of the eye can include parts of the eye such as parts adjoining the eye. For example, a subsection of the eye and ocular adnexa include ocular muscles and eyelids. In other embodiments, cancer of the eye can include a squamous cell carcinoma (e.g. of the cornea or other component of the eye). In certain embodiments, cancers of the eye can include corneal-related cancers. In other embodiments, cancers of the cornea can include corneal squamous cell carcinoma or other tumor affecting the cornea. In some embodiments, types of tumors of the eye can include, but are not limited to, epithelial tumors of the eyelids, conjunctiva, and cornea which can occur across species (e.g. mammalian and reptilian etc.). In some embodiments, intraocular tumors can be treated by immunogenic formulations disclosed herein. For example, iridociliary epithelial tumors and malignant melanomas are contemplated to respond to immunogenic compositions disclosed herein. In other embodiments, other eye tumors can be treated with immunogenic ocular formulations disclosed herein such as mesenchymal tumors of the eye including, but not limited to, extraocular, optic nerve, nerve sheath, uveal tract tumors, neuroectodermal tumors, melanogenic tumors of the eyelid and/or conjunctiva of the uveal tract and the lacrimal system which line and protect the eye of a subject. In some embodiments, a tumor of the eye can include corneolimbal squamous cell carcinoma (SCC).

In accordance with these embodiments, an immunogenic ocular composition of use to treat an eye condition such as an infection as referenced herein and/or eye-related or ocular cancer can include, but is not limited to, at least one cationic liposome agent, at least one TLR agonist and at least one ocular adhesive agent (e.g. corneal adhesive agent). In some embodiments, the adhesive agent can be carboxymethyl cellulose, chitosan, a polyglycol, a polymer, a poloxamer (e.g. poloxamer 407, poloxamer 403), other gelatinous or inert adherence material, hyaluronic acid, a hyaluronic acid-like agent. In certain embodiments, the adhesive agents contemplated of use in immunogenic ocular formulations disclosed herein can prolong contact with the surface of the eye of a subject in order to improve outcomes such as treat an infection or tumor of the eye.

In other embodiments, the immunogenic composition of use to treat the eye of a subject can include a liposome; and dual TLR (e.g. TLR 3 and TLR9 agonist) composition along with an adhesive/potentiating agent of use in the eye. In accordance with these embodiments, the adhesive/potentiating agent of use in ocular formulations disclosed herein can include a high molecular weight/high viscosity adhesive/potentiating agent. In some embodiments, the high molecular weight/high viscosity adhesive agent can include, but is not limited to, high viscosity carboxymethylcellulose (CMC). In some embodiments, high viscosity CMC can be about 1500 to about 3000 centipoise (cps). In certain embodiments, cancer of the eye to be treated by the immunogenic ocular formulations or immunogenic compositions disclosed herein can include cancers of any part of the eye or a metastatic cancer that has spread to the eye of a subject. In other embodiments, cancer of the eye can include, but are not limited to, squamous cell carcinoma (e.g. of the cornea or other component of the eye) or melanoma of the eye. In accordance with these embodiments, immunogenic compositions disclosed herein of use to treat a condition of the eye can provide broad spectrum treatment interaction with the eye with increased duration and/or prolonged exposure of the composition to the eye, reducing frequency of treatment of the eye and/or having reduced side effects compared to standard treatments. In certain embodiments, the immunogenic ocular compositions or formulations disclosed herein can reduce the incidence of irritation and inflammation in addition to or alternative to treating an eye infection such as a chronic eye conditions or infection and/or eye cancers with improved outcomes and/or reduced treatment times.

In certain embodiments, immunogenic compositions disclosed herein are formulated for reduced frequency of administration to the eye of a subject, reducing frequency of application to a site of infection and/or condition. In some embodiments, immunogenic formulations disclosed herein are specifically designed for topical administration to the eye. In some embodiments, topical formulations can be in the form of a patch containing the immunogenic formulations disclosed herein or other eye covering, dissolvable covering or coating, eye drops, eye ointments, or other topical formulation for prolonged exposure to the immunogenic ocular formulations or compositions disclosed herein. In certain embodiments, the topical and/or nasal and/or injectable formulation can be used to treat an eye condition contemplated herein. In certain embodiments, an injectable formulation can be administered before, during or after topical administration of a formulation. In some embodiments, injectable formulations (of similar composition to the topical ocular formulation) can be used to treat large tumors in addition to topical formulations. In certain embodiments, the injectable formulation can be administered directly to the tumor or chronically infected are of the eye of a subject. In some embodiments, an immunogenic formulation of use for topical administration can include, but is not limited to, cationic liposomes, a mixture of TLR3 and TLR9 agonists and an adhesive agent. In accordance with these embodiments, an essentially liquid immunogenic ocular formulation disclosed herein further comprises a high molecular weight and/or high viscosity adhesion agent. In certain embodiments, the high molecular weight/high viscosity adhesion agent includes, but is not limited to, carboxymethylcellulose (CMC). In other embodiments, a high molecular weight/high viscosity CMC solution can be combined with an essentially liquid immunogenic formulation disclosed herein at a predetermined ratio for optimal administration. In accordance with these embodiments, these formulations will have increased viscosity having a gel-like consistency with improved adherence to the subject's surface in order to increase contact time in an affected area (e.g. the eye). In certain embodiments, immunogenic ocular formulations disclosed herein can include cationic liposomes, dual immune stimulants (e.g. TLR3 and TLR9 agonists or ligands) and at least one adhesive agent for increase potency, broader immune response, sustained immune activation, and/or for multi-targeted treatment for microbial infections, surgical side effects, injury and/or cancers of the eye. In some embodiments, immunogenic ocular formulations disclosed herein can be delivered by drops or by topical applications.

In other embodiments, immunogenic compositions disclosed herein can be used to treat an eye infection and/or cancer topically, by eye drops or other suitable external administration alone or in combination with other agents. In accordance with these embodiments, immunogenic eye compositions disclosed herein can be used as external formulations to treat an eye condition while other immunogenic compositions disclosed herein with reduced or lacking an adhesive agent can be administered by systemic administration or by injections into the eye of the subject for a combined administrative approach with improved outcomes in shorter periods of time compared to a single treatment administration. In some embodiments, combined administrations can include injectable administration and topical administrations of the immunogenic formulations. In some embodiments, eye conditions contemplated herein include infections and/or cancers in a subject. In certain embodiments, the subject can be a mammal or a reptile. In some embodiments, the subject is a mammal and the mammal is a human or animals such as livestock, companion animals, or poultry. In certain embodiments, immunogenic ocular compositions disclosed herein can be readily taken up by the cornea or adnexa of the eye of the subject such as by corneal epithelial cells or other ocular cells for prolonged and improved treatment of an eye condition. In some embodiments, immunogenic ocular compositions or other immunogenic compositions disclosed herein can be used and/or activation of interferons (e.g. alpha-, beta- and/or gamma-interferon) and/or activation of white blood cells (e.g, NK cells, T cells), In other embodiments, an immunogenic composition disclosed herein can be used to treat cancer of the eye. In some embodiments, cancers of the eye can include, but are not limited to, squamous cell carcinoma, retinoblastoma, melanoma of the eye or other eye cancer. In accordance with these embodiments, the immunogenic ocular composition of use to treat an eye condition such as an infection as referenced herein and/or cancer can include, but is not limited to, at least one cationic liposome agent, at least one TLR agonist and at least one ocular adhesive agent (e.g. corneal adhesive agent). In some embodiments, the adhesive agent can be carboxymethyl cellulose, chitosan, a polyglycol, a polymer, a poloxamer (e.g. poloxamer 407, poloxamer 403), other gelatinous or inert adherence material, hyaluronic acid, or a hyaluronic acid-like agent. In certain embodiments, the adhesive agents contemplated of use in immunogenic ocular formulations disclosed herein can prolong contact with the surface of the eye of a subject in order to improve outcomes such as treat an infection or tumor of the eye. In other embodiments, the immunogenic composition of use to treat the eye of a subject can include a liposome; and dual TLR (e.g. TLR 3 and TLR9 agonist) composition along with an adhesive agent of use in the eye. In accordance with these embodiments, the adhesive agent can include a high molecular weight/high viscosity adhesive agent capable of adhering to the surface of an eye and/or prolonging exposure to an immunogenic ocular composition disclosed herein. In some embodiments, the high molecular weight/high viscosity adhesive agent can include, but is not limited to, high viscosity carboxymethylcellulose (CMC). In some embodiments, high viscosity CMC is about 1500 to about 3000 centipoise (cps). In certain embodiments, cancer of the eye can include cancers of any part of the eye. In other embodiments, cancer of the eye can include a squamous cell carcinoma (e.g. of the cornea or other component of the eye). In accordance with these embodiments, immunogenic compositions disclosed herein of use to treat a condition of the eye can provide broad spectrum interaction of the eye with increased duration, reducing frequency of treatment and having reduced side effects. In certain embodiments, the immunogenic compositions disclosed herein can reduce the incidence of irritation and inflammation as well as treat chronic eye conditions and/or eye cancers with improved outcomes.

In certain embodiments, immunogenic compositions disclosed herein are formulated for prolonged administration to the eye of a subject, reducing frequency of application to a site of infection and/or condition. In some embodiments, immunogenic formulations disclosed herein are specifically designed for topical administration to the eye. In some embodiments, an immunogenic formulation of use for topical administration includes cationic liposomes, a mixture of TLR3 and TLR9 agonists and an adhesive agent. In accordance with these embodiments, an essentially liquid immunogenic ocular formulation disclosed herein further comprises a high molecular weight and/or high viscosity adhesion agent. In certain embodiments, the high molecular weight/high viscosity adhesion agent includes, but is not limited to, carboxymethylcellulose (CMC). In other embodiments, a high molecular weight/high viscosity CMC solution is combined with an essentially liquid immunogenic formulation disclosed herein at a predetermined ratio. In accordance with these embodiments, these formulations will have increased viscosity to a gel-like consistency and improved adherence to the subject's surface in order to increase contact time in an affected area (e.g. the eye).

In accordance with these embodiments, an immunogenic composition of use to treat an eye-related cancer or tumor can include, but is not limited to, at least one cationic liposome agent, at least one TLR agonist and at least one adhesive agent, wherein the immunogenic composition includes a high viscosity adhesive agent and/or high molecular weight agent. In certain embodiments, the immunogenic composition of use to treat the eye of a subject can include CLDC+CMC of low to mid viscosity and further include a high viscosity adhesive agent. In some embodiments, the high viscosity adhesive agent can include, but is not limited to, high viscosity carboxymethylcellulose (CMC). In certain embodiments, In some embodiments, high viscosity adhesion agent is about 1500 to about 3000 centipoise (cps). In other embodiments, high viscosity CMC is about 1500 to about 3000 centipoise (cps).

In some embodiments, immunogenic compositions disclosed herein can be used to treat an eye infection. In accordance with these embodiments, an infection of the eye can include an infection caused by a pathogenic organism. In some embodiments, a pathogenic organism can include a pathogenic virus, bacterium, prion, fungus or protozoan organism. In certain embodiments, the pathogenic organism can infect any part of the eye or connecting tissues to the eye or eyelid or the like. In other embodiments, an infection of the eye can include an infection of the cornea. In some embodiments, ocular herpes virus infection of the eye is contemplated. In certain embodiments, an infection of the eye can be an acute infection. In other embodiments, an infection of the eye can be a chronic infection. In yet other embodiments, an infection of the eye can be a refractory eye infection; for example, unresponsive to known compositions. In one embodiment, an infection of the eye can be refractory herpes virus keratoconjunctivitis. In certain embodiments, immunogenic compositions of use to treat infectious eye conditions of a subject can reduce the incidence of permanent eye injury and/or blindness in the subject.

In certain embodiments, immunogenic compositions disclosed herein can be used to treat chronic ulcers of the eye. Corneal ulcers contemplated to be treated by immunogenic compositions disclosed herein can include an ulcer due to an infection, physical and/or chemical trauma, corneal drying and exposure, and contact lens over-wear and/or misuse. In certain embodiments, immunogenic compositions disclosed herein can be used to treat corneal ulcers in order to reduce or prevent loss of vision or blindness.

In some embodiments, immunogenic compositions disclosed herein of use to treat a condition of the eye can provide broad spectrum activity of increased duration, reducing frequency of treatment and having reduced side effects such as irritation and inflammation. In certain embodiments, the immunogenic compositions disclosed herein can reduce the incidence of irritation and inflammation as well as treat chronic eye conditions with improved outcomes.

In other embodiments, immunogenic compositions disclosed herein are formulated for prolonged administration reducing frequency of application to a site of infection and/or condition. In some embodiments, immunogenic formulations disclosed herein are designed for topical administration to the eye. In certain embodiments, immunogenic formulations disclosed herein are designed for administering as an eye drop such as a viscous eye drop. In certain embodiments, immunogenic formulations disclosed herein can be administered to a subject having an eye infection or cancer of the eye using an injectable compositions administrable by direct injection, injection to the surrounding area, intradermal administration or other injectable method. In some embodiments, an immunogenic formulation of use for topical administration includes cationic liposomes, a mixture of TLR3 and TLR9 agonists and an adhesive agent. In accordance with these embodiments, an essentially liquid immunogenic formulation disclosed herein (e.g. CLDC plus CMC of low to mid viscosity: MIM) can further include at least one high viscosity adhesion agent. In certain embodiments, a high viscosity or high molecular weight adhesion agent can include, but is not limited to, carboxymethylcellulose (CMC). Other suitable high viscosity and/or high molecular weight adhesion agents include, but are not limited to, dextrans, hyaluronic acid, chondroitin sulfate, petrolatum, mineral oil, and/or lanolin. In other embodiments, a high viscosity and/or high molecular weight adhesion CMC solution is combined with an essentially liquid immunogenic formulation disclosed herein at a predetermined ratio. In accordance with these embodiments, these formulations will have increased viscosity to a gel-like consistency to increase contact time in an affected area (e.g. the eye) in order to increase duration of exposure and improve outcome.

In certain embodiments disclosed herein, combination treatments are contemplated. In accordance with these embodiments, immunogenic compositions disclosed herein (e.g. CLDC plus CMC of low to mid viscosity: MIM) having at least one high molecular weight and/or high viscosity adhesion agent included in the formulation can be used in combination with standard treatments for eye infections, chronic wounds or ulcers and tumors of the eye to obtain improved outcomes. In certain embodiments, immunogenic compositions and formulations disclosed herein can be used before, during or after standard treatment regimens in order to improve outcome. In some embodiments, immunogenic compositions disclosed herein can be used to reduce cost of treatment and reduce the risk of recurrence of an eye condition.

In some embodiments, the immunogenic compositions of the present invention may also be used to induce non-specific immune responses in humans, and pets such as dogs, cats, rabbits; in livestock such as cattle, horses, swine, and birds, such as chickens, turkeys and other birds and fish. In certain embodiments, compositions disclosed herein can be used to treat or reduce the risk of onset of a viral, bacterial, fungus, prion or protozoan infection. In some embodiments, infections of a subject contemplated herein can be a respiratory, ear, eye, sinus, skin, scalp, oral, throat infection, as well as infections of the reproductive or gastrointestinal (GI) tract.

In certain embodiments, compositions disclosed herein can be administered as a liquid by the intranasal and oropharyngeal routes to humans and other mammals (e.g., dogs, cats, cattle, horses, swine, sheep, goats, buffalo poultry) prior to exposure or after exposure to a pathogen. In certain embodiments, animals can be administered an immunogenic composition disclosed herein about 24 h prior to exposure to a pathogen (e.g., shipping animals to feedlots, boarding facilities, veterinary visits or rearing facilities), or within 7 days following exposure to a pathogen and optionally, daily, weekly, bi-weekly or by other regimen while in the facility and for a time after leaving a facility, if desired. In some embodiments, compositions disclosed herein can be used to induce local immune responses in order to reduce the risk of onset of an infection, such as against a virus or bacteria. In some embodiments, the composition may be administered to an animal in a shelter boarding facility to induce an enhanced immune response to a respiratory infection. In some embodiments, a respiratory infection could be one that occurs in a cat or a dog such as an upper respiratory infection due to exposure to a microorganism. It is contemplated herein, that compositions disclosed herein can be of use to a subject in quarantine or other holding facility to reduce the risk of exposing others to a potential infection.

In certain embodiments, immunogenic compositions disclosed herein can be used to treat a subject for, or reduce the risk of onset in a subject of, a viral infection by inducing an enhanced immune response to a respiratory virus such as rhinovirus, influenza virus, adenovirus, or the like. In certain embodiments, immunogenic compositions disclosed herein can be used to treat a subject for or reduce the risk of onset in a subject of, a bacterial infection such as Staphylococcus, Pneumococcal, Streptococcus or other bacterial infection.

In a related embodiment, cattle that are shipped to feedlots could be administered an immunogenic composition disclosed herein by intranasal or other rapid administration, before or upon arrival to the facility. It is contemplated that the treatment can be repeated at a predetermined interval such as daily, or weekly or by 14-day intervals as appropriate.

In another embodiment, poultry in intensive husbandry settings (e.g., broiler operations) that are exposed to pathogens or at risk of exposure to pathogens can be treated with immunogenic compositions disclosed herein throughout the building by exposure to an aerosol mist generated by an aerosol generator carried as a backpack by facility personnel.

In another embodiment, regarding fish for example, fish farms or ponds at risk of infection could be collected into smaller treatment tanks, and the composition can be introduced to the water in the tanks. In accordance with this example, all the fish could be treated via uptake by the gills or other mucosal surfaces.

In certain embodiments, the immunogenic composition may be used to treat a human. In accordance with these embodiments, the composition can be administered by any method known in the art. In certain embodiments, the immunogenic compositions can be administered to a human intranasally or to the eye by a dropper or ointment. In certain embodiments, the immunogenic composition can be administered as a liquid or spray using a spray bottle, eye dropper, intranasal device or similar device. In certain embodiments, humans at risk of contracting a viral infection or being exposed to a bacterial infection (e.g., during airline travel, holiday gatherings, classrooms) can administer immunogenic compositions disclosed herein prior to the encounter and then a day to 7 days to within 14 days afterward potential exposure.

In some embodiments, immunogenic compositions of the present invention generate rapid, broad immune response against pathogenic agents following application to mucosal surfaces. In other embodiments, data provided herein demonstrates superior induction of mucosal immune responses with the compositions of the present invention as compared to previous cationic liposome-DNA complex (CLDC) formulations.

According to certain alternative embodiments, the instant disclosure also relates, in part, to improved immunostimulatory compositions. In accordance with these embodiments, the improved or enhanced immunostimulatory compositions can be used as adjuvants, alone or in combination with antigens in, for example, vaccines. In certain embodiments, immunogenic compositions disclosed herein have include an improved liposomal vaccine adjuvant with greater lymph node trafficking ability for greater vaccine adjuvant activity. In certain embodiments, by combining an adhesive agent (e.g., carboxymethylcellulose) with a cationic liposome-TLR agonist complex, migration of vaccine antigens to draining lymph nodes is enhanced, resulting in enhanced immune responses, as well as, enhance immune responses to antigens (e.g. protein antigens). In certain embodiments, immunogenic compositions disclosed herein provide improved immunostimulatory properties of a previously developed immunotherapeutic (e.g. cationic-liposome DNA complexes; CLDC); for example, with respect to vaccine adjuvant properties and immunological responses to administration of a vaccine.

In certain embodiments, immunogenic compositions disclosed herein can include an immunogenic composition for application to an eye of a subject. In accordance with these embodiments, the immunostimulatory compositions can include, but are not limited to, the following components: cationic liposomes including at least one cationically-charged lipid in a predetermined ratio with cholesterol; one or more TLR ligand, such as TLR3 and/or TLR9 ligands or agonists (e.g. TLR ligands); for example, including non-coding plasmid DNA (TLR9 agonist) and/or polyinosinic-polycytidylic acid (TLR3 agonist); at least one cellular adhesion agent (e.g., carboxymethylcellulose, or chitosan, polyglycol, poloxamer, other polymer or hyaluronan) and further comprising a high molecular weight/high viscosity cell adhesion agent. In some embodiments, the high molecular weight/high viscosity adhesion agent can be a carboxymethylcellulose agent, a high molecular weight/high viscosity surfactant agent (e.g. a poloxamer such as poloxamer 407 or other) In accordance with these embodiments, a subject responsive to these immunogenic agents can be a subject suffering from an eye condition including, but not limited to, an eye tumor, an eye infection, an acute eye condition and/or chronic eye condition. In certain embodiments, the eye condition can include an eye condition that affects any component of the eye. In other embodiments, the eye condition can include a condition of the cornea. In some embodiments, the immunogenic compositions comprises MIM and a high viscosity carboxymethylcellulose agent (HV CMC). In some embodiments, MIM can be mixed 30/70, 70/30, 40/60; 60/40, 50/50 v/v or other pre-determined ratio with a solution of a high viscosity and/or high molecular weight CMC or other high molecular weight/high viscosity adhesive agent. In some embodiments, the high viscosity and/or high molecular weight CMC solution can be a 0.5% to a 10.0% solution. In other embodiments, the high viscosity and/or high molecular weight CMC solution can be about a 0.5% to about a 5.0% solution or about a 0.5% to about a 3% solution. In other embodiments, the final high viscosity CMC solution can be about a 0.5% to about a 2.5% solution or about a 0.5% to about a 1.5% solution or a final of about a 1.0% solution of high viscosity having high molecular weight CMC in immunogenic ocular formulations disclosed herein. In certain embodiments, MIM essentially liquid composition transforms into a viscous gel-like consistency for administration to the eye of a subject (e.g. similar viscosity to implantation of a urinary or nasopharyngeal composition).

In certain embodiments, compositions disclosed herein can be used to treat corneal conditions. Corneal diseases and corneal infections are a major causes of blindness and irreversible eye injury. There are currently no approved immunotherapies for corneal conditions (e.g. viral, bacterial, fungal infections and neoplasia). Therefore, there is an unmet need for eye conditions including, but not limited to, ocular herpesvirus and other eye infections, non-healing corneal ulcers and/or corneal squamous cell carcinoma and/or other eye cancers. Current treatments are often off-label agents that have major drawbacks, narrow spectrum of activity, short duration, require frequent administration (every 3-4 hours) and often have intolerable side effects such as irritation and inflammation. In some embodiments, immunogenic compositions disclosed herein can be specifically formulated for topical administration to the eye leading to broad-spectrum ocular immunotherapy. In other embodiments, topical and injectable immunogenic formulations disclosed herein can be administered to a subject having an eye condition. In accordance with these embodiments, broad-spectrum ocular immunotherapy can include but is not limited to anti-viral, anti-neoplastic, anti-fungal and/or anti-bacterial activity. In other embodiments, compositions disclosed herein (e.g. Ocummune) can provide sustained immune activation and have convenient dosing regimens; for example, once a day, every other day, weekly or other regimen. In other embodiments, compositions disclosed herein (e.g. Ocummune) can provide treatments against multiple pathogens and other eye conditions simultaneously. In certain embodiments, immunogenic formulations disclosed herein can be administered to a subject having an eye infection or cancer of the eye using an injectable compositions administrable by direct injection, injection to the surrounding area, intradermal administration or other injectable method.

In some embodiments, one targeted condition of the instant inventions includes, but is not limited to, herpesvirus keratitis. Herpesvirus keratitis is the most common cause of infectious blindness in humans. There are no treatments available to rapidly suppress or prevent recurrence of this infection. Standard treatments of care include anti-viral eye drops which require prolonged treatment, frequent dosing, and relapse is very common. Another treatment includes oral herpesvirus drugs which can cause side-effects and are expensive. In some embodiments, Ocummune or similar immunogenic composition disclosed herein can be used to treat herpesvirus keratitis in a subject with improved outcomes at reduced cost and reduce dosing frequencies.

In some embodiments, another targeted condition of the instant inventions includes, but is not limited to, non-healing corneal ulcers. There is no consistently effective therapy on the market and multiple off-label and unapproved products are being used with mixed outcomes. There is a large unmet medical need because these conditions can lead to significant risk of loss of vision. In some embodiments, Ocummune or similar immunogenic composition disclosed herein can be used to treat non-healing corneal ulcers in a subject with improved and predictable outcomes.

In yet other embodiments, other targeted conditions can include treating corneolimbal squamous cell carcinoma. Corneolimbal squamous cell carcinoma (SCC) is the most common surface eye tumor, increasing incidence worldwide. There is currently no approved treatments. Multiple approaches have been attempted but none have been proven to be consistently effective. The recurrence rate is about 20%. These conditions frequently cause of eye loss in those suffering from this cancer. Current agents of use to treat these conditions are off-label drugs and many of them have significant adverse effects. In some embodiments, Ocummune or similar immunogenic composition disclosed herein can be used to treat non-healing corneal ulcers in a subject with improved and predictable outcomes.

In some embodiments, the immunogenic compositions can include, but is not limited to, cationic liposomes and TLR ligands and at least one high viscosity adhesion agent (e.g. HV, CMC). In accordance with these embodiments, the immunogenic agent containing a high viscosity adhesion agent can be a viscous eye drop or gel. In certain embodiments, these eye drops can be administered once or twice daily to eyes of a subject having an eye condition. In some embodiments, these novel composition activate host innate immune responses by TLRs in the cornea and surrounding adnexal tissues having a local distribution and not systemic. Clearance can be rapid due in part to rapid degradation of nucleic acids. In other embodiments, eye treatments can be closely monitored by tear cytokines, corneal cytology, and/or scheduled and frequent eye exams.

General Methods

Embodiments of the present invention can employ, unless otherwise indicated, conventional techniques of cell culturing, molecular biology (including recombinant techniques), microbiology, cell biology, biochemistry and immunology, which are within the skill of the art. Such techniques are explained fully in the literature, such as, Molecular Cloning: A Laboratory Manual, third edition (Sambrook et al., 2001) Cold Spring Harbor Press; Oligonucleotide Synthesis (P. Herdewijn, ed., 2004); Animal Cell Culture (R. I. Freshney), ed., 1987); Methods in Enzymology (Academic Press, Inc.); Handbook of Experimental Immunology (D. M. Weir & C. C. Blackwell, eds.); Gene Transfer Vectors for Mammalian Cells (J. M. Miller & M. P. Calos, eds., 1987); Current Protocols in Molecular Biology (F. M. Ausubel et al., eds., 1987); PCR: The Polymerase Chain Reaction, (Mullis et al., eds., 1994); Current Protocols in Immunology (J. E. Coligan et al., eds., 1991); Short Protocols in Molecular Biology (Wiley and Sons, 1999); Manual of Clinical Laboratory Immunology (B. Detrick, N. R. Rose, and J. D. Folds eds., 2006); Immunochemical Protocols (J. Pound, ed., 2003); Lab Manual in Biochemistry: Immunology and Biotechnology (A. Nigam and A. Ayyagari, eds. 2007); Immunology Methods Manual: The Comprehensive Sourcebook of Techniques (Ivan Lefkovits, ed., 1996); Using Antibodies: A Laboratory Manual (E. Harlow and D. Lane, eds., 1988); and others.

Immunostimulatory Compositions

Embodiments disclosed herein provide for novel immunostimulatory compositions. In certain embodiments, these immunostimulatory compositions are used to induce a non-specific immune response in a subject.

In other embodiments, the immunostimulatory compositions can include, but are not limited to, the following components: cationic liposomes including at least one cationically-charged lipid in a predetermined ratio with cholesterol; one or more TLR ligand, such as TLR3 and/or TLR9 ligands or agonists (TLR ligands), including non-coding plasmid DNA (TLR9 agonist) and polyinosinic-polycytidylic acid (TLR3 agonist); and at least one cellular adhesion agent (e.g., carboxymethyl cellulose, or chitosan, polyglycol, or hyaluronan). In other embodiments, the immunostimulatory compositions can further include a high molecular weight/high viscosity adhesion molecule such as HMW/high viscosity CMC or other HMW/high viscosity adhesion agents (e.g. chitosan, polyglycol, poloxamer agent or hyaluronan)

In some embodiments, the immunostimulatory composition includes both a CLDC and a cellular adhesion agent of low and/or medium molecular weight. In certain embodiments, the immunostimulatory composition includes both a CLDPC and a cellular adhesion agent of low or medium molecular weight.

TLR3 and TLR9 Ligands (TLR Ligands)

In one embodiment, immunogenic compositions disclosed herein can include a cationic liposome combined with at least one TLR9 agonist or ligand (e.g. either plasmid DNA (e.g., non-coding plasmid DNA), or CpG oligos)), referenced herein in certain embodiments as a CLDC adjuvant.

In one embodiment, the TLR ligand is a cationic liposome DNA-pIC complex (CLDPC). According to certain exemplary embodiments, the TLR9 agonist can be a non-coding plasmid represented by SEQ ID NO. 1 or fragment thereof. In accordance with these embodiments, the plasmid (See for example, FIG. 34) includes a plurality of CpG motifs, but does not contain antibiotic resistance genes (e.g. as mandated for regulatory purposes by the USDA and FDA).

In certain embodiments, the immunogenic compositions of the present invention can elicit both a cell-mediated immune response and a humoral immune response when administered to a subject. In some embodiments, these immune responses can induce prolonged exposure to antibodies as well as an enhanced T cell-mediated immune response. In some embodiments, the enhanced T-cell response can include and enhanced CD4 and/or CD8 T-cell response. In certain embodiments, the disclosed CLDC adjuvant primarily elicits a Th1 response. In some embodiments, the TLR ligand is prepared with a CLDC adjuvant and/or CLDPC adjuvant capable of eliciting an enhanced and effective cell-mediated immunity. In certain embodiments, the immunogenic compositions can include other adjuvants capable of eliciting and enhanced Th1 immune response.

In some embodiments, the TLR ligand includes, but is not limited to, cationic liposomes complexed to non-coding plasmid DNA (CLDC), as this adjuvant is particularly effective in eliciting T cell (e.g. such as CD8 and CD4) responses. In other embodiment, the CLDC adjuvant can be prepared using cationic liposomes combined with CpG oligos. In some embodiments, the CLPDC can include cationic liposomes complexed to polyI:C and plasmid DNA. In other embodiments, the complex includes cationic liposomes (e.g., DOTAP) in a 1:1 to 1:2 molar ratio with cholesterol, e.g., formulated as small unilamellar vesicles in dextrose or sucrose solution, and polyI:C and/or plasmid DNA (e.g., non-coding DNA). When both are present, in certain embodiments, the polyI:C and plasmid DNA may be present in a ratio of 1:2 to 2:1, e.g., 1:1 (by weight). In certain embodiments, the complex contains about 10 µg to about 500 µg, about 50 µg to about 200 µg, or about 100 µg total of polyI:C and/or DNA per 1 ml liposomes or other volume of liposomes. In some embodiments, the liposome concentration can be from about 1 to about 20 mM or about 5 to about 15 mM or about 10 mM. In other embodiments, the cationic liposomes can include a cationic lipid (e.g., DOTAP or DOTIM) mixed in a 1:1 or 2:1 or 1:2 molar ratio of cholesterol and rehydrated to produce liposomes in the range of about 100 to about 350, to about 150 to about 300 to about 250 nm diameter. In certain embodiments, any of the CLDC and CLPDC adjuvants can include a cellular adhesive agent. In some embodiments, the cellular adhesion agent is a low to medium molecular weight cell adhesion agent. In other embodiments, the cellular adhesion agent is a high molecular weight/high viscosity adhesion agent. In certain embodiments, the cell adhesion agent can be carboxymethylcellulose (CMC). In certain embodiments, the CLDC adjuvant can include cationic liposomes (e.g., DOTAP and cholesterol (10 mM), 1:2 to 2:1 ratio or about 1:1 ratio or other suitable ration), and non-coding plasmid DNA (e.g. about 10 µg/ml to about 500 µg/ml or about 10 µg/ml to about 200 µg/ml, or about 50 µg/ml). In some embodiments, the CLDC adjuvant can include cationic liposomes (e.g., DOTAP and cholesterol, 1:1 ratio), and non-coding plasmid DNA (50 µg/ml). In other embodiments, the immunogenic compositions disclosed herein can include or further include both a CLDC adjuvant and carboxymethylcellulose (CMC) at about 1% to about 20%, about 2% to about 15%, about 2.5% to about 10%, about 5% to about 10% or about 10% or about 5% v/v. In certain embodiments, the CLPDC adjuvant can include cationic liposomes (e.g., DOTAP and cholesterol, 1:2 to 2:1 ratio or about 1:1 ratio), non-coding plasmid DNA (about 10 µg/ml to about 500 µg/ml or about 10 µg/ml to about 200 µg/ml, or about 50 µg/ml), and synthetic pIC (about 10-500 g/ml or about 10-200 µg/ml or about 50 µg/ml). In some embodiments, the LPDC composition can include cationic liposomes (e.g., DOTAP and cholesterol, about a 1:1 ratio, about a 2:1; about a 1:2 or similar ratio), non-coding plasmid DNA (50 µg/ml), and synthetic pIC (50 µg/ml). In certain embodiments, the compositions can include both a CLPDC composition and carboxymethylcellulose (CMC) at about 1% to about 20%, about 2% to about 15%, about 2.5% to about 10%, about 5% or about 10% or about 5% v/v in the immunogenic composition for administration to a subject.

Cellular Adhesion/Potentiation Agent

In certain embodiments, the immunogenic composition or adjuvanted composition includes at least one cellular adhesion agent. In some embodiments, the at least one cellular adhesion agent enhances uptake of the composition by the mucosa or other tissue and cells exposed to the compositions. In certain embodiments, compositions can be administered by any method known in the art. In other embodiments, compositions disclosed herein can be administered either orally, intranasally, topically, by dropper (e.g. eye, ear, nose) or nasally, where the composition id capable of adhering to and/or anchors to a subject's mucous membrane or cellular surface or intradermal layer for a period of time sufficient for the composition to exert its immunostimulatory effects. In other embodiments, injectable immunogenic formulations disclosed herein can be combined with a topical or nasal administration of a formulation disclosed herein.

In particular embodiments, the cellular adhesion/potentiation agent can be carboxymethylcellulose, e.g. a low to mid-weight viscosity formulation and/or a high molecular weight cellular adhesion agent. Carboxymethylcellulose (CMC) or cellulose gum is a cellulose derivative with carboxymethyl groups (—CH2-COOH) bound to some of the hydroxyl groups of the glucopyranose monomers that make up the cellulose backbone. In certain embodiments, the CMC is a sodium salt derivative, sodium carboxymethyl cellulose. In some embodiments, CMC is present in the composition at about 0.1% to about 20%, about 1% to about 20% (v/v), 2% to 15%, 2.4% to 10%, 2.5% to about or about 5% (v/v). In some embodiments, low viscosity carboxymethylcellulose (CMC) agents can have a viscosity of a 4% solution in a diluent (e.g. water or PBS or other) at about room temperature (e.g. 25° C.) and can be 50-200 centipoise (cps). Viscosity is both concentration and temperature dependent. As the temperature increases, the viscosity decreases. As the concentration of these agents increases, the viscosity increases. In various embodiments, low, medium and high viscosity carboxymethylcellulose (CMC) are used in the compositions of the present invention. Low viscosity CMC is usually used in "thin" aqueous solutions. Medium viscosity CMC is usually used to make solutions that look like a syrup. In other embodiments, low viscosity CMC can have a molecular weight of about 50 to about 150; or about 50 to about 100 or about 90 kDa; a degree of polymerization of 400; a degree of substitution of 0.65-0.90 (6.5-9.0 carboxymethyl groups per 10 anhydroglucose units); and a sodium content of about 8% by weight. In certain embodiments, medium viscosity carboxymethylcellulose (CMC) can have a viscosity of a 2% solution in a diluent (e.g. water or PBS or other) at about room temperature (e.g. 25° C.) and can be 400-800 centipoise (cps). In certain embodiments, medium viscosity CMC can have a molecular weight of about 150 to about 350; about 200 to about 300 or about 250 kDa; a degree of polymerization of about 1100; and a degree of substitution of about 0.7 (approximately 7 carboxymethyl groups per 10 anhydroglucose units).

In other embodiments, high viscosity cell adhesion agents are contemplated. In some embodiments, a high viscosity cell adhesion agent can include carboxymethylcellulose (CMC) having viscosity in about 1% solution in a diluent (e.g. water or PBS or other) at about room temperature (e.g. 25° C.) and can be from about 1500 to about 3000 centipoise (cps). In some embodiments, high viscosity CMC as used herein can be used to make a mixture that resembles a cream or lotion. In other embodiments, high viscosity CMC can have increased viscosity compared to low or medium viscosity CMC while still being capable of delivery to a subject by a dropper bottle but has viscous gel-like properties. In certain embodiments, low viscosity CMC can be used in "thin" aqueous solutions. In some embodiments, high viscosity CMC has a molecular weight of about 400 to about 1000, about 500 to about 900, about 600 to about 800, about 650 to about 750; or about 700 kDa; a degree of polymerization of about 3200; and a degree of substitution of about 0.65-0.85 (6.5-8.5 carboxymethyl groups per 10 anhydroglucose units). As used herein, a "poise" is a unit of viscosity based on a flow rate using the standard of water at 20° C. having a poise value of exactly 1 centipoise or one hundredth of a poise. One poise can be referred to as "P" in the following equation: 1P=(0.10 kg/meter)/sec=(1 g/cm)/sec.

In certain alternative embodiments, the cellular adhesion agent can be chitosan. In further alternative embodiments, the cellular adhesion agent can be hyaluronan. Hyaluronan, also known as hyaluronic acid, is a is an anionic, nonsulfated mucoid polysaccharide of biological origin. According to still further embodiments, the cellular adhesion agent is a polymer. As will be appreciated by those skilled in the art, suitable polymers in these embodiments are those with hydrophilic functional groups or those that bind to specific receptors on cell or mucus surface (e.g., lectins, thiolated polymers) or lipoid S100.

In certain embodiments, the cellular adhesion agent can be a propylene glycol. As used herein, "propylene glycol" or "PEG" is a polyether compound of general formula H—(O—CH2-CH2)n-OH. PEGs are also known as polyethylene oxides (PEOs) or polyoxyethylenes (POEs), depending on their molecular weight PEO, PEE, or POG, as used herein, refers to an oligomer or polymer of ethylene oxide. The three names are chemically synonymous, but PEG has tended to refer to oligomers and polymers with a molecular mass below 20,000 g/mol, PEO to polymers with a molecular mass above 20,000 g/mol, and POE to a polymer of any molecular mass. PEG and PEO are liquids or low-melting solids, depending on their molecular weights. Throughout this disclosure, the 3 names are used indistinguishably. PEGs are prepared by polymerization of ethylene oxide and are commercially available over a wide range of molecular weights from 300 g/mol to 10,000,000 g/mol. In certain embodiments, the PEG is water-soluble (amphiphilic or hydrophilic), non-toxic, and pharmaceutically inert. Suitable polymeric moieties include polyethylene glycols (PEG), homo- or co-polymers of PEG, a monomethyl-substituted polymer of PEG (mPEG), or polyoxyethylene glycerol (POG). See, for example, Int. J. Hematology 68:1 (1998); Bioconjugate Chem. 6:150 (1995); and Crit. Rev. Therap. Drug Carrier Sys. 9:249 (1992). Suitable PEG polymers will vary substantially by weights ranging from about 200 to about 60,000. In certain embodiments, PEGs having molecular weights from 200 to 2,000 or from 200 to 500 are used. Lower-molecular-weight PEGs are also available as pure oligomers, referred to as monodisperse, uniform, or discrete. PEGs are also available with different geometries: branched PEGs have three to ten PEG chains emanating from a central core group; star PEGs have 10 to 100 PEG chains emanating from a central core group; and comb PEGs have multiple PEG chains normally grafted onto a polymer backbone. PEGs can also be linear.

In other embodiments, the cellular adhesion molecule can be a surfactant. In some embodiments, the cellular adhesion molecule can be a high molecular weight/high viscosity surfactant (e.g. a poloxamer). In some embodiments, one or more cellular adhesion agents can include an inert gelatinous material capable of prolonging exposure of active agents disclosed herein to the system and/or bodily surface of exposure (e.g. surface of the eye of the subject).

In one embodiment, immunogenic compositions disclosed herein are prepared by combining complexes of cationic liposomes with DNA and/or pIC. In other embodiments, the adhesive agent (also referred to as the cellular adhesive/potentiating agent) can be added to the combined complexes. In certain embodiments, an antigen can be added to the combined complexes containing the cellular adhesive agent. In yet other embodiments, a high molecular weight adhesive agent is added to the combined complexes containing the cellular adhesive agent to make a HMW/high viscosity adhesive agent immunogenic composition and used in a subject to induce an enhanced immune response, alone or in combination with other standards of care. In some embodiments, the HMW/high viscosity adhesive agent immunogenic composition can be administered to a subject having an eye disorder.

In certain embodiments, immunogenic ocular formulations (referred to as Ocummune) disclosed herein can include about a 1:1 (v/v) (or about a 2:1 or 1:2 ratio) mixture of MucosImmune (MIM) and 1% high viscosity CMC, mixed together for example, by gentle pipetting, mixing or stirring. In accordance with these embodiments, MucosImmune can include DOTAP and cholesterol, in about a 1:1 molar ratio (e.g. Avanti Polar Lipids, or about a 2:1 or 1:2 ratio) at final concentration of about 10 mM (or about 2 to about 100 mM); PolyIC (e.g. In VivoGen) at final concentration of 50 µg/ml (or about 5 to about 250 µg/ml); Non-coding pDNA (e.g. Aldevron) at a final concentration of 50 µg/ml (or about 5 µg/ml to about 250 µg/ml); and low viscosity CMC (e.g. Sigma) at a final concentration of 10% (v/v) (or about 1% to about 25% v/v). Further, high molecular weight/high viscosity CMC (e.g. Sigma) can be about a 1% solution of high viscosity CMC (or about a 0.1% to about 10.0% solution).

In other embodiments, immunogenic or immune-inducing compositions disclosed herein can be administered by a variety of mucosal routes of delivery, including intranasally, orally, topically, inter-rectally, intra-vaginally, or by the intra-mammary or intra-uterine route, or by aerosol mist exposure, or by dilution in water (fish). Alternative routes of delivery include parenterally, e.g., intravenously, subcutaneously, intraperitoneally, or intramuscularly.

In some embodiments, immune cells at mucosal surfaces that can be immunologically induced can include dendritic cells (DC), monocytes and macrophages, neutrophils, and B cells, NK cells, iNKT cells and T cells known as gamma-delta T cells (γδ T cells). In addition, epithelial cells lining mucosal surfaces can also respond to immune stimuli. The coordinated activation of immune cells and epithelial cells can induce immune responses to suppress infection by either prevent viral or bacterial infection, or significantly reduce the severity of infection and limit pathogen replication. In addition, strong activation of local immune responses at mucosal surfaces can also reduce the severity of infection even after the infection has already been initiated (e.g., when the immune stimulus is administered in an early therapeutic setting as opposed to for prophylaxis).

When immune stimuli reach mucosal surfaces, they are sampled by local DC and macrophages, which then become activated and produce cytokines and chemokines, including inflammatory cytokines (e.g., TNF, IL-1, IL-6) as well as antiviral and antibacterial cytokines (e.g., IFN-γ, IFN-α, INF-β) and other cytokines such as IL-12 and IL-22. The epithelial cells also respond to immune stimuli and produce chemokines (and cytokines) that serve to recruit immune cells to the sites of inflammation. Key chemokines produced by epithelial cells include MCP-1, which recruits monocytes, and IL-8, which recruits neutrophils. Monocytes and neutrophils both play key role in early immune defenses against viral and bacterial pathogens of the respiratory tract and other mucosal surfaces. Some immune stimuli can also directly activate cell type known as NK cells, which are present in all mammalian species.

The early cytokine and chemokine responses serve to amplify local immune responses and recruit other inflammatory cells, including monocytes, neutrophils, NK cells and later conventional T cells. These other inflammatory cells produce antiviral and antibacterial cytokines, and also secrete factors such as reactive oxygen and reactive nitrogen species that can directly kill certain bacteria and viruses. In addition, these immune cells and epithelial cells can also produce antimicrobial peptides that kill bacteria and enhance the activity of antibiotics.

To activate mucosal immune defenses effectively, an immune stimulant needs several important properties. These include the ability to first adhere well to epithelial surfaces, and in some cases penetrate into and around epithelial cells. Cationic liposomes are very effective at introducing nucleic acid molecules such as polyIC and plasmid DNA or CpG oligonucleotides into cells such as epithelial cells and immune cells.

An effective mucosal immune stimulant also needs to be very potent, given the large surface areas that must be contacted by relatively small volumes of the immune stimulant. In addition, the ability to induce broad spectrum immune responses, by activating both antibacterial and antiviral immune pathways, is important. Thus, activation of the TLR3 pathway induces anti-viral immune responses, while activation of the TLR9 pathway induces antibacterial immune responses. By activating both pathways simultaneously, the breadth and potency of the immune response that is induced is greatly increased.

In addition, an effective mucosal immune stimulant disclosed herein has a prolonged duration of activity to reduce the frequency with which it needs to be administered. In accordance with these embodiments, the instantly claimed compositions have demonstrated both increased potency and increased duration of innate immune stimulation, compared to a conventional innate immune stimulant such as naked pIC.

In immunogenic compositions disclosed herein an effective mucosal immune stimulant should be capable of interacting with epithelial cells and resident immune cells for prolonged periods of time in order to induce a sustained immune response. In accordance with embodiments disclosed herein, addition of a mucosal adhesion agent serves to disperse the immune stimulant over large mucus membrane surfaces, and also prolongs the contact time. For example, addition of a mucosal adhesion/potentiation agent such as carboxymethylcellulose to an immune stimulant such as a liposome-TLR agonist complex can induce local immune stimulation at mucosal surfaces for prolonged periods, for example more than 7 to more than 14 days or longer. Prolonged exposure to these compositions can reduce the risk of onset of an infection, treat an infection or treat a tumor or chronic ulcer in the region of application, for example. In addition, this period of time is sufficient for reducing the chance of infection from most pathogens; for example, exposures in respiratory disease settings. In other embodiments, with respect to treating a subject with the immunogenic compositions disclosed herein of use as a mucosal immune stimulants, this prolonged duration of immune activation provides a more effective long-term therapeutic response. In certain embodiments, prolonged exposure to the immunogenic compositions disclosed herein can lead to generation of T cell responses and antibody responses (as described further below).

Vaccine and Adjuvants

In other embodiments, an antigen (e.g. protein antigen against a pathogen or other agent) in combination with immunostimulatory compositions disclosed herein can be used as a vaccine. In accordance with these embodiments, all components of the adjuvant or vaccine are present in the same pharmaceutical composition, which may be a liquid composition and which may further comprise one or more excipients, diluents or carriers. The pharmaceutical compositions may be sterile. In certain embodiments, the liposome-TLR ligand complexes include a protein antigen.

In accordance with these embodiments, immunogenic compositions (e.g. MIM) in combination with a high viscosity and/or high molecular weight adhesion agent can form a viscous composition and be used as a pharmaceutical agent for delivering to the eye of a subject. In accordance with these embodiments, immunogenic compositions disclosed herein can further include one or more excipients, diluents or carriers. In other embodiments, immunogenic compositions disclosed herein can include higher or lower concentrations of the high viscosity and/or high molecular weight adhesion agent depending on the condition and how long exposure is desired in the targeted area (e.g. eye) and the condition being treated (e.g. chronic infection, tumor or injury). In certain embodiments, the consistency of the immunogenic composition having high viscosity and/or high molecular weight adhesion agents can be where the composition is capable of being delivered by a drop bottle but the composition remains in the delivery location for a prolonged period (e.g. on the cornea).

In certain embodiments, immunogenic compositions disclosed herein include an immunostimulant of cationic liposomes complexed to one or more TLR agonists/ligands (plasmid DNA and/or polyinosinic polycytidylic acid; pIC), and low- or medium-molecular weight carboxymethylcellulose (CMC) as an adhesive agent to increase uptake of the composition and trafficking to lymph nodes. In some embodiments, immunogenic compositions disclosed herein can include: 1) cationic liposomes (e.g., DOTAP and cholesterol, 1:1 molar ratio); 2) non-coding plasmid DNA (e.g., 50 μg/ml); 3) synthetic pIC (e.g., 50 μg/ml); 4) carboxymethylcellulose (CMC) (e.g., 5% v/v with final vaccine). In other embodiments, immunogenic compositions disclosed herein can include an immunostimulant of cationic liposomes complexed to TLR agonists (plasmid DNA and/or polyinosinic polycytidylic acid; pIC), and low- and/or medium-molecular weight carboxymethylcellulose (CMC) as an adhesive agent; and high molecular weight/high viscosity carboxymethylcellulose. In some embodiments, immunogenic compositions disclosed herein include: 1) cationic liposomes (e.g., DOTAP and cholesterol, for example in a 1:1 molar ratio or other suitable ratio); 2) non-coding plasmid DNA (e.g., 50 μg/ml); 3) synthetic pIC (e.g., 50 μg/ml); 4) carboxymethylcellulose (CMC) and 5) high viscosity/high molecular weight carboxymethylcellulose.

In one embodiment, to prepare the adjuvant, complexes of cationic liposomes with DNA and pIC are prepared, then the antigen is added. The final step is the addition of the CMC adhesive agent. In particular embodiments, the vaccine is then administered by the s.c. or i.m. route. In various embodiments, this vaccine technology is applicable to the treatment and prevention of both infectious disease and cancer vaccine applications.

In certain methods disclosed herein, to generate immunity with vaccine adjuvants and antigens, T cells can be stimulated. While T cells play little direct role in mucosal immune responses, they are important for longer term protection against viral, fungal, prion, protozoan and bacterial infections, as in the case of conventional prophylactic vaccines. Further, T cells also play an important role in cancer immunity.

In some embodiments, CD4+ and CD8+ T cells initiate and/or enhance cell mediated immunity and humoral immunity. CD8+ T cells interact with antigens displayed on MHC Class I molecules. CD4 T cells recognize antigenic peptides bound to MHC class II molecules. Upon interaction with a MHC class II molecule, the CD4 cells secrete factors such as cytokines, which activate B cells, cytotoxic T cells, macrophages, and other cells that participate in an immune response.

In some embodiments, a vaccine against an infection of the eye can be used in combination with immunogenic compositions including a high viscosity/high molecular weight adhesion agent. In some embodiments, a vaccine against a viral infection is contemplated. In certain embodiments, a vaccine against herpes virus infection of the eye is contemplated.

Other Adjuvants

In some embodiments, other adjuvants may be present in the immunostimulatory compositions and vaccines of the present invention, or delivered in combinations, including those that stimulate either or both a TH1 and/or TH2 response. TH1 adjuvants suitable for use in the invention may include, for example, saponin formulations, virosomes and virus like particles, non-toxic derivatives of enterobacterial lipopolysaccharide (LPS), immunostimulatory oligonucleotides. Immunostimulatory oligonucleotides, such as oligonucleotides containing a CpG motif, are typical TH1 adjuvants. TH2 adjuvants suitable for use in the invention include, for example, mineral containing compositions, oil-emulsions, and ADP-ribosylating toxins and detoxified derivatives thereof. Mineral containing compositions, such as aluminum salts are typical TH2 adjuvants for use in the invention.

Other adjuvants that can be included in the immunogenic compositions disclosed herein can include any adjuvant known or used in the art, including but not limited to: CLDC adjuvants, mineral salts, such as aluminum salts and calcium salts, including hydroxides (e.g., oxyhydroxides), phosphates (e.g., hydroxyphosphates, orthophosphates) and sulfates, etc.; oil-in-water emulsions, such as squalene-water emulsions, including MF59 (5% Squalene, 0.5% Tween 80, and 0.5% Span 85, formulated into submicron particles using a microfluidizer); complete Freund's adjuvant (CFA) and incomplete Freund's adjuvant (IFA); saponin formulations, such as QS21 and ISCOMs; virosomes and virus-like particles (VLPs); bacterial or microbial derivatives, such as non-toxic derivatives of enterobacterial lipopolysaccharide (LPS), Lipid A derivatives; immunostimulatory oligonucleotides, such as IC-31 (deoxynucleotide comprising 26-mer sequence 5'-(IC) 13-3' and polycationic polymer polypeptide comprising 11-mer amino acid sequence SEQ. ID. NO. 2 KLKLLLLLKLK) and ADP-ribosylating toxins and detoxified derivatives thereof; human immunomodulators, including cytokines, such as interleukins (e.g., IL-1, IL-2, IL-4, IL-5, IL-6, IL-7, IL-12, interferons (e.g., interferon-gamma), macrophage colony stimulating factor, and tumor necrosis factor; bioadhesives and mucoadhesives, such as chitosan and derivatives thereof, esterified hyaluronic acid microspheres or mucoadhesives, such as cross-linked derivatives of poly(acrylic acid), polyvinyl alcohol, polyvinyl pyrollidone, polysaccharides and carboxymethylcellulose; microparticles (e.g., a particle of about 100 nm to about 150 um in diameter) formed from materials that are biodegradable and non-toxic (e.g., a poly(alpha-hydroxy acid), a polyhydroxybutyric acid, a polyorthoester, a polyanhydride, a polycaprolactone, etc.); liposomes; polyoxyethylene ethers and polyoxyethylene esters; PCPP formulations; muramyl polypeptides, including N-acetyl-muramyl-L-threonyl-D-isoglutamine (thr-MDP), N-acetyl-normuramyl-1-alanyl-d-isoglutamine (nor-MDP), and N-acetylmuramyl-1-alanyl-d-isoglutaminyl-1-alanine-2-(1'-2'-dipalmitoyl-s-n-glycero-3-hydroxyphosphoryloxy)-ethylamine MTP-PE); and imidazoquinolone compounds, including Imiquamod and its homologues (e.g. "Resiquimod 3M"). Illustrative adjuvants suitable for use include, but are not limited, to cationic lipid DNA complexes (CLDC), CpG-oligonucleotides, polyI:C, LPS, alpha-galactosylceramide, and the like.

Antigens

In certain embodiments, the immunogenic compositions of the present invention are combined with an antigen, or administered sequentially to a subject to induce an enhanced immune response. In some embodiments, the compositions disclosed herein can include a protein antigen or antigen derived from a pathogenic agent. In some embodiments, the antigen is a viral, fungal, protozoan, prion or bacterial antigen. In other embodiments, compositions (e.g., vaccines) and kits of the invention include an antigen, and certain methods of the invention comprise administering an antigen. In certain embodiments, the antigen present in the vaccine compositions provided by the invention can be any material or substance that can induce an immune response (e.g., cellular and/or humoral immune response) by the immune system of a human or animal. For example, the antigen can be a polypeptide of interest derived from an infectious agent, e.g., a bacterium, a virus, a fungus, a protozoan, a parasite, or a prion. The antigen can be a whole microbe or a mixture thereof. The compositions can include a live whole infectious agent. In certain embodiments, the compositions can include a killed or inactivated (attenuated) infectious agent.

In certain embodiments, the antigen includes, e.g., a polypeptide, nucleic acid, polysaccharide, a fatty acid or the like, derived from an infectious agent. In other embodiments, the antigen can be a subunit or fragment of a polypeptide, or a fragment of a nucleic acid or polysaccharide derived from an infectious agent. In certain embodiments, the antigen is a recombinant polypeptide produced in a heterologous expression system, e.g., a recombinant protein derived from an infectious agent that was expressed in and purified from cells of another organism. However, an antigen can also be a recombinant nucleic acid construct which encodes a polypeptide antigen of interest (e.g., an expression construct). The antigen can include a viral subunit, a virus-like particle, a capsular (poly) saccharide; a bacterial outer membrane bleb formation containing one or more of bacterial outer membrane proteins, a phospholipid, a lipopolysaccharide, or a polysaccharide.

In some embodiments, the antigen can be a naturally occurring substance. In certain embodiments, the antigen comprises or is derived from an allergen, e.g., pollen. In certain embodiments, the antigen comprises or is derived from a toxin. In certain embodiments, the antigen comprises or is derived from an addictive substance, including, without limitation, nicotine, caffeine, alcohol, and the like. In yet other embodiments, the antigen can be a non-naturally occurring (e.g., synthetic) substance, e.g., a synthetic peptide, a synthetic polysaccharide, or a synthetic polymer.

In other embodiments, the antigen is a tumor cell or is derived from a tumor cell, including cells from any of the types of cancers or tumors described herein.

In certain aspects, the antigen can be provided in a vaccine, e.g., any vaccine known in the art. The vaccine can be a nucleic acid construct (e.g., a DNA vaccine). The vaccine can be a viral vector vaccine, which uses live viruses to carry DNA into an individual's cells. The DNA contained in the viral vaccine encodes antigen(s) that, once expressed in the infected cells, elicit an immune response. Alternatively, the vaccine can be a subunit vaccine, e.g., a specific protein from a virus. The vaccine can be a dendritic cell vaccine, in which an individual's dendritic cells are cultured with an antigen and then re-injected into the individual to stimulate an immune response. In certain embodiments, the vaccine can be a monovalent vaccine, e.g., containing a single antigen. In certain embodiments, the vaccine containing the antigen is a polyvalent or multivalent vaccine, e.g., containing more than one antigen.

The amount of antigen to be included in compositions disclosed herein and used in the methods of the present invention depends on the target and on immunogenicity of the antigen itself and the efficacy of any adjuvants co-administered therewith. In general, an immunologically effective dose can include but is not limited to a concentration of about 1 μg to about 1000 μg of the antigen, about 5 μg to about 500 μg, m about 10 μg to about 200 μg. In some embodiments, an immunologically effective dose can be at least about 1 μg, at least about 5 μg, at least about 10 μg, at least about 25 μg, at least about 50 μg, at least about 100 μg, at least about 150 μg, at least about 200 μg, at least about 250 μg, at least about 300 μg, at least about 350 μg, at least about 400 μg, at least about 450 μg, at least about 500 μg, at least about 550 μg, at least about 600 μg, at least about 650 μg, at least about 700 μg, at least about 750 μg, at least about 800 μg, at least about 850 μg, at least about 950 μg, or up to about 1000 μg of antigen. In embodiments where the antigen is a recombinant protein or peptide, a suitable dose can be about 10-100 μg. In embodiments where the antigen is a recombinant protein or peptide, a suitable dose can be about 10-100 μg.

Pharmaceutical Compositions

In some embodiments, the present invention can include pharmaceutical compositions designed for mucosal immune stimulation as well as other non-specific immune stimulation. In accordance with these embodiments, the composition includes a liquid immune stimulant, formulated with a pharmaceutically acceptable carrier, diluent or excipient. In other embodiments, the composition includes a viscous solution having HMW/high viscosity adhesion agents with improved adhesion properties formulated with a pharmaceutically acceptable carrier, diluent or excipient. Any known diluents, excipients and carriers in the art are contemplated of use herein. Compositions may be in an aqueous form or semi-solid form capable of being delivered through a dropper. In the most desirable formulation, the immune stimulant would be prepared as a stable liquid (during refrigeration) in an acceptable carrier. In other instances, the immune stimulants may be lyophilized during manufacture, to be reconstituted later into an aqueous form at the time of use. In certain embodiments, composition of the instant invention can be liquid, semi-liquid, semi-solid or dried, such as a lyophilized formulation. In certain embodiments, the compositions can be a stable liquid, semi-liquid, or semi-solid formulation stable at room temperature for prolonged periods.

In some embodiments, immunogenic compositions disclosed herein are very stable having improved tolerance for high temperatures or moderate temperatures for prolonged periods. In accordance with these embodiments, the immunogenic compositions with or without high viscosity/HMW adhesion agents are stable at room temperature (e.g. 25° C.) for at least one week, at least one month, at least 2 months, at least 3 months, at least 4 months or more. In certain embodiments, ocular immunotherapeutic compositions or immunogenic ocular formulations disclosed herein are stable at room temperature (e.g. 25° C.) for at least one week, at least one month, at least 2 months, at least 3 months, at least 4 months or more. These formulations can include at least one high viscosity/HMW adhesion agent and other agents suitable for ocular delivery. In other embodiments, ocular immunotherapeutic compositions or immunogenic ocular formulations disclosed herein are autoclavable for increased sterilization and as needed for prolonged use with reduced contamination. In addition, these immunogenic formulations are stable during autoclaving, an advantage for assuring sterility of the compositions during the manufacturing process, packaging, distribution and for use in a subject having an eye condition contemplated herein.

In certain embodiments, pharmaceutical compositions of the present invention are formulated for delivery by a variety of mucosal routes of delivery, including intranasally, orally, intrarectally, intravaginally, or by the intra-mammary or intra-uterine route, or by aerosol mist exposure, or by dilution in water (fish). Alternative routes of delivery include parenterally, e.g., intravenously, subcutaneously, intraperitoneally, or intramuscularly.

Kits

In some embodiment, composition can be present in one or more containers or vials, e.g., single use or multiuse containers or vials. In some embodiments, multiuse vials can include a rubber diaphragm suitable for retrieving multiple doses of the immune stimulant. The composition may also be supplied in flexible plastic bags that can be connected to multi-dose intranasal syringes, as in a feedlot operation. The composition may also be further diluted in a suitable diluent for administration in an aerosol delivery device that can be worn as a backpack for administration to poultry, or in a dispensing device suitable for delivery into water for treatment of fish. In some embodiment, immunogenic compositions disclosed herein can be in a dropper bottle, a tube, an eye delivery device, a syringe or other suitable container. In other embodiments, the immunogenic composition can be part of a kit and further include a delivery device.

In some embodiments, the kit or composition can include for a single dose, or multiple doses. In some embodiments, a kit containing an immunostimulatory composition can include a preservative. In some embodiments, a delivery device can include a bulb tip or other delivery tip. In other embodiments, a syringe can be used to or is adapted for use to deliver the composition to by any delivery mode contemplated herein. For example, delivery directly to the nasal cavity, oral cavity, to the eye (e.g. cornea) and/or pharyngeal region of a mammal. In certain embodiments, the subject is an animal such as a mammal (e.g. horse, dog, cat, cow, pig, sheep, goat, rabbit) or bird (e.g. chicken, turkey, duck) or fish (e.g., talapia, salmon, trout, catfish).

In yet other embodiments, kits can include a tube, dropper or other eye applicant instrument. In yet other embodiments, kits can further include instructions for use in a medical setting or at home. In some embodiments, kits can include a disposable tipped device such as a dropper so multiple animals can be treated with the same dispensing unit having a disposable tip.

Methods of Treatment—Stimulation of Innate Immune Response

In certain embodiments, methods of inducing an immune response in a subject are disclosed. In certain embodiments, immunogenic compositions disclosed herein are administered to a subject in order to induce a non-specific immune response. In certain aspects, the composition is administered in a therapeutically effective amount. In further aspects, the composition is administered in a prophylactically effective amount. In yet other embodiments, doses for treatment of cattle can be in the range of 1 ml to 5 ml of immunogenic compositions disclosed herein (e.g. PCT-01) administered into each nostril, for goats and sheep, 0.5 ml to 3 ml immunogenic compositions disclosed herein (e.g. PCT-01) in each nostril, for dogs 0.1 ml to 3 ml immunogenic compositions disclosed herein (e.g. PCT-01) in each nostril (and 1 ml to 5 ml orally), for cats 0.1 ml to 2 ml immunogenic compositions disclosed herein (e.g. PCT-01) in each nostril and 0.5 to 3 ml orally. For treatment of poultry, an example dose could be 1 to 100 ml immunogenic compositions disclosed herein (e.g. PCT-01) diluted in 100 to 1000 ml of suitable diluent (e.g., saline, D5W) and administered as an aerosol to treat a 30 by 30 foot room with 100 chickens. For treatment of fish, and example dose can be about 1.0 to 50 ml immunogenic compositions disclosed herein (e.g. PCT-01) diluted in 1000 to 10,000 gallons of water for 24 h of treatment. In humans, the intranasal dose of immunogenic compositions disclosed herein (e.g. PCT-01) can be about 0.1 to about 2 ml administered in each nostril.

In some embodiments, the subject is a mammal at risk of infection by a pathogenic agent (or already infected with such an agent), such as a virus, fungus, prion, protozoan or bacterium, or an infected subject. Examples include but are not limited to: 1) prevention or early treatment of kennel cough in dogs, or upper respiratory tract infection syndrome in cats; 2) prevention or early treatment of bovine respiratory tract disease (BRD) syndrome in cattle (beef or dairy); 3) prevention or early treatment of respiratory tract disease in swine, sheep, or goats; 4) intra-mammary infusion for prevention or treatment of mastitis in cattle; 5) intra-uterine infusion for prevention or early treatment of metritis in cattle or horses; 6) oral administration for treatment of inflammatory bowel disease in dogs, cats, humans; and 7) intra-nasal administration for prevention or early treatment of viral upper airway infections in humans.

In another embodiment, the subject is a bird at risk of infection, or already infected. Examples of methods for birds include, but are not limited to, prevention or treatment of viral, fungal, protozoan, or bacterial respiratory tract infections (e.g., influenza infection) in poultry (e.g. chickens, turkeys, ducks) in intensive rearing conditions (e.g., boiler operations, egg laying facilities). In addition, the composition could be directly administered to eggs (e.g. in ovo) for induction of innate immune responses in the developing embryo to improve hatchability and early resistance to infection.

In another embodiment, methods are disclosed to treat fish for example to treat an infection or reduce onset of an infection in a fish population. Examples include but are not limited to prevention or treatment of viral, fungal, bacterial or protozoal infections in fish. For example, in fish farms. Examples include, but are not limited to, fish in aquaculture settings (e.g., talapia, trout, salmon, catfish), where an immunogenic composition could be administered by diluting in water in small treatment ponds or tanks for periods of several hours of days of treatment.

In certain embodiments, the composition is provided by a variety of mucosal routes of delivery, including intranasally, orally, inter-rectally, intravaginally, or by the intra-mammary or intra-uterine route, or by aerosol mist exposure, or by dilution in water (e.g., fish). Alternative routes of delivery include parenterally, e.g., intravenously, subcutaneously, intraperitoneally, or intramuscularly.

According to certain embodiments, administration of the composition is applied to a mucosal surface. According to certain exemplary embodiments, the composition is applied topically to the nose, eyes, mouth, upper airways, air sacs, gills, ears, uterus, mammary gland, and or gastrointestinal tract.

Methods of Treatment—Stimulation of Antigen-Specific Immune Response

According to certain alternative embodiments, methods disclosed herein concern inducing an immune response, e.g., an immune response specific to an antigen, by providing a composition (e.g., a vaccine composition) of the present invention to a subject in need thereof. In particular embodiments, the subject is a mammal at risk of an infection due to a pathogen.

Particular embodiments include methods of treating or preventing an infection, for example, a lung infection. In accordance with these embodiments, immunogenic compositions disclosed herein can be used to treat or reduce the onset of an infection by administering to a subject in need thereof an effective amount of the immunogenic composition in combination with an antigen, e.g. a protein antigen, an antigen derived from a virus, fungus, prion, or bacterium.

In some embodiments, include treating or preventing a cancer in a subject in need thereof, including providing to the subject an effective amount of a cancer antigen in combination with an immunogenic composition of the present invention. In other embodiments, immunogenic compositions disclosed herein can be used to treat a subject having cancer for inhibiting tumor growth, reducing tumor size, and inhibiting tumor metastasis, as well as reducing side effects of tumors such as chronic ulcers. In some embodiments, tumor growth, tumor size, or tumor metastasis is inhibited or reduced by at least 10%, 20%, 30%, 40%, 50%, 60%, 70%, 75%, 80%, 85%, or 90% in a subject when compared to treatment without immunogenic composition as disclosed herein. In certain embodiments, the subject has a tumor (e.g. a metastatic tumor). In other embodiments, the subject is considered to be at risk of cancer or tumor metastasis. In some embodiments, the subject has a tumor of the eye.

In some embodiments, a tumor can be any type of tumor from any type of cancer such as a solid tumor or liquid tumors or other tumor. In certain embodiments, the cancer is breast cancer, lung cancer, prostate cancer, colorectal cancer (e.g., colon carcinoma), brain cancer, glioblastoma, skin cancer, melanoma, eye, cancer esophageal cancer, stomach cancer, bladder cancer, pancreatic cancer, cervical cancer, head and neck cancer, ovarian cancer, melanoma, leukemia, myeloma, lymphoma, glioma, Non-Hodgkin's lymphoma, leukemia, multiple myeloma or multidrug resistant cancer.

Some embodiments disclosed herein concern eye metastatic cancers and tumors. In one example, one primary malignant intraocular cancers is uveal melanoma (in adults) and another is retinoblastoma (in children). In certain embodiments, immunogenic compositions disclosed herein can be used alone or in combination to treat cancer of the eye. In some embodiments, depending upon the type and stage of eye cancer, combination treatment options can include, but are not limited to, surgery, radiotherapy, laser therapy, chemotherapy (ChT), and targeted therapy. Other combination therapies can include eye-sparing therapies for retinoblastoma, including brachytherapy and systemic and intra-arterial ChT.

In some embodiments, eye neoplasm can mean a cancerous growth in any part of the eye (e.g. eyeball, orbit, or adnexal structures). Eye cancers can be grouped into three basic categories according to their location: tumors of the eyelid and conjunctiva; intraocular tumors; and orbital tumors. Eye cancers can be classified as primary (e.g. starts within the eye) or metastatic (e.g. originated from another region and spreads to the eye). The most common primary malignant intraocular tumor in adults is uveal melanoma (UM). The two most common cancers that metastasize to the eye from another organ are breast cancer and lung cancer as well as less common cancers including, but not limited to, prostate, kidney, thyroid, skin, colon, lymphoma, and leukemia. The most common malignant intraocular tumor in young children is retinoblastoma. It is contemplated herein the immunogenic compositions disclosed herein (e.g. MIM plus a HMW/high viscosity adhesion agent) can be used alone or in combinations to treat tumors of the eye.

Some embodiments disclosed herein can include combination therapies using immunogenic compositions disclosed herein in combination with immunotherapy. Immunotherapies can include use of cytokines, monoclonal antibodies, and/or vaccines. In certain embodiments, targeted therapy can include chemotherapy drugs.

In some embodiments, an effective amount of an immunogenic composition can include about 0.1 ml to about 5.0 ml (e.g., about 1 ml) of TLR ligand; and about 1% to about 20%, about 2% to about 15%, about 2.5% to about 10%, about 5% to about 10%, or about 5% (v/v) of a cellular adhesion agent, such as carboxymethylcellulose or PEG or similar agent. In some embodiments, the effective amount includes: optionally, 100 to 500 μg of antigen; and about 1-4 ml of cationic liposome-DNA complexes; about 5% to about 10% (v/v) of carboxymethylcellulose. In certain embodiments, the antigen can include an antigen for improved immune response to an infection and/or cancer of the subject.

In certain embodiments, the immunogenic compositions alone or in combination with an antigen can be administered in a single dose or in two, three, four, five, six, seven, eight, nine, ten or more dosing regimens. In some embodiments, the immunogenic composition can be provided daily, every other day, twice a week, weekly, every other week, once a month, or once every other month depending on the condition (e.g. eye condition)

EXAMPLES

The following examples are included to illustrate various embodiments. It should be appreciated by those of skill in the art that the techniques disclosed in the examples which follow represent techniques discovered to function well in the practice of the claimed methods, compositions and apparatus. However, those of skill in the art should, in light of the present disclosure, appreciate that changes may be made in the some embodiments which are disclosed and still obtain a like or similar result without departing from the spirit and scope of the invention.

Example 1

Figure 1:
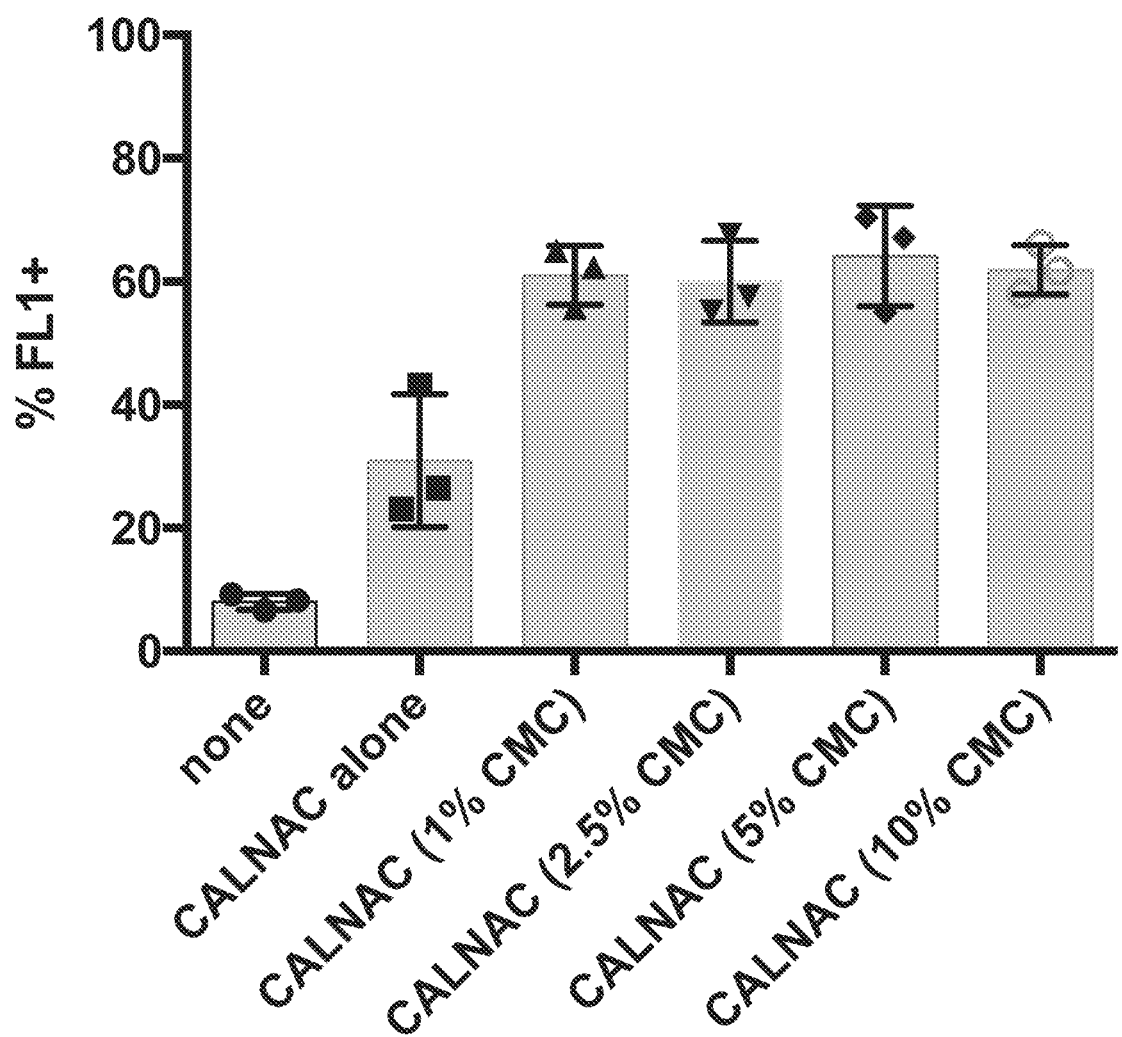
FIG. 1 illustrates flow cytometric data demonstrating that CMC addition to liposome-TLR3/9 complexes (CALNAC, cationic liposome nucleic acid complexes) increases adhesion to epithelial cells of some embodiments disclosed herein.

In one exemplary method, to test the effects of adding carboxy-methylcellulose (CMC) on the adhesion properties of liposome-TLR3/9 complexes, complexes of liposomes and DNA and TLR3/9 agonists (plasmid DNA and pIC) were labeled with a fluorescent dye, and adherence to a rat epithelial cell line was evaluated by a 3 h assay with shaking in an incubator. The effects of adding different concentrations of CMC to liposome-TLR3/9 complexes (CALNAC) was assessed by flow cytometric measurement of the percentages of epithelial cells containing liposome-TLR3/9 complexes. As best shown in FIG. 1, the addition of CMC to liposome-TLR3/9 complexes increases adhesion to epithelial cells.

Example 2

In one exemplary method, in order to assess the effects of combining TLR3 and TLR9 agonists with liposomes, spleen cells from mice were incubated with cationic liposomes alone, or liposomes+pIC or liposomes plus pDNA, or liposomes plus both pIC and pDNA. Immune stimulation (IL-12 release) was measured by ELISA assay. The combination of both TLR3 and TLR9 agonists generated synergistic immune activation. See for example, FIG. 1, the combination of TLR3 and TLR9 agonists with liposomes increases potency of immune activation.

Example 3

Figure 2:
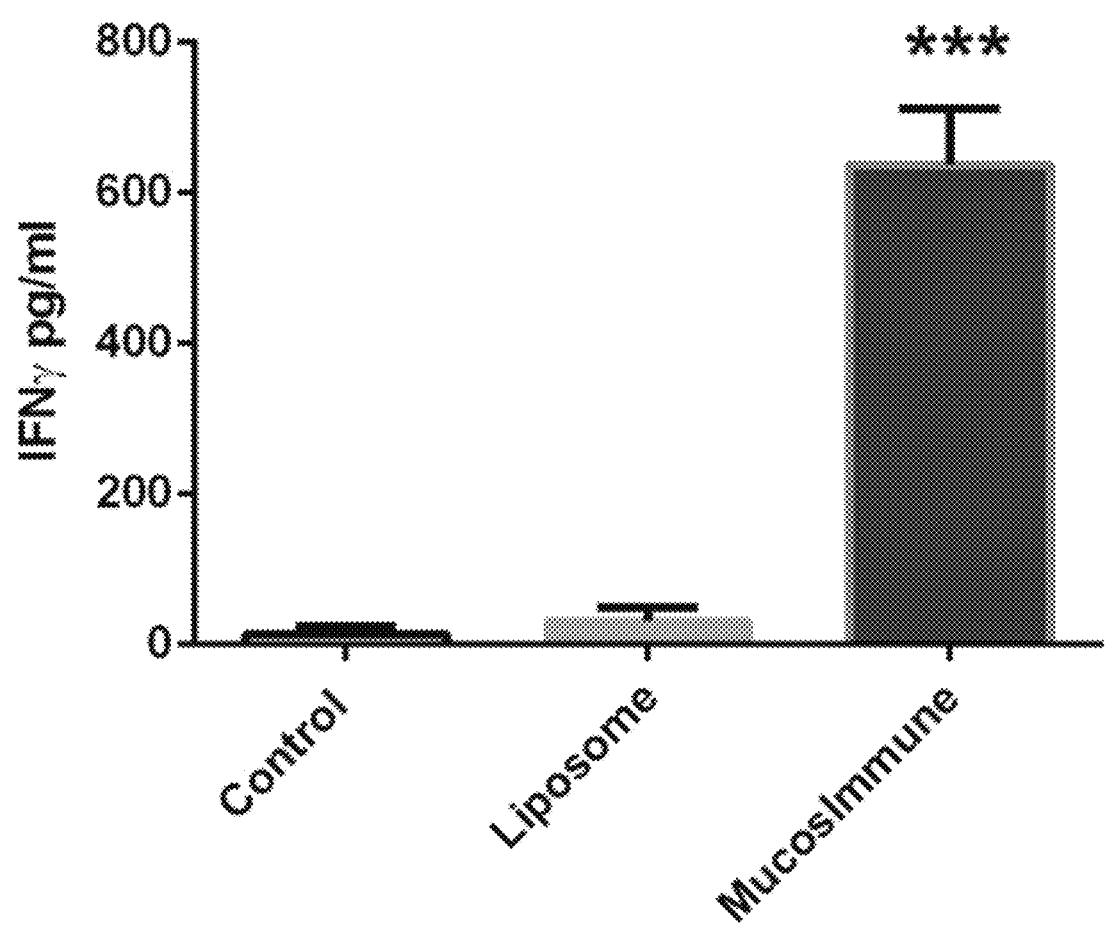
FIG. 2 illustrates data from a canine PBMC stimulation assay demonstrating increased immune stimulatory potency by inclusion of CMC with an immune stimulatory complex (CALNAC, cationic liposome nucleic acid complexes). of some embodiments disclosed herein.

In another exemplary method, in order to evaluate the effect of CMC on the immune potency, canine PBMC were incubated with CLDC complexes or CLDC+10% CMC for 24 h. IFN-γ release measured by ELISA as an indication of immune stimulation potency. FIG. 2 illustrates that the immune potency comparison of complexes of cationic liposomes and pIC and pDNA alone (CLDC) or CLDC plus 10% CMC (PCT-01). Complexes of CLDC+CMC (PCT-01 or MIM) were significantly more immune stimulatory than CLDC complexes.

Example 4

Figure 3:
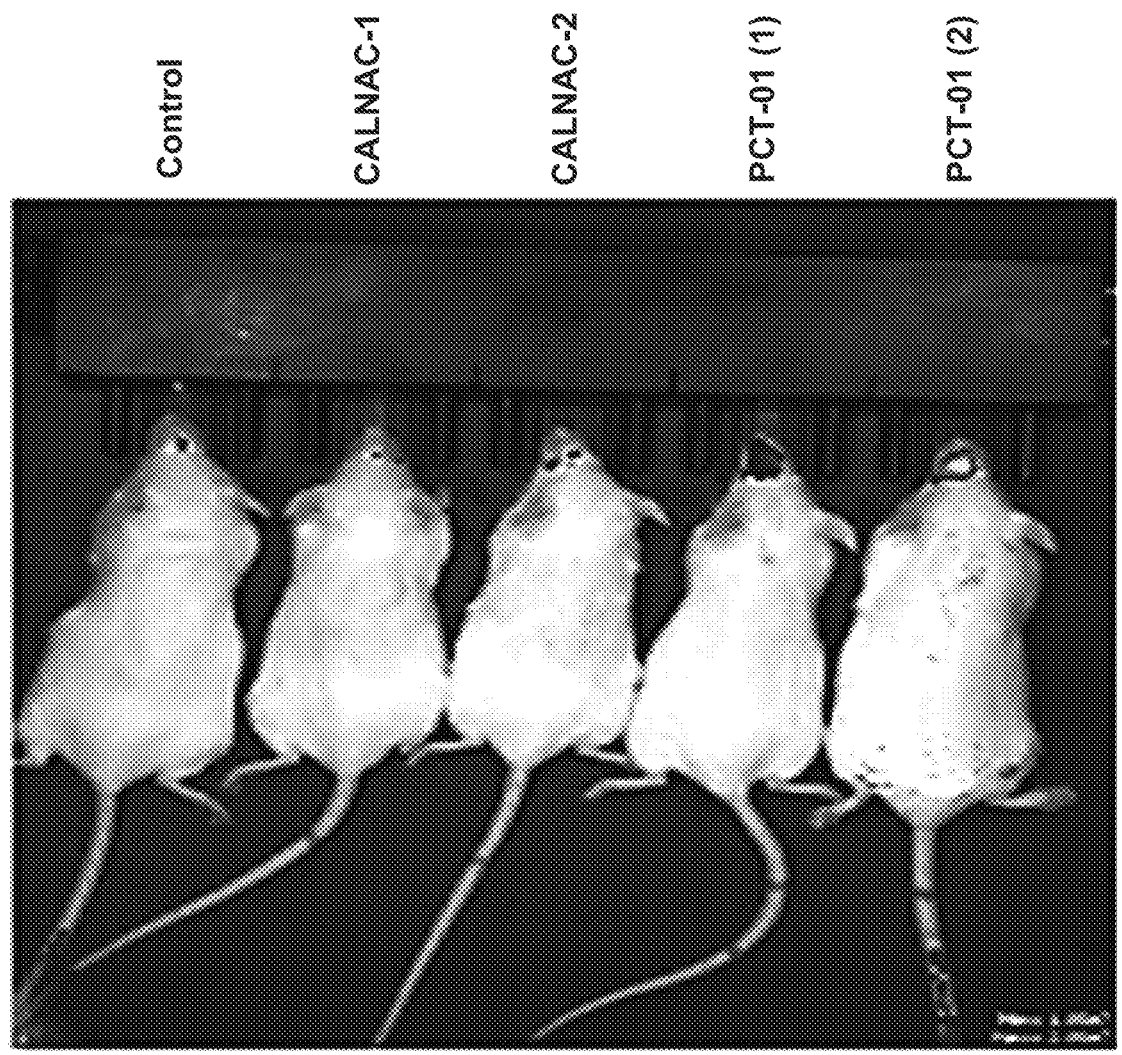
FIG. 3 illustrates exemplary imaging data from mice demonstrating increased in nasal cavity adhesion Animals are administered an immune stimulant (CALNAC, cationic liposome nucleic acid complexes) combined with CMC (e.g., PCT-01) and compared to administration of (CALNAC, cationic liposome nucleic acid complexes) alone of some embodiments disclosed herein.

In another exemplary method, to test the ability of CMC to affect adhesion to mucosal surfaces, mice were administered intranasally 50 μl CLDC or CLDC+CMC that had been labeled with a fluorescent dye to allow tracking in a live animal imager (IVIS). The amount of labeled material still present in the nostrils 60 min after administration was determined by live animal imaging. As illustrated in FIG. 3, compared to control animals (n=1) and animals administered CLDC (labeled CALNAC) alone (n=2), animals treated with CLDC+CMC (PCT-01, n=2) had significantly more material retained in their nostrils, indicating CMC contributes to mucosal surface adhesion.

Figure 4:
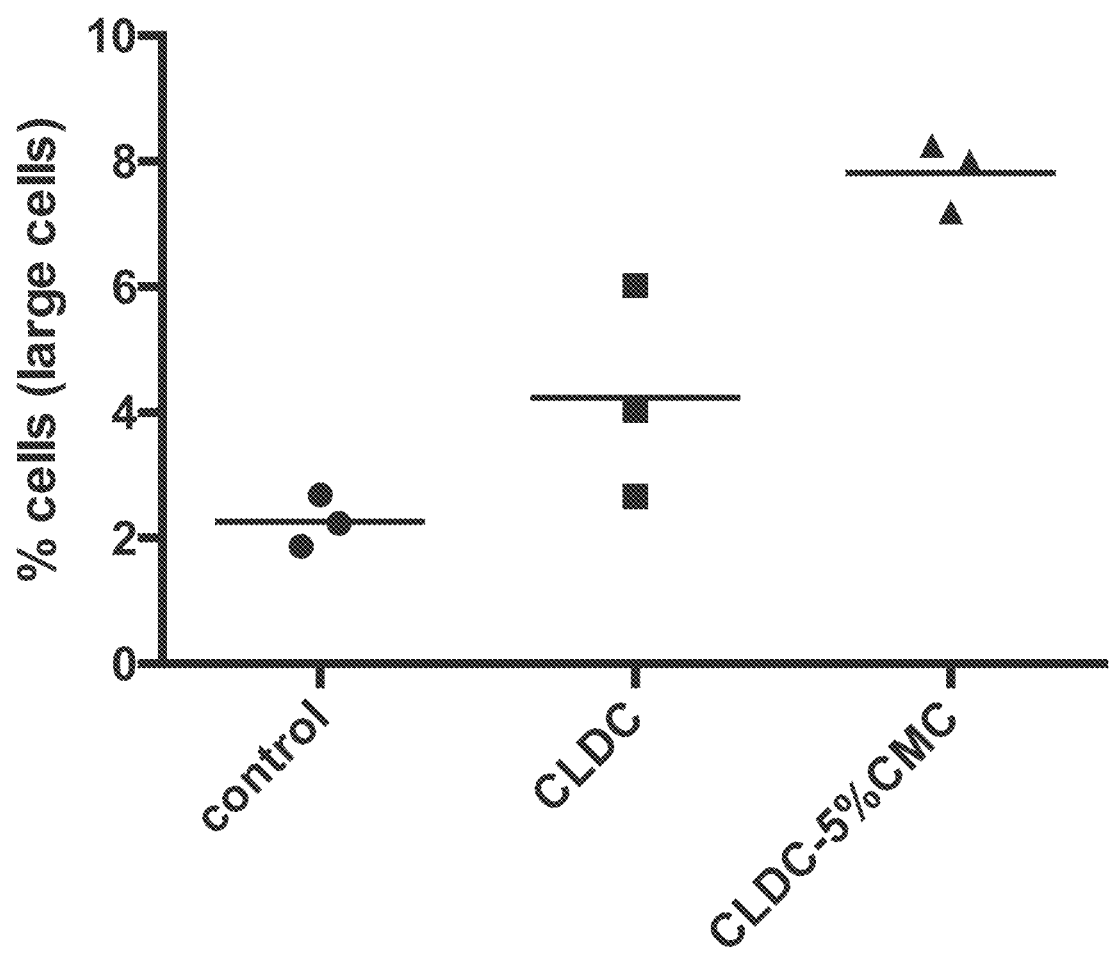
FIG. 4 illustrates exemplary flow cytometry data demonstrating increased immune response to an immunogenic composition (e.g., PCT-01) administered in the oropharynx of mice compared to CLDC (cationic liposome nucleic acid complexes) alone treatment groups of some embodiments disclosed herein.
Figure 5:
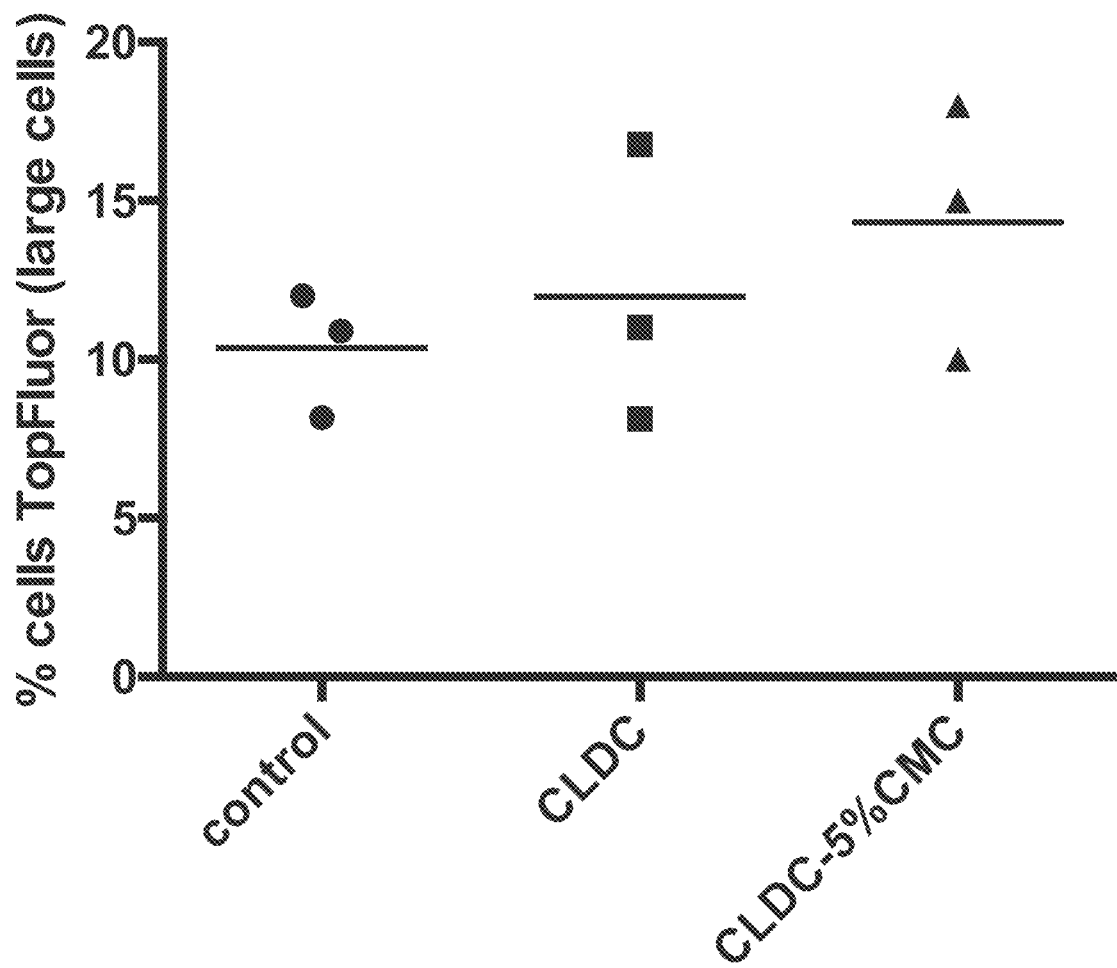
FIG. 5 illustrates exemplary flow cytometry data demonstrating increased immune response to an immunogenic composition (e.g., PCT-01) administered in oropharynx of mice compared to CLDC alone treatment groups of some embodiments disclosed herein.

In yet another exemplary method, to assess the effect of CMC on the ability of CLDC to elicit immune response, mice (n=3 per group) were administered CLDC or CLDC+ CMC (ie, PCT-01) orally, and 24 hours later, infiltrates of immune cells into the oropharynx was assessed by flow cytometry, using cells obtained from the oropharynx by swabs. As illustrated in FIG. 4, compared to control animals and animals treated with CLDC, animals treated with PCT-01 had a much stronger influx of immune cells into the oropharynx. To test the effect of nasal administration, mice (n=3 per group) were administered CLDC or CLDC+CMC (e.g., PCT-01) intranasally, and 24 hours later, infiltrates of immune cells into the nasal cavity was assessed by flow cytometry, using cells obtained from the nasal cavity by nasal lavage. As illustrated in FIG. 5, compared to control animals and animals treated with CLDC, animals treated with PCT-01 had a much stronger influx of immune cells into the oropharynx.

Example 5

Figure 6A:
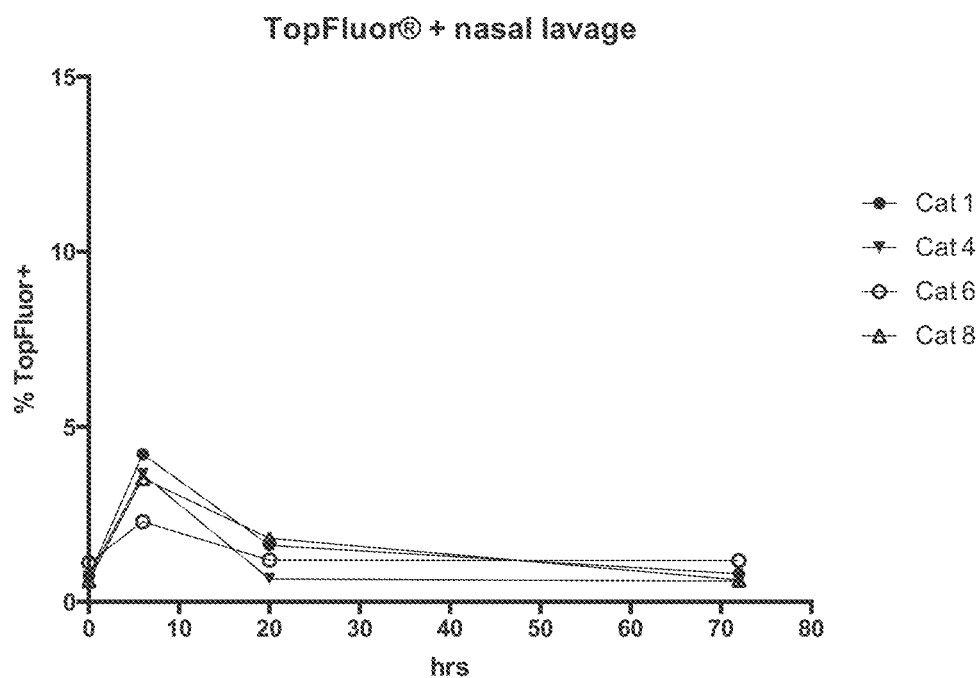
FIG. 6A illustrates exemplary flow cytometry data demonstrating liposome uptake by nasal cells in cats treated intranasally with CLDC of some embodiments disclosed herein.
Figure 6B:
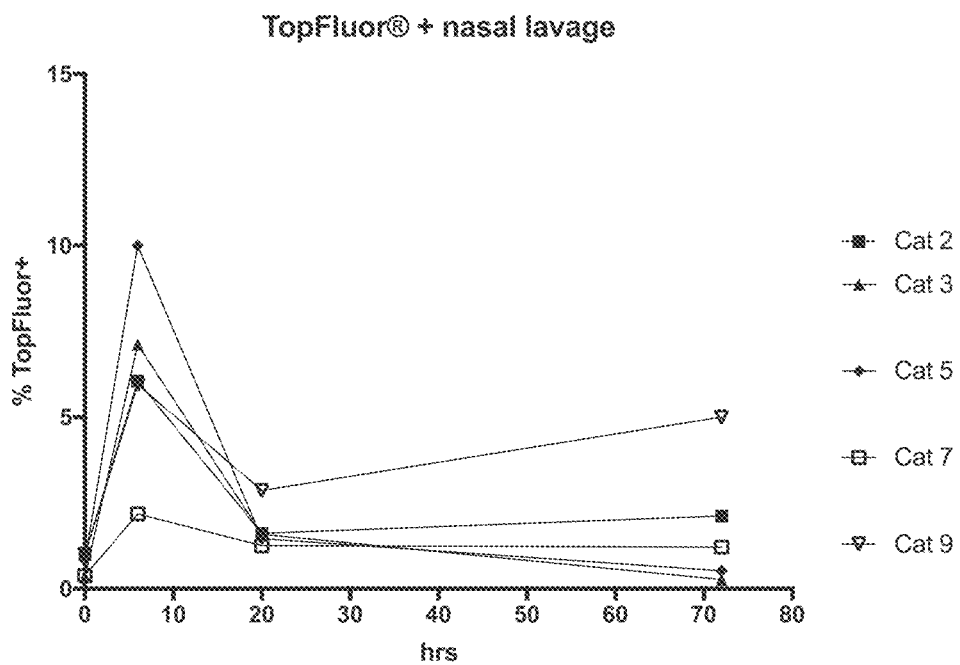
FIG. 6B illustrates exemplary flow cytometry data demonstrating liposome uptake by nasal cells in cats treated with an immunogenic composition (e.g., PCT-01) of some embodiments disclosed herein.

In one exemplary method, to assess the effect of CMC on the ability of CLDC to elicit immune response in felines, cats were treated intranasally with PCT-01 (CLDC+CMC) (n=5) and compared to cats treated with CLDC (n=4). To conduct the study, liposomes were labeled with a fluorescent dye to track their uptake by cells in the nasal and oropharyngeal mucosal. Healthy purpose-bred cats were treated intranasally with 0.3 ml labeled CLDC+CMC or labeled CLDC in each nostril. 24 hours later, nasal lavage samples were obtained and the percentage of cells that had contained labeled liposomes (TopFluor+) were compared between treatment groups, using flow cytometry. As illustrated in FIGS. 6A & B, nasal cells from cats treated with PCT-01 (FIG. 6A) had substantially more liposomes than from cats treated with CLDC (FIG. 6B). The study was repeated to assess liposome uptake by cells in the oropharynx. Healthy purpose-bred cats were treated orally with 1 ml labeled PCT-01 (n=5) or labeled CLDC (n=4) in each nostril. 24 h later, oropharyngeal swab samples were obtained and the percentage of cells that had contained labeled liposomes (TopFluor+) were compared between treatment groups, using flow cytometry. As illustrated in FIGS. 7A & B, oropharyngeal cells from cats treated with PCT-01 (FIG. 7A) had substantially more liposomes than from cats treated with CLDC (FIG. 7B).

Figure 8A:
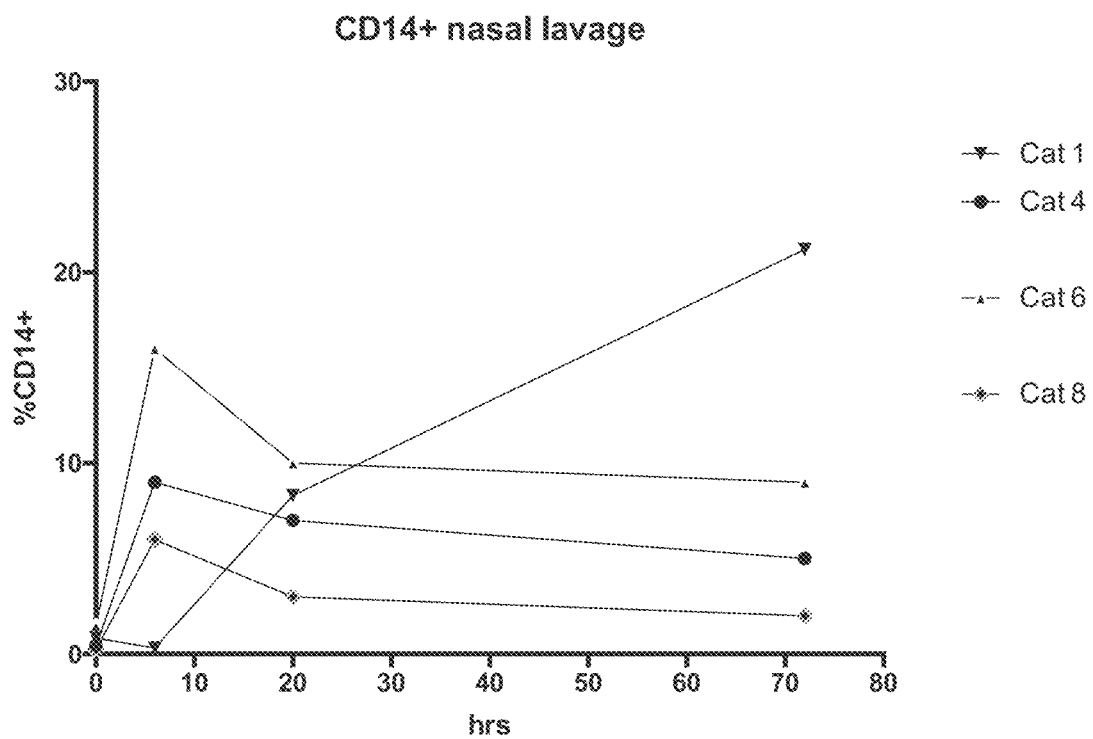
FIG. 8A illustrates exemplary flow cytometry data from the nose of cats treated intranasally with CLDC alone.
Figure 8B:
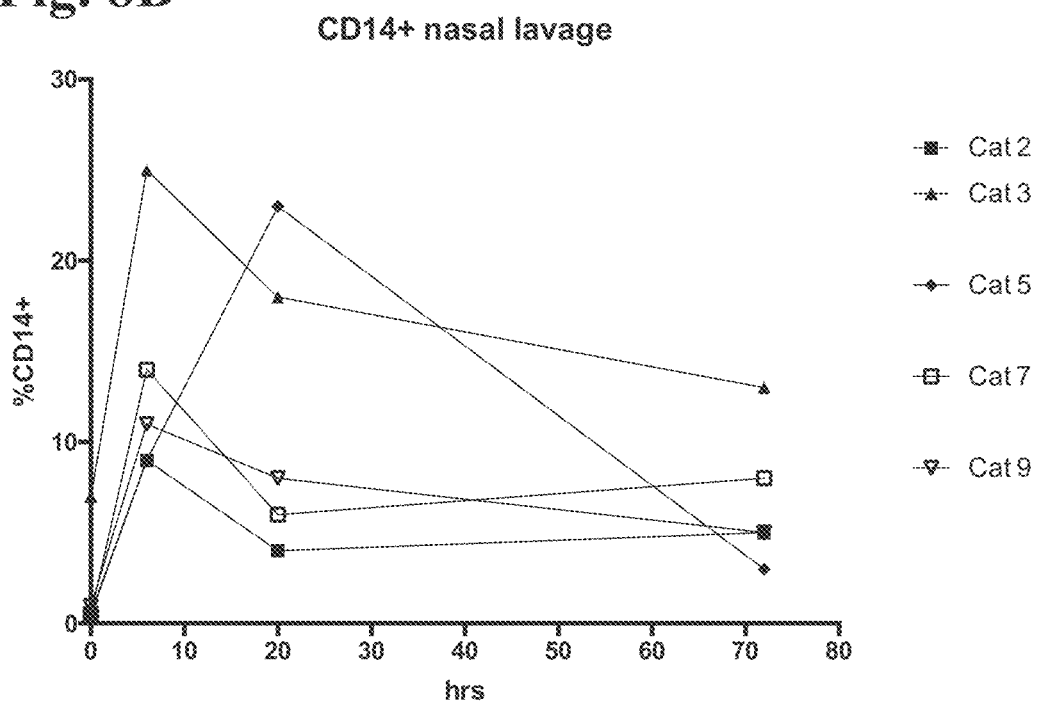
FIG. 8B illustrates exemplary flow cytometry data from nasal lavage samples from cats treated with an immunogenic composition (e.g., PCT-01: CLDC+CMC) of some embodiments disclosed herein.

FIGS. 8A and 8B illustrate increase in recruitment of nasal immune cells in cats treated intranasally with PCT-01 (CLDC+CMC) (n=5) compared to cats treated with CLDC (n=4). Healthy purpose-bred cats were treated intranasally with 0.3 ml PCT-01 or CLDC in each nostril. 24 hours later, nasal lavage samples were obtained and the percentage of Cd14+ monocytes (immune cells) in the nose were compared between treatment groups, using flow cytometry. Nasal lavage samples from cats treated with PCT-01 (FIG. 8A) had substantially more CD14+ monocytes than from nasal lavage samples from cats treated with CLDC (FIG. 8B). Substantial infiltrates of monocytes were observed in both the nose and throat of the treated cats, attesting to local immune stimulation by PCT-01.

Example 6

Figure 9:
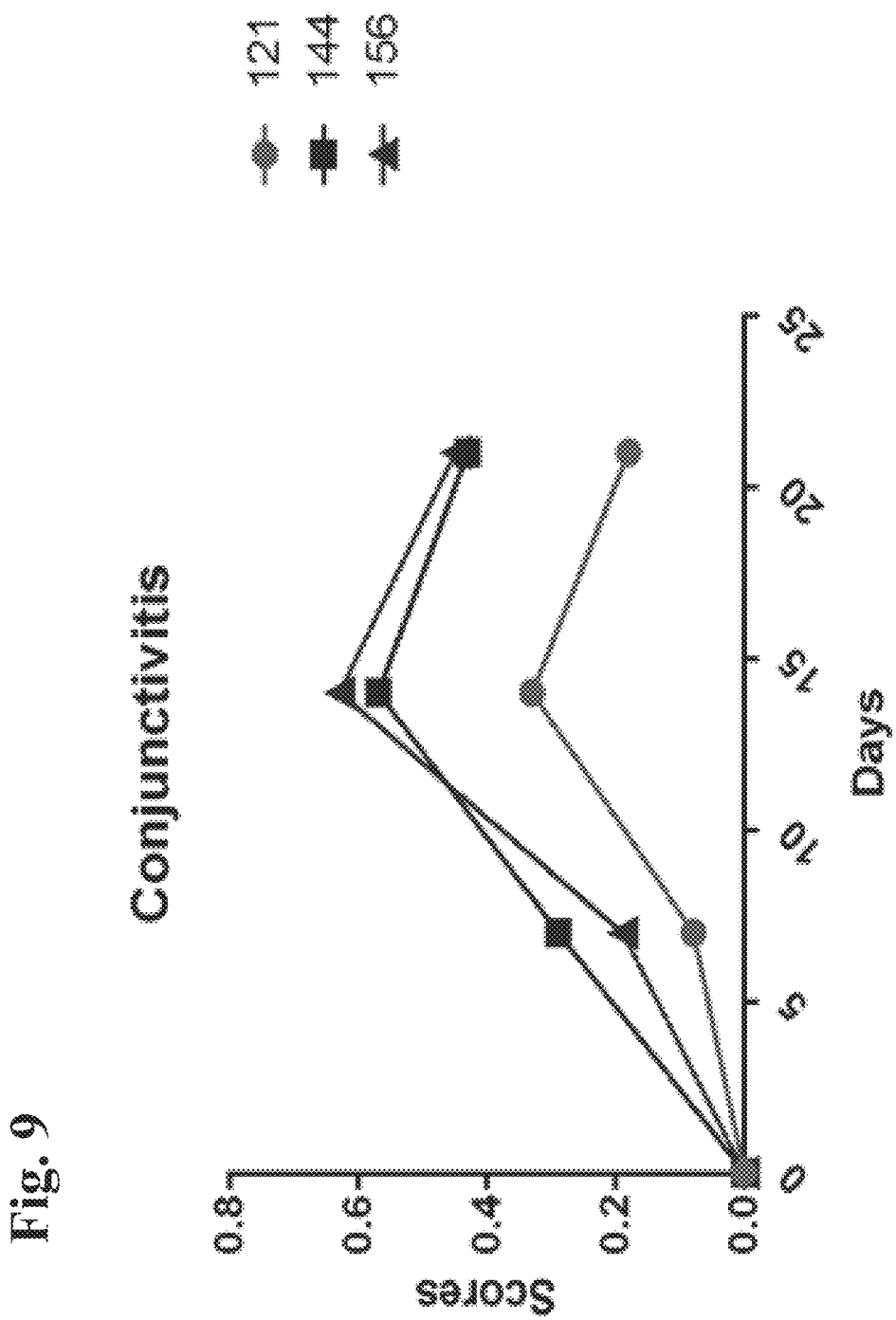
FIG. 9 illustrates exemplary data demonstrating reduced clinical signs of ocular conditions in cats challenged with FHV-1 and pre-treated 24 h prior to challenge with an immunogenic composition (e.g., PCT-01: CLDC+CMC) of some embodiments disclosed herein.
Figure 10:
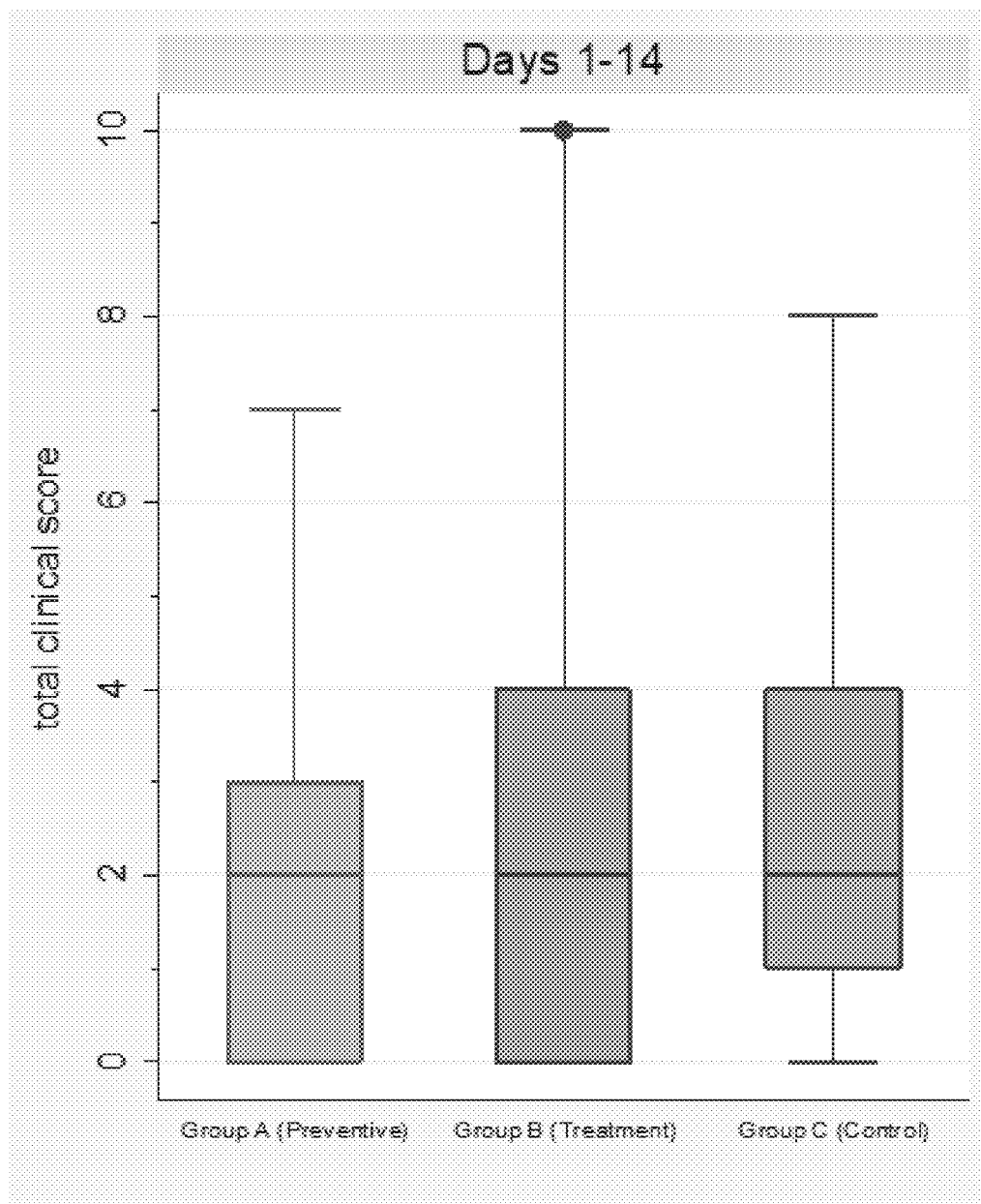
FIG. 10 illustrates exemplary clinical illness in cats pre-treated with an immunogenic composition (e.g., PCT-01: CLDC+CMC) 24 h prior to FHV-1 challenge of some embodiments disclosed herein.
Figure 11:
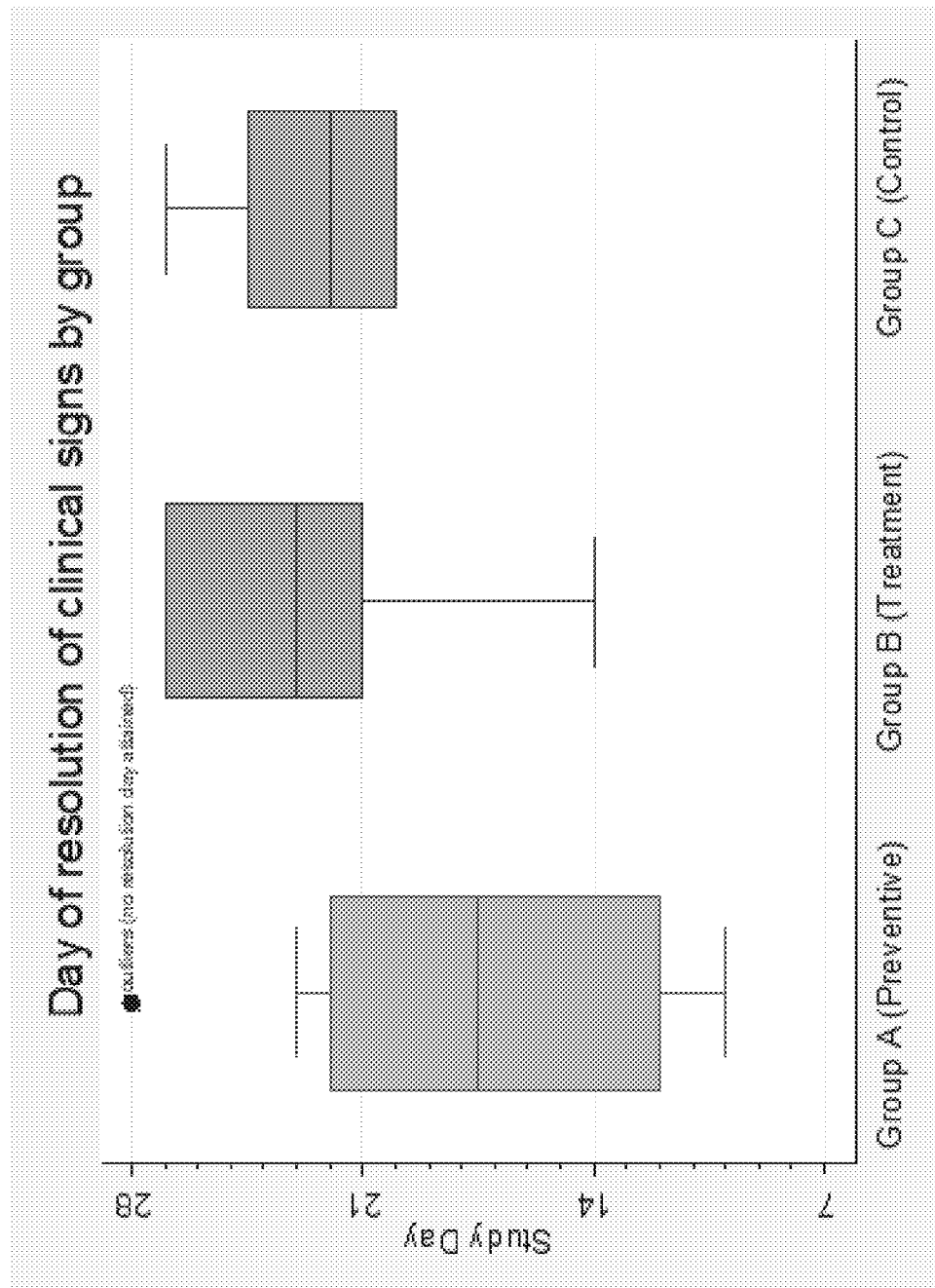
FIG. 11 illustrates exemplary clinical data indicating time to resolution of clinical signs significantly shortened in cats pre-treated with an immunogenic composition (e.g., PCT-01: CLDC+CMC) of some embodiments disclosed herein.

In another exemplary method, to test the ability of PCT-01 to affect clinical signs of ocular disease, a challenge study with feline herpesvirus type 1 (FHV-1) was conducted in purpose-bred cats. Three groups of cats (n=7 per group) including untreated control cats (group 156), cats pre-treated with PCT-01 24 h prior to challenge (group 121) and cats treated with PCT-01 when symptoms first developed (group 144), were monitored for clinical signs of infection (ocular signs, total clinical signs, body temp) and viral shedding by qRT-PCR for 28 days after the viral challenge was administered. As illustrated in FIG. 9, cats pre-treated with PCT-01 before challenge had a significant reduction in clinical ocular signs (squinting, ocular discharge) compared to control animals. As best seen in FIG. 10, total clinical scores in cats challenged with FHV-1 (FIG. 9) and pre-treated 24 h before challenge with PCT-01 were significantly lessened compared to control cats and cats treated after clinical signs developed. Furthermore, as illustrated in FIG. 11, cats challenged with FHV-1 and treated 24 h before onset of clinical signs experienced a significant reduction in the duration of clinical signs compared to control animals or animals treated once signs developed.

Figure 12:
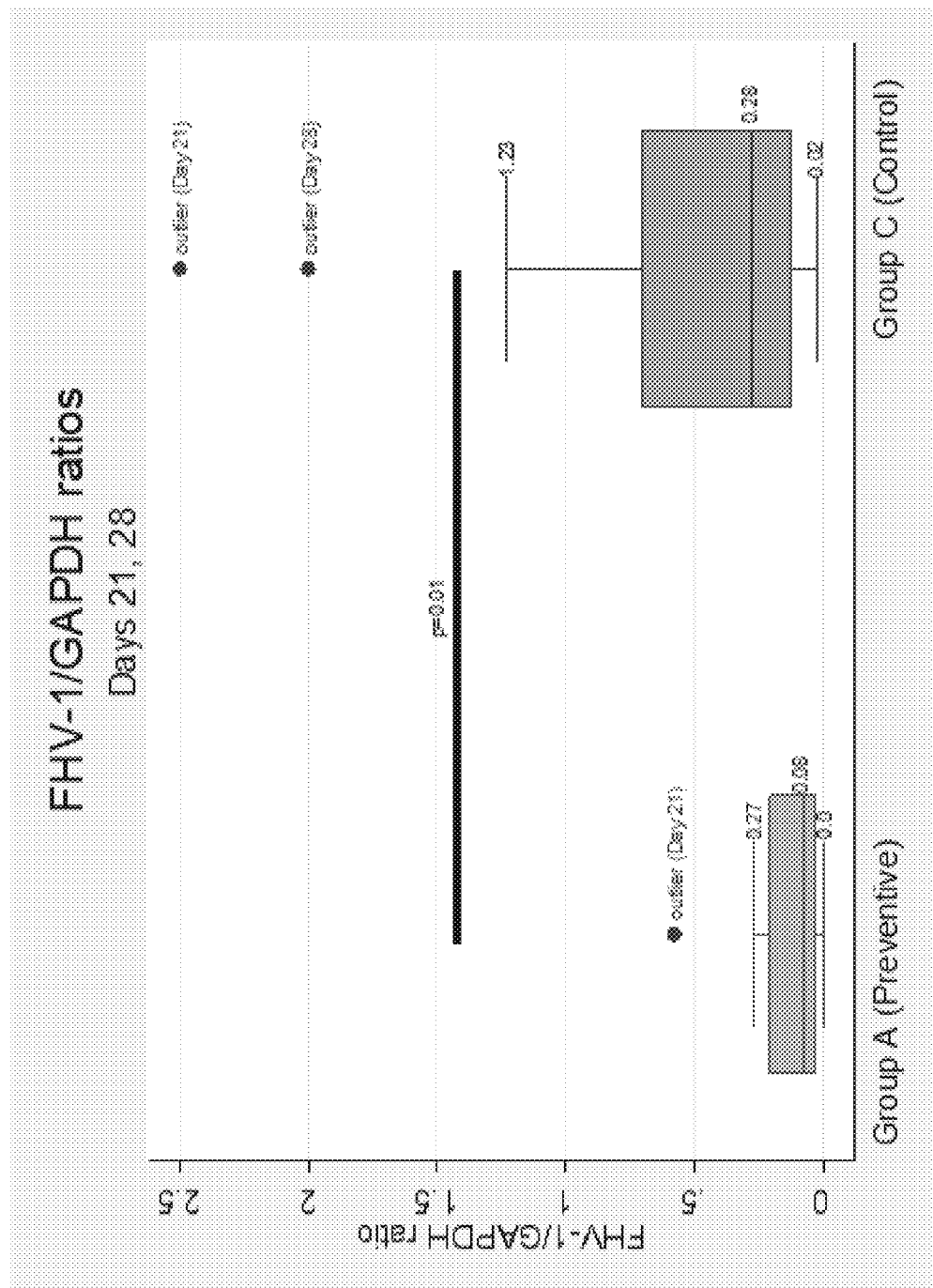
FIG. 12 illustrates exemplary qRT-PCR data indicating an immunogenic composition (e.g., PCT-01: CLDC+CMC) treatment significantly decreased viral shedding in cats challenged with FHV-1 of some embodiments disclosed herein.

FIG. 12 illustrates pre-treatment with PCT-01 significantly decreases viral shedding in cats challenged with FHV-1. Cats were pre-treated 24 h prior to FHV-1 challenge with PCT-01, and viral shedding from oropharyngeal swabs (as assessed by qRT-PCR) was compared to viral shedding by untreated control animals. As illustrated in FIG. 12, pre-treated with PCT-01 resulted in a significant decrease in viral shedding compared to untreated animals.

Example 7

Figure 13A:
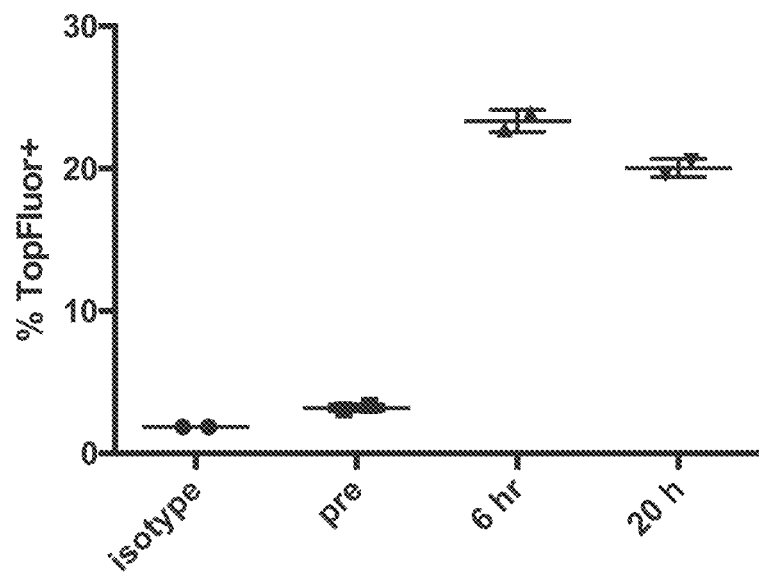
FIG. 13A illustrates exemplary data quantifying the uptake of an immunogenic composition (e.g., PCT-01: CLDC+CMC) by nasal lavage cells in a healthy dog.
Figure 13B:
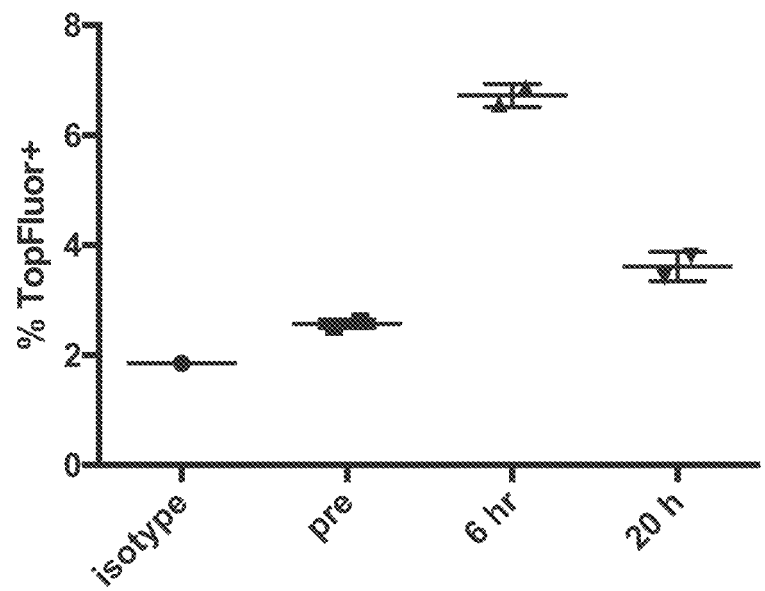
FIG. 13B illustrates exemplary data quantifying the update of an immunogenic composition (e.g., PCT-01: CLDC+CMC) by oropharyngeal cells following intranasal and oral administration in a healthy dog of some embodiments disclosed herein.

In another exemplary method, to assess the uptake of labeled PCT-01 by nasal and oropharyngeal cells in dogs, labeled PCT-01 were administered intranasally and orally to a healthy adult dog. 6 h and 20 h later, nasal lavage and throat swab samples were obtained, and the percent of cells containing labeled liposomes determined. As illustrated in FIGS. 13A & B, These studies found a substantial uptake of liposomes by nasal (FIG. 13A) and oropharyngeal (FIG. 13B) cells at 6 h and 20 h after administration.

In another exemplary method, to assess the stimulation of immune cell infiltrates into nose and throat of dogs, PCT-01 was administered intra-nasally (0.5 ml per nostril) and orally (2 ml) in a healthy adult dog. The effects on immune cell infiltrates in the nose and throat was determined 6 h and 20 h later. As illustrated in FIGS. 14A & B, substantial infiltrates of neutrophils and monocytes were observed in both the nose (FIG. 14A) and throat (FIG. 14B) of the treated dog, attesting to local immune stimulation by PCT-01. FIGS. 15A & B illustrate stimulatory effect in the nose and mouth, as measured CD4 T cell infiltrates.

In another study, expression of cytokine genes in the oropharynx of dogs treated with PCT-01 was assessed at 3 time points (24 h, 72 h, 7 days) following treatment in healthy Beagle dogs (n=5), using qRT-PCR and primers designed for amplification of canine cytokine genes. As illustrated in FIG. 33, induction of cytokine expression was observed at 24 h, and persisted for at least 7 days in the treated dogs, consistent with the activation of local, mucosal immune responses by PCT-01.

FIGS. 16A & B illustrate increased immune potency from combined TLR3 and TLR9 agonists. Spleen cells from mice were placed in culture in triplicate wells, and then incubated with the noted components for 24 hours to assess induction of immune activation (reflected by IL-12 secretion). While liposomes complexed with either polyIC or with plasmid DNA induced immune activation (IL-12 production), liposomes complexed with both pIC and pDNA together in the same complexes stimulated significantly greater immune activation.

Example 8

Figure 17A:
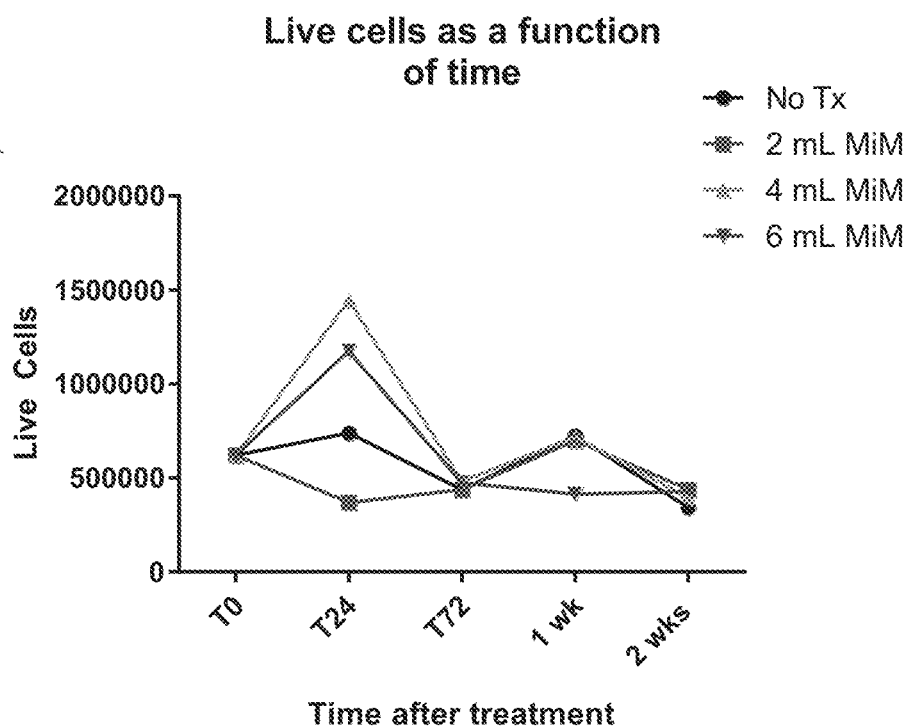
FIGS. 17A and 17B illustrate exemplary changes in nasopharyngeal cell counts from cattle over time following a single intranasal immunogenic composition (e.g., PCT-01.
Figure 17B:
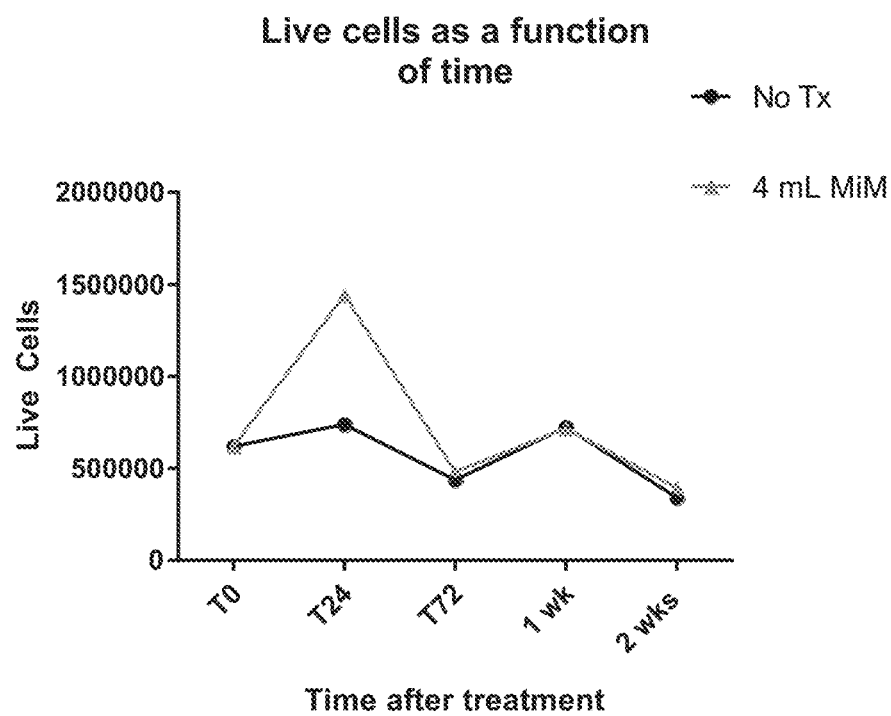

In some exemplary methods, to assess the ability of an exemplary formulation disclosed herein (e.g. PCT-01) to elicit a bovine immune response, cattle (n=5 per group) were treated by intranasal administration of 3 different doses of PCT-01 (2 ml, 4 ml, or 6 ml per animal, divided in two equal doses per nostril) using a nasal cannula. One additional untreated group served as a control. Prior to the initial dose, and then at 24 hours, 72 hours, 1 week and 2 weeks post administration, swabs of the throat were obtained from each animal, and the cells were removed from the swab by swirling and total cell counts obtained. As illustrated in FIGS. 17A & B, administration of PCT-01 at the 2 highest doses (e.g. 4 ml and 6 ml) elicited a significant increase in immune cell infiltration into the nasopharynx, which peaked at about 24 h and then declined to normal levels by about 72 h after administration.

In some exemplary methods, to assess the ability of an exemplary formulation disclosed herein (e.g. PCT-01), monocyte recruitment and immune activation were analyzed after administration to the oropharynx of cows. Cattle (n=5 per group) were treated with intranasal administration PCT-01 (e.g. MIM, about 4 ml) (2 ml per nostril) (or treated with saline only as a negative control, no Tx) and infiltrates of monocytes (CD14+ cells) in the nasopharynx were assessed by throat swabs and flow cytometric analysis. In addition, the upregulation of MHCII expression (measure of immune activation) was also assessed on the CD14+ monocytes by flow cytometry. As illustrated in FIGS. 18A & 18B administration of PCT-01 elicited a sustained increase in the percentage of monocytes in the nasopharynx (FIG. 18A) compared to untreated animals, and the monocytes were also activated, as reflected by upregulation of MHCII expression (FIG. 18B).

In some exemplary methods, to assess the ability of an exemplary formulation disclosed herein (e.g. PCT-01), to test the ability of PCT-01 to stimulate bovine cytokine production as markers of an enhanced immune response, cattle (n=5 per group) were administered PCT-01 intranasally (e.g. 2 ml or 4 ml) and cells obtained by nasopharyngeal swabbing were evaluated using qRT-PCR for cytokine expression. Several cytokine markers were evaluated for enhanced expression. FIG. 19 illustrates administration of PCT-01 (e.g. 4 ml) resulted in sustained expression of mRNA for cytokine IL-8 in nasopharyngeal cells for up to 14 days. FIG. 20 illustrates that administration of PCT-01 (e.g. 4 ml) resulted in sustained expression of mRNA for cytokine MCP-1 in nasopharyngeal cells for up to 14 days. FIG. 21 illustrates that administration of PCT-01 (e.g. 4 ml) resulted in sustained expression of mRNA for cytokine IFN-γ in nasopharyngeal cells for up to 14 days.

Example 9

Figure 16:
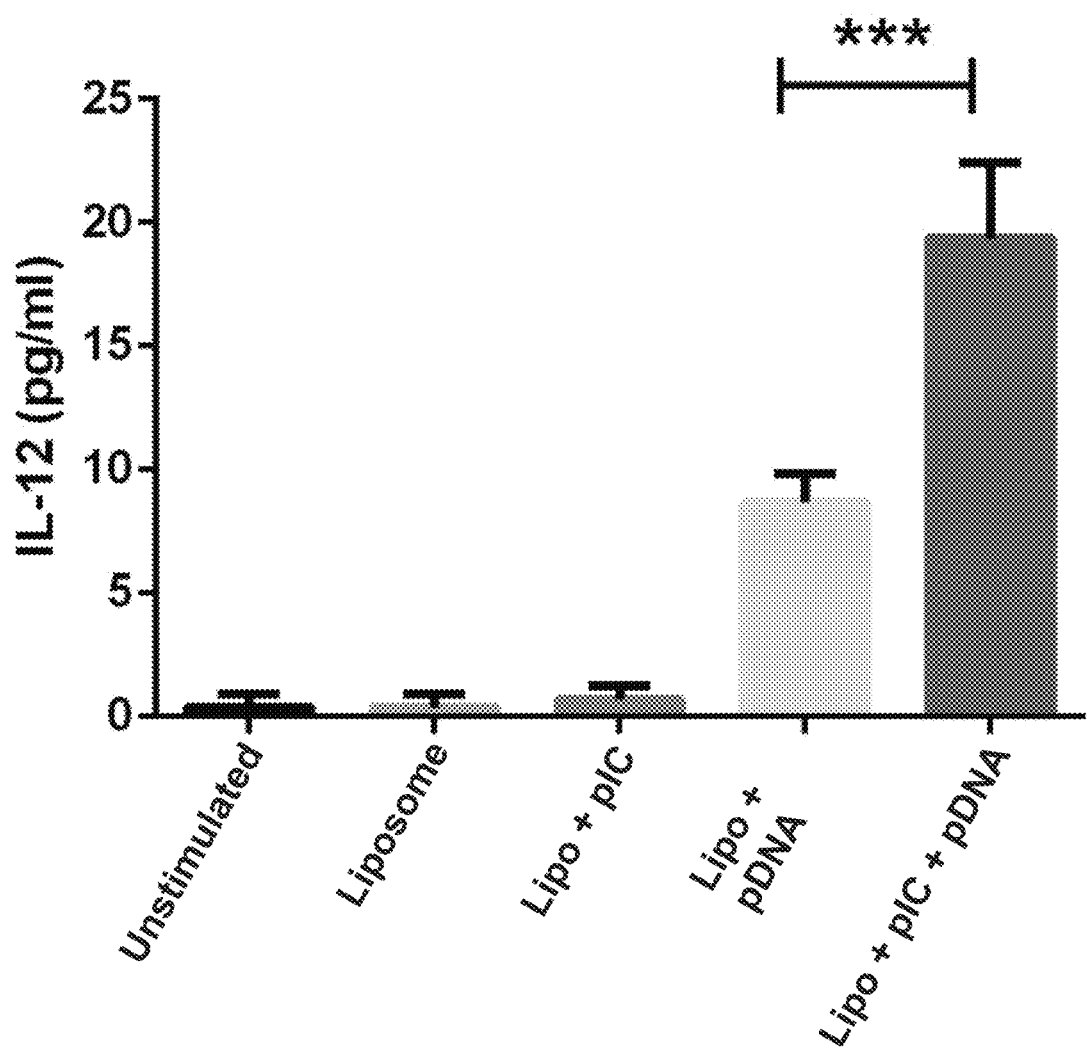
FIG. 16 illustrates exemplary IL-12 expression data indicating increased in vitro immune potency from combined TLR agonists, as present in an immunogenic composition (e.g., PCT-01: CLDC+CMC) of some embodiments disclosed herein.

In some exemplary methods, to assess the ability of an exemplary formulation disclosed herein (e.g. PCT-01), to evaluate the ability of PCT-01 to induce an enhanced immune response relative to other immune stimulants known in the art, two groups of cattle (n=5) were administered either PCT-01 (e.g. 4 ml/2 mL per nostril) or Zelnate™ (I.M. per manufacturer guidance) and the immune response was measured; for example, prior to treatment, 24 hours post-treatment and 72 hours post-treatment. FIGS. 22A & B illustrate that after 24 hours, PCT-01 treatment (FIG. 22A) yielded a larger increase in body temperature than Zelnate™ treatment (FIG. 22B). FIG. 23 illustrates data from flow cytometry analysis of nasopharyngeal swabs indicating greater upregulation of MHCII expression by monocytes (CD14+) in PCT-01 treated groups than in Zelnate treated groups. FIG. 24 illustrates exemplary data from qRT-PCR studies indicating IL-8 expression was upregulated more when administered PCT-01 compared to Zelnate™ administration. Furthermore, PCT-01 administration produced a much more rapid upregulation of IL-8 than did the commercially available composition, Zelnate™. qRT-PCR was also used to assess INF-α expression following PCT-01 and Zelnate™ administration. FIG. 16 shows INF-α expression was upregulated to a much greater degree by PCT-01 administration compared to Zelnate™ administration. It was observed that PCT-01 administration produced a more rapid upregulation of INF-α when compared to Zelnate™ administration. qRT-PCR studies were also performed to assess MCP-1 expression. FIG. 27 illustrates that PCT-01 produced a more robust induction of MCP-1 than administration of Zelnate™. Taken together, these data indicate that relative to a commercially available formulation Zelnate™, PCT-01 produces a significantly greater non-specific enhanced immune stimulatory response.

Example 10

In another exemplary method, in order to assess the immunological impact of an exemplary formulation disclosed herein (e.g. PCT-01), dairy cattle (n=5) were administered by infusion in one quarter of the mammary gland using PCT-01 (1 ml diluted in PBS). Pre-treatment lavage samples were obtained from the treated animal quarter 7d before infusion (pre-Rx) and then at 24 h, 72 h, and 7 days after PCT-01 infusion. As illustrated in FIG. 28, milk samples were evaluated cytologically for a cellular response to PCT-01 infusion, and demonstrated an influx of mononuclear cells (T cells) into the infused mammary gland quarter. These results are indicative of local induction of mammary gland immunity by PCT-01.

Example 11

In another exemplary method, in order to assess the immunological impact of an exemplary formulation disclosed herein (e.g. PCT-01), goats were administered PCT-01. Nasopharyngeal swabs were obtained from healthy adult goats (n=6) before PCT-01 administration and at 24 h, 72 h, and 7 days after treatment. As illustrated in FIG. 29, cell counts were determined from swab samples, and were found to be significantly increased at 72 h and 7 days after treatment.

In another exemplary method, in order to assess the immunological impact of an exemplary formulation disclosed herein (e.g. PCT-01) on monocyte response and cellular activation, monocyte infiltration and MHCII upregulation were assessed post administration. As illustrated in FIGS. 30A, percentages of CD14+ monocytes were determined from nasopharyngeal swabs samples post-treatment, and were found to be significantly increased 24 h after treatment. As illustrated in FIG. 30B, monocytes were found to be significantly activated (higher MHCII expression) at all post-treatment time points evaluated, indicative of sustained immune activation. In addition, as illustrated in FIG. 31, CD8 T cells were found to be significantly increased in nasopharynx swabs from goats following treatment.

As illustrated in FIG. 32, PCT-01 administration results in an increased percentage of γδ-T cells in goat cultured PBMC cells compared to controls. Blood leukocytes from healthy goats were placed in triplicate wells (e.g. 96-well plates in 100 μl complete medium) and PCT-01 was added to the wells, and the cultures were incubated for 48 h, at which point the cells were collected and immunostained for evaluation of cellular responses using, for example, flow cytometry. The results indicated that PCT-01 induced an increase in γδ-T cells in cultured goat leukocytes, compared to control cells not exposed to the immunogenic agent.

Example 12

In some exemplary methods, a starting material is referred to as previously disclosed immunogenic composition, MucosImmune (or MIM or PCT-01), and further includes a high viscosity carboxymethylcellulose (CMC). In these examples, MIM is mixed 50/50 v/v with 1% solution of high viscosity CMC to create a product (referred to as Ocummune). Addition of high viscosity CMC increases viscosity of Ocummune to gel-like consistency (typically, MIM is essentially a liquid). By adding the high viscosity agent, contact time is increased with the cornea and can assist with reducing corneal pain sensitivity. In other exemplary methods, a starting material is MucosImmune (MIM) and high molecular weight/high viscosity carboxymethylcellulose (CMC) MW=700 KDa of high viscosity (Sigma). In other exemplary methods, MIM can be mixed 50/50 v/v with 2% solution of high viscosity CMC to create final product (Ocummune) with final high viscosity CMC concentration of 1%. In some exemplary methods, Ocummune has a similar consistency to that of Surgilube™ (e.g. a common lube for placing urinary or nasopharyngeal catheters).

In other exemplary methods, Calu-3 cells, non-small-cell lung cancer cell line, that grows in adherent culture and displays epithelial morphology was tested for induction of cytokines (data not shown). It was demonstrated that interferons were also induced in these cell lines when exposed to immunogenic compositions disclosed herein.

In one exemplary method, in order to assess the immunological impact of an exemplary immunogenic formulation disclosed herein on chronic ocular infection in a subject, experimental protocols were applied to an animal model (e.g. cats) having chronic ocular herpes virus infection. A cat was observed pre-treatment having a chronic ocular herpesvirus infection and then treated with MIM further including a high viscosity carboxymethylcellulose additive (e.g. Sigma about 500 to 1,000 kDa such as 700 kDa carboxymethylcellulose, salt, high viscosity CMC) termed Ocummune. In one exemplary experiment, safety of the novel formulation was tested on mice and demonstrated no adverse effects following topical application of the immunogenic composition. Within 4 days of treatment, the cat demonstrated significantly improved infection (FIGS. 35A and 35B). In this experiment, it was observed that the clinical response after the immunogenic composition was used to treat the cat was significant. Within 4 days of treatment, the cat responded where the infection herpesvirus keratoconjunctivitis was previously refractory to standard treatments. In this experiment, treatment was applied once daily as a single drop to each eye. Substantial improvement was observed within 48 hr of treatment, and the animal has continued to have improvement in ocular signs for at least 3 months.

Example 13

In another exemplary method, in order to assess the immunological impact of an exemplary immunogenic formulation disclosed herein on an eye-related cancer in a subject, experimental protocols were applied to an animal model (e.g. horses) having corneal cancer. Horses having corneal cancer were observed pre-treatment having eye tumors and then post treatment: at 2 weeks, 4 weeks and 6 weeks with MIM further including a high viscosity carboxymethylcellulose additive (e.g. Sigma about 500 to 1,000 kDa such as 700 kDa carboxymethylcellulose, salt) referenced herein as Ocummune (an immunogenic ocular formulation disclosed herein). Of note, seven horses with advanced corneal SCC were treated with Ocummune, administered by both local subconjunctival injection (once every 2 weeks for 3 treatments) and topical treatment every other day for 8 weeks. Marked lesion regression was evident within 2 weeks of starting treatment, and progressing to complete lesion regression by week 6. Five of the 7 treated horses experienced significant lesion regression, without evidence of any significant adverse effects. At 4 weeks, positive responses were observed where essentially no tumor remained in the cornea of 5 of 7 horses. At 6 weeks, positive results were continued to be observed. (See for example, FIG. 36A to 36D). In this experiment, it was observed that the clinical response after the immunogenic composition was used to treat eye tumors in a horse were significant. Further, in this study, horses were treated by injectable formulations and by topical treatment. It was also observed that the horses were less sensitive to the treatment compared to other commercially available products, for example, by reducing pain associated with the tumors and tumor regression. In this exemplary method, horses were treated every other day (e.g. 2-3 drops) of the eye product to the affected eye. In these studies, the ocular immunotherapy material was also injected into the larger cancer lesions, for two injections at 1-week intervals. These findings indicate that ocular immunotherapies disclosed herein is capable of generating significant antitumor activity in an acceptable spontaneous animal model of ocular squamous.

In another exemplary method, in order to assess the immunological impact of an exemplary immunogenic formulation disclosed herein on corneo-limbal squamous cell carcinoma (SCC) in a subject, experimental protocols were applied to an animal model (e.g. horses) having corneo-limbal SCC. Horses having this cancer were observed pre-treatment having eye tumors and then post treatment: at 2 weeks, 4 weeks and 6 weeks with MIM further including a high viscosity carboxymethylcellulose additive (e.g. Sigma about 500 to 1,000 kDa such as 700 kDa carboxymethylcellulose, salt) termed herein as Ocummune which is either a 1% or a 2% CMC formulation. The horses (3 horses, 2 are represented in this figure) were treated by topical application only. Within 2 weeks of treatment, positive responses were observed in both treated horses. No adverse effects observed. At 2-4 weeks, positive responses were observed where essentially no tumor remained in the cornea of 5 of 7 horses. At 6 weeks, positive results were continued to be observed. (See for example, FIG. 37A to 37D). In this experiment, it was observed that the clinical response after the immunogenic composition was used to treat eye tumors in a horse were significant. It was also observed that the horses were less sensitive to the treatment compared to other commercially available products, for example, by reducing pain associated with tumors and side effects due to tumor regression (e.g. chronic wounds) In this exemplary method, horses were treated every other day (e.g. 2-3 drops) of the eye product to the affected eye. All horses treated in this manner experienced significant regression of ocular lesions, with complete resolution in 2 of the 3 treated horses. These findings are important because they indicate that this ocular immunotherapy is capable of generating significant antitumor activity in an acceptable spontaneous animal model of ocular squamous cell carcinoma. In some animals, the ocular immunotherapy material was also injected into the larger cancer lesions, for two injections at one-week intervals as noted herein (these injectables did not include the additional adhesion agent as added to the topical formulations, MIM without the adhesion agent included in eye formulations).

Example 14

FIGS. 38A and 38B illustrate an exemplary response to topical treatment using certain immunogenic compositions to treat an infection in a mammal (feline). 38A is pre-treatment compared to 38B after a period of time to treat the eye of the mammal according to certain embodiments disclosed herein.

In this exemplary experiment, treatment of cats having ocular herpesvirus infection lead to a rapid resolution of clinical signs of conjunctivitis. Cats with naturally occurring feline herpesvirus type 1 (FHV-1) infection of the eye were treated with daily topical administration of immunogenic ocular formulations (referred to as Ocummune having 1% and 2% CMC of use in this example), with 1-2 drops administered per eye twice daily. Animals were treated for a total of 10 days. In this example, a cat with severe FHV-1 induced conjunctivitis prior to treatment, experienced dramatic improvement in ocular effects of the herpes infection within 3 days of treatment. Similar improvement in clinical illness was observed in 6 of 7 cats with naturally-occurring infections treated with the same formulation. Adverse effects from treatment were not observed in any treated animals. These findings are important because treatment of cats with FHV-1 conjunctivitis with typical ophthalmic eye drops rarely induces resolution of clinical signs sooner than 7-14 days into infection and often the infections are chronic.

Example 15

FIGS. 39A-39B illustrates in FIG. 39A, a schematic diagram of some components of certain immunogenic ocular formulations disclosed herein. Some exemplary formulations disclosed and used herein include, but are not limited to, an immunogenic ocular formulation of cationic liposomes complexed to TLR3 and TLR9 nucleic acid agonists, for example approximately an 1:1 ratio by weight of the TLR3 to TLR9 nucleic acid agonists and a cell adhesive agent (e.g. carboxymethylcellulose (CMC)); for example at two concentrations (1% and 2% CMC). These formulations improve adherence of the active agents, liposome-TLR complexes, to components of the eye such as the cornea and adnexal tissues. These formulations augment and prolong tissue immune stimulation. Multi immune stimulants leads to more potent, broader immune responses with at least one adhesive for sustained immune activation (e.g. in the eye of the subject) with diverse application such as targeting microbial infections, cancer and other systems in need of immune modulation.

Regarding FIG. 39B is a representative image of fluorescently labeled immunogenic ocular formulations introduced to a subject after being taken up by epithelial cells of the eye of the subject according to certain embodiments disclosed herein. In one exemplary method, human corneal primary epithelial cells in culture were incubated for about 30 minutes with the immunogenic ocular formulation (referenced as Ocummune) labeled with fluorescent (green) liposomes to allow tracking of cell uptake of the formulation. There was uptake of labeled formulation by corneal epithelial cells, indicating that the normal corneal epithelial cells are capable of taking up the formulations of immunotherapeutic complexes. Further, this observations provides support that other cells surrounding the eye, including cells in the adnexa, are also able to take up the formulations providing cell activation as detailed in these examples.

In another exemplary method, safety testing of immunogenic ocular formulations (Ocummune) was assessed in rodent and dog models (data not shown). To establish the safety of topically applied formulations, control mice (n=5 per group) were treated twice daily with 1 drop of the formulation per eye, for two consecutive weeks. A skilled artisan (an ophthalmologist) graded the treated eyes for evidence of inflammation and compared the treated animals with control animals treated with saline eye drops twice daily for the same period of time. It was observed that there was no significant differences in eye inflammation scores between the formulation-treated and control groups, indicating no evidence of ocular toxicity. A similar 2-week study was also done in healthy dogs (n=6, data not shown. beagles). It was again observed that there was no evidence of ocular toxicity.

Example 16

In another exemplary study represented in FIGS. 40A-40B immune activation of monocytes in control and treated human monocyte cells was assessed using immunogenic ocular formulations disclosed herein. In this method, activation of human immune cells (monocytes) were assessed in the presence and absence of these formulations. Human THP-1 monocyte cells were incubated in vitro, in triplicate wells for each condition, with 3 different concentrations of the formulation using 2 different adhesion concentrations in the formulations, and the impact on cellular activation was assessed by measuring cytokine production. The two ocular formulations evaluated included those prepared with 1% and 2% CMC, which produced formulations with relatively low and relatively high viscosity, respectively. Induction of interferon alpha (IFN-α, 40A) and IFN-β (40B) secretion by THP-1 cells following stimulation by the immunogenic ocular formulation after 24 hours was measured in cell culture supernatants, using commercial human IFN-α and IFN-β ELISA assays. Both CMC formulations were observed to stimulate substantial dose-dependent production of both IFN-α and IFN-β by THP-1 cells (monocytes). This observation is important in part because IFNs such as IFN-α and IFN-β are important mediators of both antiviral and antitumor activity in the eye. It is understood by those of skill in the art that monocytes are one of the immune cells that patrol the eye and respond to viral and neoplastic conditions such as infections and metastatic and local tumors.

In another exemplary study represented in FIGS. 41A-41B, immune activation of human epithelial cells by ocular formulations disclosed herein (Ocummune) was examined herein. In this example, human epithelial cells (A549 cells) were incubated in vitro, in triplicate wells for each condition, with three different concentrations of the formulation at two different adhesion agent concentrations. The two adhesion agent concentrations in the immunogenic ocular formulations evaluated included 1% and 2% CMC, which produced formulations with relatively low and high viscosity, respectively. Induction of interferon alpha (IFN-α, 41A) and IFN-β (41B) secretion by the epithelial cells following incubation for 24 hours with and without the formulation was measured in cell culture supernatants, using commercially available human IFN-α and IFN-β ELISA assays. Both CMC formulations were observed to stimulate dose-dependent production of IFN-α and high levels of IFN-β by the epithelial cells (A549 cells). As noted above, these IFNs are important mediators of antiviral and antitumor activity in the eye. It is further noted that epithelial cells are one of the key cells that take up the tested ocular formulation in the eye and associated tissues and respond to viral infection and presence of tumors.

In another exemplary method, blood leukocytes were analyzed for induction and cytokine production after treatment with and without immunogenic formulations disclosed herein (MIM without the adhesion agent). In these experiments, induction of IFN was analyzed. It was observed in the analyzed blood leukocytes that immunogenic formulation (MIM, PCT-01, 0.1, 1, 5, 10, 25 and 50 µl/ml) treated samples stimulated production of IFN-α, IFN-β and IFN-γ (data not shown) even at the lowest concentrations tested. It was observed that IFN-γ production was dose dependent and was observed induced at the lowest level tested. As noted previously, these IFNs are important mediators of antiviral and antitumor activity in the eye and systemically to prevent or treat infections and/or reduce spread and/or treat cancer. Therefore, multiple treatment approaches can be used to induce a non-specific immune response such as topical and directly at the site or systemic administration, if needed.

Example 17

In another exemplary study, it was observed that immunogenic ocular formulations disclosed herein (Ocummune) induce more potent and more sustained immune activation than free TLR3 ligand (pIC) not combined with a TLR9 ligand and not in a complex. The potency of the immunogenic ocular formulation using increased concentrations was compared to a known innate immune stimulant (free pIC) by stimulating human epithelial cell line A549 (triplicate wells of 1×105 cells per well in tissue culture medium) with increasing concentrations (matched for pIC concentration) of free pIC or the immunogenic ocular formulation (Ocummune), and measuring IFN-β release in cell culture supernatants after 24 h, 48 h, 72 h, 96 h, and 120 h of incubation as an indicator of cytokine stimulation. The immunogenic ocular formulations (Ocummune complexes) were significantly more potent at inducing IFN-β release, compared to free, concentration matched pIC. In addition, the immunogenic ocular formulations (Ocummune complexes) stimulated IFN-β release for significantly longer periods of time than the free pIC. These findings are important in part because they support the observation that topical application of immunogenic ocular formulations (Ocummune) to the eyes are much more effective in stimulating anti-viral or anti-tumor activity to treat an eye condition than administration of a known stimulating agent, free pIC, as a topical immune stimulant.

All of the COMPOSITIONS and METHODS disclosed and claimed herein may be made and executed without undue experimentation in light of the present disclosure. While the COMPOSITIONS and METHODS have been described in terms of preferred embodiments, it will be apparent to those of skill in the art that variation may be applied to the COMPOSITIONS and METHODS and in the steps or in the sequence of steps of the METHODS described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An ocular immunogenic composition comprising:
   (a) cationic liposomes; wherein the cationic liposomes comprise a mixture of cationic lipids and non-charged lipids;
   (b) at least one of a toll like receptor 3 (TLR3) and a toll like receptor 9 (TLR9) ligand or a mixture thereof; and
   (c) a cellular adhesion agent having a high viscosity.

2. The composition according to claim 1, wherein the mixture of cationic lipids and non-charged lipids comprises DOTAP or DOTIM and cholesterol.

3. The composition according to claim 1, wherein the mixture of TLR3 and TLR9 ligands comprises a mixture of non-coding plasmid DNA or CpG oligodeoxynucleotides; and polyinosinic, polycytidylic acid (polyI:C).

4. The composition according to claim 3, wherein the non-coding plasmid DNA comprises a polynucleotide represented by SEQ ID NO. 1.

5. The composition according to claim 1, wherein the mixture of TLR3 and TLR9 ligands comprises plasmid DNA and polyI:C in about a 1:1 ratio, about a 2:1 ratio, or about a 1:2 ratio.

6. The composition according to claim 1, wherein the high viscosity cellular adhesion agent comprises one or more of carboxymethylcellulose (CMC), chitosan, polyglycol, a poloxamer, a polymer, or hyaluronan.

7. The composition according to claim 1, further comprising a cellular adhesion agent of low- to mid-weight viscosity.

8. The composition according to claim 1, wherein the high viscosity cellular adhesion agent is carboxymethylcellulose (CMC).

9. The composition according to claim 1, further comprising a protein antigen derived from a pathogen, a tumor, or a peptide fragment thereof.

10. The composition according to claim 1, wherein the composition is a gel-like consistency capable of dropwise delivery.

11. The composition according to claim 1, wherein the composition further comprises a pharmaceutical composition and further includes a pharmaceutically acceptable excipient.

12. A method for inducing a non-specific immune response in a subject, comprising administering to the subject a composition according to claim 11.

13. The method according to claim 12, wherein the subject has an eye disorder.

14. The method according to claim 13, wherein the eye disorder comprises cancer, an infection, or an ulcer.

15. The method according to claim 13, wherein the eye disorder comprises a condition of the cornea.

16. The method according to claim 13, wherein administering comprises administering the composition topically to an eye of the subject.

17. The method according to claim 12, wherein administering comprises administering dropwise to an affected area or region; or administering as an ointment or cream, or a combination thereof to the subject.

18. The method according to claim 12, wherein the subject is a human.

19. The method according to claim 12, wherein the subject is livestock, a bird, a reptile, a fish, an amphibian, a non-human primate, a companion animal, a sport animal, or a farm animal.

20. The method according to claim 12, wherein the subject is a horse, cattle, a sheep, a pig, a rabbit, a dog, a donkey, a llama, a goat, a cat, a guinea pig, a deer, a elk, a fox, a coyote, a wolf, a rodent, a chicken, a turkey, a duck or a fishery fish.

21. The composition according to claim 1, wherein the cellular adhesion agent having high viscosity comprises carboxymethylcellulose (CMC) and the CMC comprises a concentration of about 0.5% v/v to about 10% v/v; about 0.5% v/v to about 5.0% v/v; or about 0.5% v/v to about 3.0% v/v.

22. A kit comprising the composition according to claim 1 and at least one container.

23. The kit according to claim 22, wherein the kit further comprises an eye delivery device.

* * * * *

SEQUENCE LISTING

```
<160> NUMBER OF SEQ ID NOS: 2

<210> SEQ ID NO 1
<211> LENGTH: 2152
<212> TYPE: DNA
<213> ORGANISM: Artificial Sequence
<220> FEATURE:
<223> OTHER INFORMATION: Non-coding plasmid DNA and TLR3 agonist

<400> SEQUENCE: 1
taccctgaat tcatttcact tgcgactttg gctgcttttt gtatggtgaa ggatgcgccc      60
tggcgcgcat acacagcaca tctctttgca ggaaaaaaac gctgtgaaaa atgttggttt     120
tatcggctgg cgcggaatgg tcggctctgt tctcatgcaa cgcatggtag aggagcgcga     180
tttcgacgct attcgccctg ttttcttttc tacctcccag tttggacagg cggcgcccac     240
cttcggcgac acctccaccg gcacgctaca ggacgctttt gatctggatg cgctaaaagc     300
gctcgatatc atcgtgacct gccagggcgg cgattatacc aacgaaattt atccaaagct     360
gcgcgaaagc ggatggcagg gttactggat tgatgcggct tctacgctgc gcatgaaaga     420
tgatgccatt attattctcg acccggtcaa ccaggacgtg attaccgacg gcctgaacaa     480
tggcgtgaag acctttgtgg gcggtaactg taccgttagc ctgatgttga tgtcgctggg     540
cggtctcttt gcccataatc tcgttgactg ggtatccgtc gcgacctatc aggccgcctc     600
cggcggcggc gcgcgccata tgcgcgagct gttaacccag atgggtcagt tgtatggcca     660
tgtcgccgat gaactggcga cgccgtcttc cgcaattctt gatattgaac gcaaagttac     720
ggcattgacc cgcagcggcg agctgccggt tgataacttt ggcgtaccgc tggcgggaag     780
cctgatcccc tggatcgaca aacagctcga taacggccaa agccgcgaag agtggaaagg     840
ccaggcggaa accaacaaga ttctcaatac tgcctctgtg attccggttg atggtttgtg     900
tgtgcgcgtc ggcgcgctgc gctgtcacag ccaggcgttc accatcaagc tgaaaaaaga     960
ggtatccatt ccgacggtgg aagaactgct ggcggcacat aatccgtggg cgaaagtggt    1020
gccgaacgat cgtgatatca ctatgcgcga attaaccccg gcggcggtga ccggcacgtt    1080
gactacgccg gttggtcgtc tgcgtaagct gaacatgggg ccagagttct tgtcggcgtt    1140
taccgtaggc gaccagttgt tatggggcgc cgccgagccg ctgcgtcgaa tgctgcgcca    1200
gttggcgtag tggctaataa aacgaaaggc tcagtcgaaa gactgggcct ttcgttttat    1260
gtcgactcgt cgttgtcgtt ttgtcgttag cttagctgcc aatcgttaag gtgcatcgat    1320 gcagggggc tgaattgcag tctatttgcg tcgtcgtttt gtcgttttgt cgttacgttc     1380
cggaagtcaa tcgattcgtc gttaacgtta acgctatgcc tccgatgcga atcagtctcg    1440
tcgttgtcgt tgtcgttcca tgctttacgt actactgctc gtcgctgttg tcgtttcttg    1500
tccaccctta agggccatct tcgtcgttgt cgttttgtcg ttctgattag tcccaatgct    1560
cgtggtgcat cgatgcaggg gggcgtaaac ctgctgaatc ggactcgtcg ttttgtcgtt    1620
```

```
ttgtcgttga tggccagctt taccatgact cgtcgttaac gttaacgcta tttactgatc    1680
ctgggatcca gtcgtcgttg tcgttgtcgt tatgccaagc tgccaatgtt tatcgtcgct    1740
gttgtcgttt cttgatatcc cggttgtcag ccgttaagtg ttcctgtgtc actcaaaatt    1800
gctttgagag gctctaaggg cttctcagtg cgttacatcc ctggcttgtt gtccacaacc    1860
gttaaacctt aaaagcttta aaagccttat atattctttt ttttcttata aaacttaaaa    1920
ccttagaggc tatttaagtt gctgatttat attaatttta ttgttcaaac atgagagctt    1980
agtacgtgaa acatgagagc ttagtacgtt agccatgaga gcttagtacg ttagccatga    2040
gggtttagtt cgttaaacat gagagcttag tacgttaaac ttgagagctt agtacgtgaa    2100
acatgagagc ttagtacgta ctatcaacag gttgaactgc gaattctcag at            2152

<210> SEQ ID NO 2
<211> LENGTH: 11
<212> TYPE: PRT
<213> ORGANISM: Artificial Sequence
<220> FEATURE:
<223> OTHER INFORMATION: a polycationic polymer polypeptide

<400> SEQUENCE: 2

Lys Leu Lys Leu Leu Leu Leu Leu Lys Leu Lys
1               5                   10
```